(12) United States Patent
Kawamoto

(10) Patent No.: US 6,839,726 B2
(45) Date of Patent: Jan. 4, 2005

(54) APPARATUS, METHOD, AND PROGRAM FOR IMPLEMENTING GARBAGE COLLECTION SUITABLE FOR REAL-TIME PROCESSING

(75) Inventor: Takuji Kawamoto, Nagoya (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 229 days.

(21) Appl. No.: 10/317,672

(22) Filed: Dec. 12, 2002

(65) Prior Publication Data
US 2003/0140071 A1 Jul. 24, 2003

(30) Foreign Application Priority Data
Dec. 14, 2001 (JP) ........................................ 2001-382148

(51) Int. Cl.[7] ............................................. G06R 17/30
(52) U.S. Cl. .................................................... 707/206
(58) Field of Search ........................... 707/206, 103 R; 711/116, 132, 170; 717/116, 130

(56) References Cited

U.S. PATENT DOCUMENTS

| | | | |
|---|---|---|---|
| 5,845,298 A | 12/1998 | O'Connor et al. | 711/6 |
| 5,953,736 A | 9/1999 | O'Connor et al. | 707/206 |
| 6,081,665 A | * 6/2000 | Nilsen et al. | 717/116 |
| 6,098,089 A | 8/2000 | O'Connor et al. | 718/104 |
| 6,105,040 A | * 8/2000 | Agesen | 707/206 |
| 6,308,185 B1 | 10/2001 | Grarup et al. | 707/206 |
| 6,769,116 B1 | * 7/2004 | Sexton | 717/130 |
| 2003/0105772 A1 | * 6/2003 | Sexton et al. | 707/103 R |

* cited by examiner

Primary Examiner—Diane D Mizrahi

(57) ABSTRACT

A garbage collector 100 is composed of a generation heap creator 20, an inter-generation object relocator 80, and a generation heap deallocator 40. The generation heap creator 20 creates a generation heap at a start of execution of a method. The inter-generation object relocator 80 relocates, upon detecting a reference from an object in an older generation heap to another object in a younger generation heap, the referenced object in the younger generation heap to the older generation heap. The generation heap deallocator 40 deallocates, at a completion of a method, a generation heap corresponding to the method.

22 Claims, 40 Drawing Sheets

FIG.4A    FIG.4B    FIG.4C
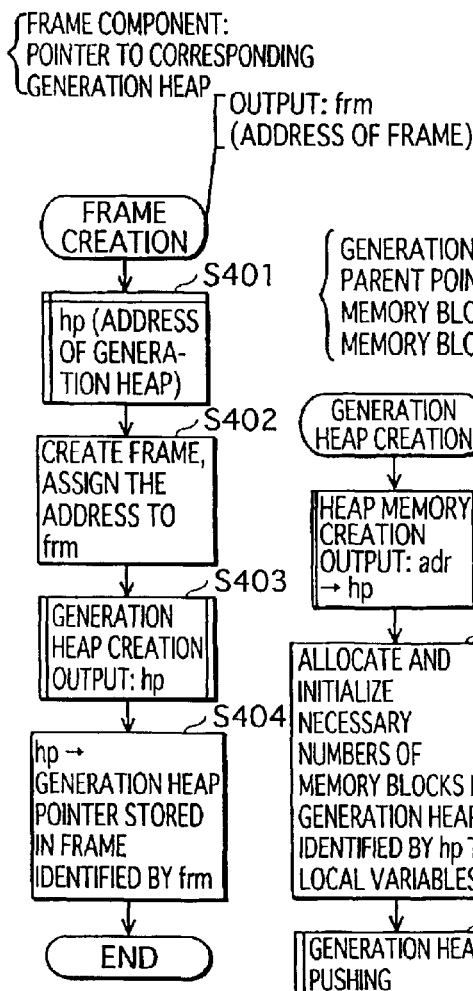
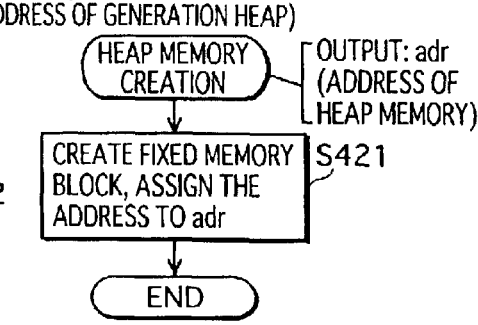
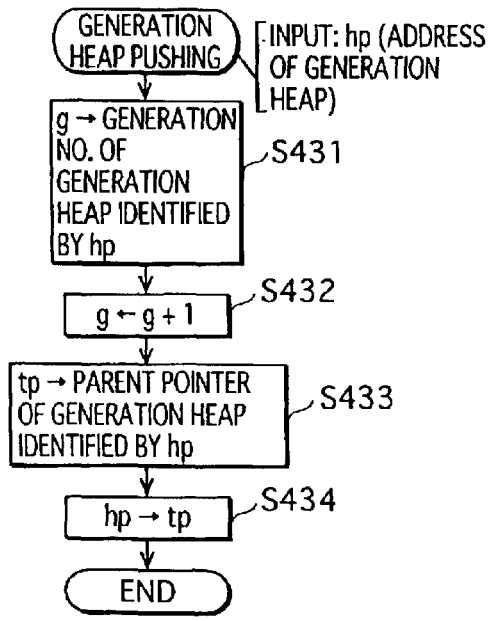
FIG.4D

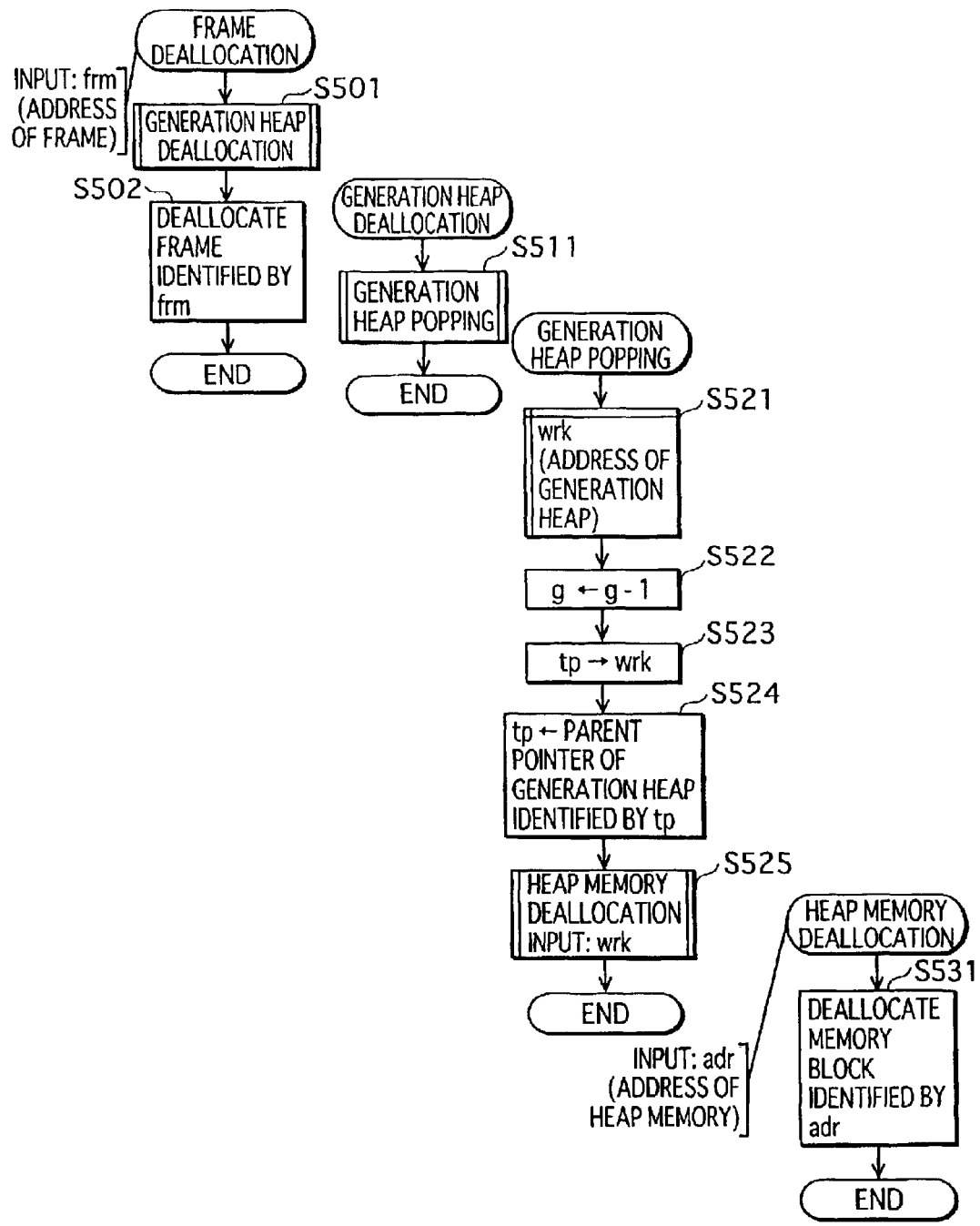

FIG.6A
FIG.6B
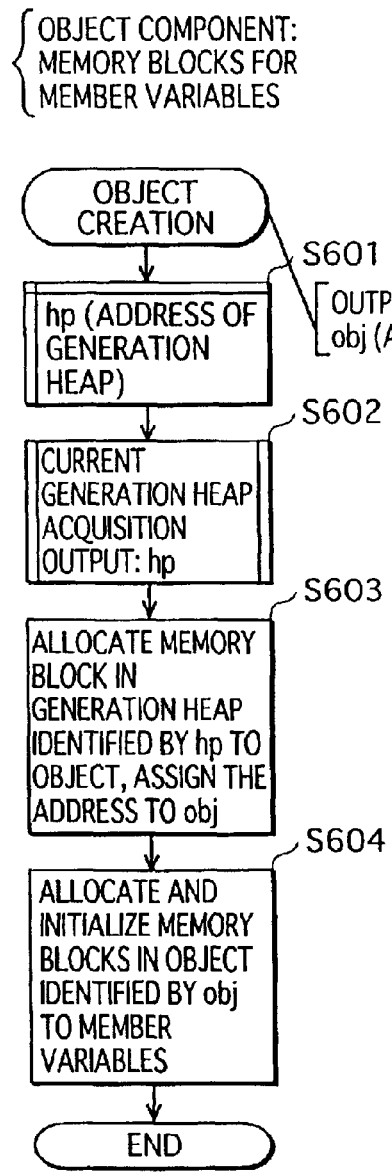
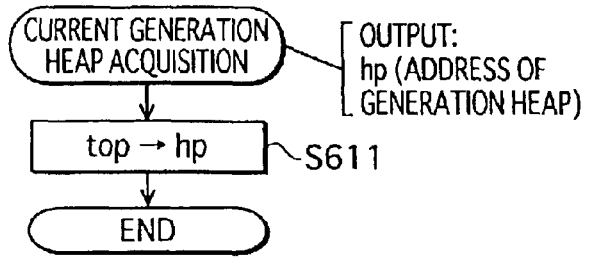

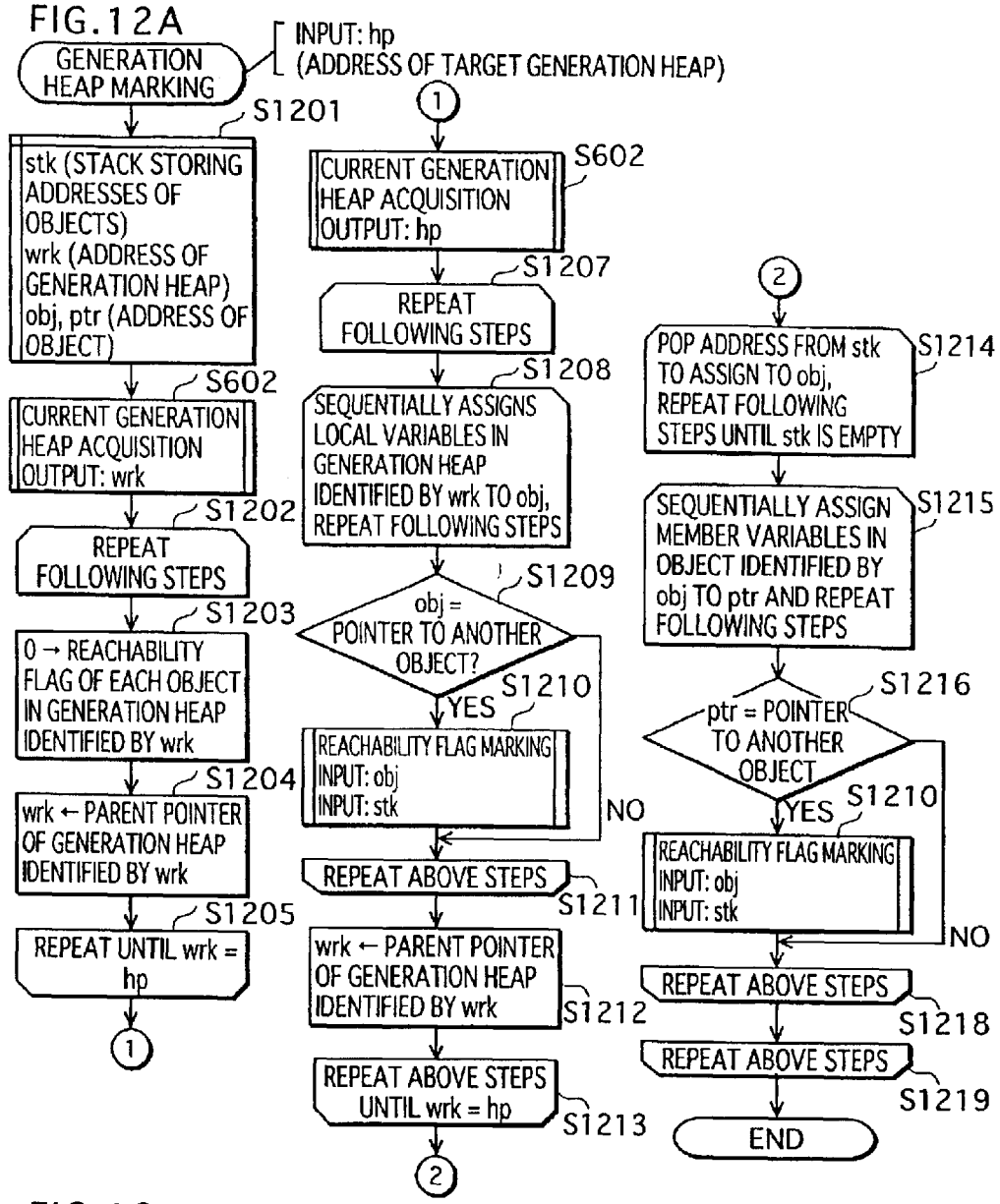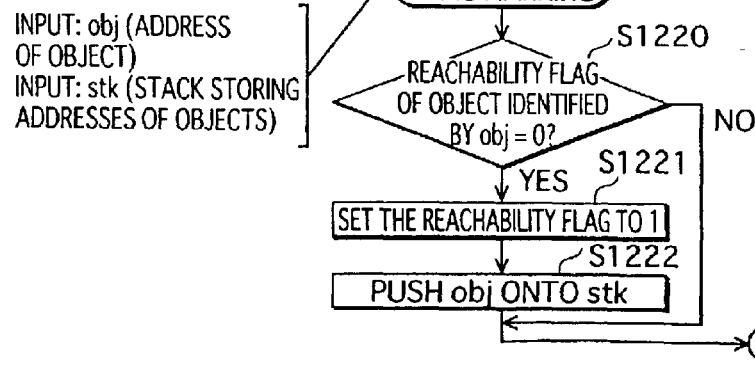

① ON DETECTION OF REFERENCE FROM OBJECT A TO OBJECT B AS SHOWN IN DOTTED LINE

② POINTER TO OBJECT B AND THUS POINTER TO OBJECT C ARE RELOCATED TO FIRST GENERATION HEAP $$\begin{cases} \text{GLOBAL VARIABLE:} \\ \text{ent} \\ \text{(ADDRESS OF ENTITY MEMORY)} \end{cases}$$

①ON DETECTION OF REFERENCE FROM OBJECT
A TO OBJECT B AS SHOWN IN DOTTED LINE

②POINTER TO OBJECT B AND THUS POINTER TO OBJECT C
ARE COPIED TO FIRST GENERATION HEAP.
ORIGINAL POINTERS REMAIN UNDELETED.

APPARATUS, METHOD, AND PROGRAM FOR IMPLEMENTING GARBAGE COLLECTION SUITABLE FOR REAL-TIME PROCESSING

This application is based on an application No. 2001-382148 filed in Japan, the content of which is hereby incorporated by reference.

BACKGROUND OF THE INVENTION (1) Field of the Invention

The present invention relates to techniques for implementing garbage collection that is suitably applied to real-time processing.

(2) Description of the Related Art

Garbage collection is a type of operating system memory management. The garbage collection is implemented by a garbage collection algorithm to automatically free or deallocate a memory area that is no longer referenced by a program, so that an available memory area is increased. For example, Java™ (a registered trademark of Sun Microsystems, Inc., a cooperation of the United States) is provided with a garbage collector for implementing the algorithm.

The garbage collector deallocates a dynamically allocated memory object (hereinafter, simply referred to as an "object") to recycle if detecting that the object is no longer referenced. The process to deallocate an object for recycling is also referred to as collecting of an object.

Here, an object means a block of heap area that is dynamically allocated at a request of an application program at run-time. Each object is a variable-length, contiguous block that corresponds to, for example, an object instance in an object-oriented programming language. Each object is composed of (1) at least one set of data paired with its data type, and (2) management information, such as a flag indicating whether the object is valid or not. The data type indicates the type of corresponding data, such as an integer, a logical value, and a pointer. Hereinafter, pointer type data is also referred to simply as a "pointer".

An object is referenced when another object includes a pointer to the object. That is, when an object A references an object B, the object A includes, as its data content, a pointer to the object B.

All the objects that are referenced at a given time are reachable from one or more root pointers directly or via one or more objects. A route pointer is provided for a part or entire application program depending on the run-time environment such as control mechanism. Therefore, the garbage collector regards objects to be unneeded if they are unreachable from any root pointer at a given time, and collects those unneeded objects.

Hereinafter, description is given briefly to the following conventional garbage collection techniques: mark-and-sweep and reference counting.

The mark-and-sweep system is disclosed, for example, in Publication of Japanese Unexamined Patent Application No. 11-232162. The mark-and-sweep system operates by marking all objects reachable from root pointers, and then scan the entire memory to collect unmarked objects.

The reference counting system operates by keeping, in management information of each object, a count showing how many references there are to that object. The reference count is incremented or decremented each time a reference is modified. An object is collected when a reference count falls to zero.

There are many types of garbage collection other than the techniques mentioned above. None of the conventional techniques, however, is suitably applied to an application program that is required to be highly responsive. This is because a garbage collector needs to interrupt execution of the application program for a long time. In addition, it is extremely difficult to predict when and how long the garbage collector interrupts the application program.

Such a highly-responsive application program is required to complete predetermined processing within a predetermined period of time despite an interruption by a garbage collector.

If the duration of each interruption is sufficiently short comparing with the predetermined time, the application program may be able to complete the predetermined processing timely. In practice, however, a conventional garbage collection operates mainly by processing on the entire memory area, such as tracing of all reachable objects from root pointers through out the memory area, or scanning of the entire memory area to collect unnecessary objects. Consequently, the duration of each interruption is usually long, thereby making it nearly impossible for the application program to complete the required processing within the predetermined time.

Despite such a long duration of an interruption, responsiveness of the application program may still be ensured provided that it is predicted, at the time of designing the application program, when and how long such an interruption will take place. In that case, the application program may be designed to ensure the responsiveness by adjusting time required for each processing constituting the application program. However, it is extremely difficult to predict when and how long an interruption occurs because such prediction can not be made without knowing how much of the memory area is used at different times through the run-time. It is also extremely difficult to predict how much of the memory area is used at a given time because it differs depending on what processing of the application program is executed by that time.

SUMMARY OF THE INVENTION

In view of the above limitations, an object of the present invention is to provide a garbage collection apparatus, a garbage collection method, and a garbage collection program that are suitably applied to an application program required to be highly responsive.

The object stated above is achieved by a garbage collection apparatus for deallocating memory that is not used by an application program. The application program is composed of methods. The garbage collection apparatus comprises: an allocation unit operable to allocate a memory area for each method prior to execution of the method; a storage unit operable to store an allocation time as to when each memory area is allocated; a relocation unit operable to judge, when a pointer to an object is recorded in one memory area allocated for a method, whether an allocation time of the memory area is prior to an allocation time of a memory area storing the object, and to relocate, when judging affirmative, the object to the memory area in which the pointer is recorded; and a deallocation unit operable to deallocate, at completion of a method, a memory area corresponding to the completed method.

With the stated construction, if an object in a memory area is referenced from another object in another memory area that is allocated earlier than that memory area, the referenced object is relocated from the later-allocated memory area to the earlier-allocated memory area. This makes it possible to deallocate the later allocated memory area without checking whether each object therein is no longer necessary. Since it is not required to check whether each object is unneeded, the time taken for the deal location is relatively short. In addition, since this deal location is a routinely processing, the processing time is constant every time, so that the total processing time is predicted by summing the processing time predicted for each step of the deallocation processing.

Further, objects to be relocated are usually found locally in relatively new memory areas, rather than throughout the entire memory, and thus the number of such objects is relatively small. Consequently, relocation of objects is completed within a relatively short time. In addition, the time taken for relocation is proportional to the total size of objects to be relocated. Thus, if an upper limit is set to the total size of objects that are reachable directly or indirectly from one object, the maximum time taken for relocation is predicted. Alternatively, an upper limit may be set to the size of each memory area. Since an object to be relocated is always in a newer memory area than a memory area that stores a referencing object, the maximum time taken for relocation is predicted from the total size of newer memory areas.

In addition, only a specific instruction results in a reference from an older memory area to an object in a newer memory area, so that it is relatively rare that relocation of an object from one memory area to another memory area is performed. Thus, the application program is interrupted only rarely for performing the relocation, and the duration of each interruption is relatively short.

As stated above, the garbage collector takes a relatively short time to complete main processing, such as deallocation of a memory area, and relocation of an object. In addition, the time taken for each processing is predictable along with the maximum processing time. Due to these advantages, the garbage collector is suitably applied to an application program that needs to be highly responsive.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 4A is a view showing frame creation processing;

FIG. 4B is a view showing generation heap creation processing;

FIG. 4C is a view showing heap memory creation processing;

FIG. 4D is a view showing generation heap push processing;

FIG. 5A is a view showing frame deallocation processing;

FIG. 5B is a view showing generation heap deallocation processing;

FIG. 5C is a view showing generation heap pop processing;

FIG. 5D is a view showing heap memory deallocation processing;

FIG. 6A is a view showing object creation processing;

FIG. 6B is a view showing current generation heap acquisition processing;

FIG. 12A is a view showing generation heap marking processing;

FIG. 12B is a view showing reachability flag marking processing;

DESCRIPTION OF THE PREFERRED EMBODIMENT

Now, description is given to embodiments of the present invention with reference to the accompanying drawings.

<Embodiment 1>

Figure 1:
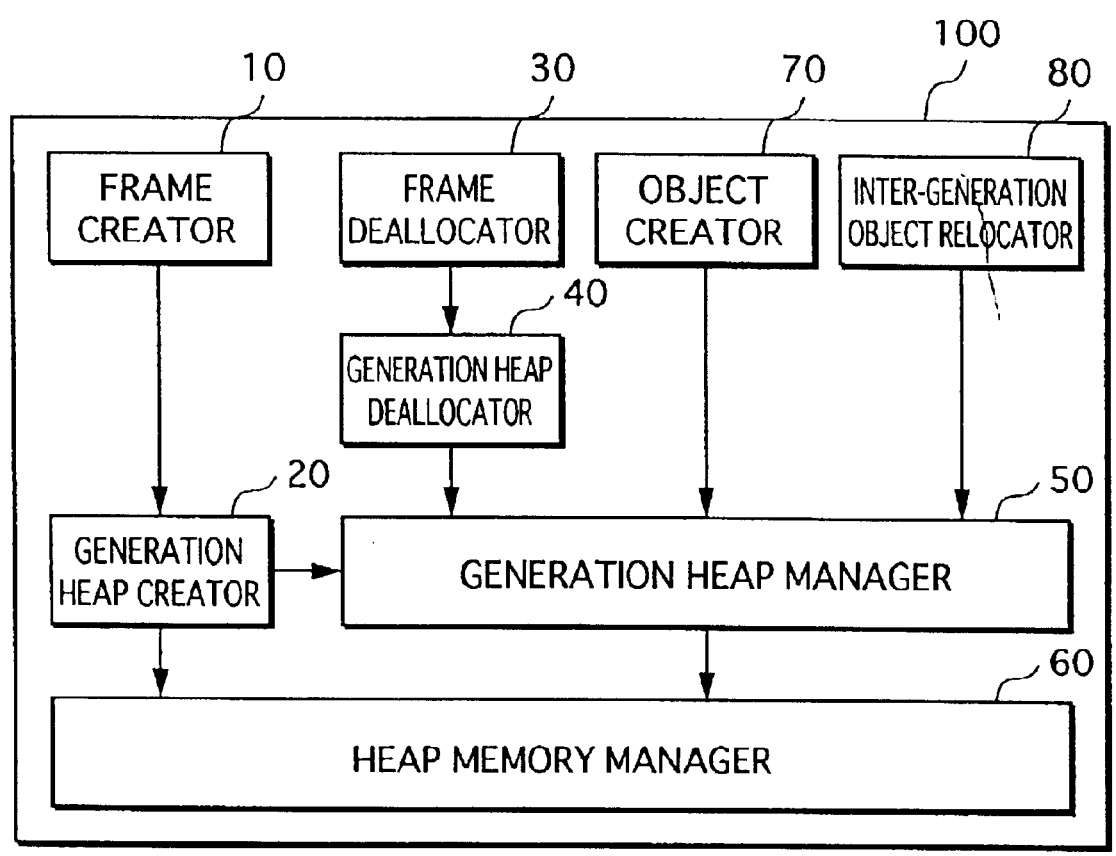
FIG. 1 is a view showing the construction of a garbage collector 100 according to an embodiment 1 of the present invention.

FIG. 1 is a block diagram schematically showing the construction of a garbage collector 100 according to an embodiment 1 of the present invention. The garbage collector 100 is implemented by a computer provided with a CPU, a memory, and other components by the CPU executing a control program stored in the memory. In addition, the garbage collector runs on an operating system, and thus regarded as a runtime environment of an application program written in e.g., Java™ programming language. In view of the above, it is said that the garbage collector is a device more like software.

In the figure, the garbage collector 100 is composed of a frame creator 10, a generation heap creator 20, a frame deallocator 30, a generation heap deallocator 40, a generation heap manager 50, a heap memory manager 60, an object creator 70, and an inter-generation object relocator 80.

The frame creator 10 creates a frame in a memory area each time a method is called by an application program, and stores the generated frame in a stack.

The term "method" used herein refers to a subroutine, and one example of which is a function used in C++. Generally speaking, a subroutine is a sub-program included in a program, and executed when called by another sub-program. In addition, each sub-program includes an instruction for returning back, after execution, to a sub-program that has called the executed sub-program. A frame is a work memory used when a method is executed, and includes a pointer to a generation heap, which will be described later.

The generation heap creator 20 creates a generation heap each time a frame is created. A generation heap is a memory area for storing, for example, local variables and objects used to execute a method. Each time a frame is created, a generation heap is created, and each generation heap is assigned a number representing its generation in ascending order. That is, a generation heap created earlier has a smaller number, and each generation heap is uniquely identified by the generation number.

The frame deallocator 30 deallocates, when execution of a method is completed, a frame that is created in response to a call to the method.

The generation heap deallocator 40 deallocates, when a frame is deallocated, a generation heap that corresponds to the frame.

The generation heap manager 50 manages a stack of generation heaps created and deallocated by the generation heap creator 20 and the generating heap deallocator 40, respectively.

The heap memory manager 60 allocates a block of memory for storing a generation heap when the generation heap is created by the generation heap creator 20, and deallocates the block of memory occupied by a generation heap when the generation heap is deallocated by the generation heap deallocator 40.

The object creator 70 allocates, when an object is created through execution of the application program, a block of memory for storing the object.

The inter-generation object relocator 80 assigns values to member variables of objects and local variables in a generation heap. Upon detecting that the assignment results in a reference from a member variable of an object stored in a generation heap (an older generation heap) to an object stored in a later created generation heap (a younger generation heap), the inter-generation object relocator 80 relocates the object stored in the younger generation heap to the older generation heap, and this processing is performed reclusively. The term "reclusively" means that if relocation of one object results in another reference from an object in an older generation heap to an object in a younger generation heap, the object in the younger generation heap is also relocated to the older generation heap, and the processing is repeated until there is no such a reference from an older generation heap to a younger generation heap.

Next, description is given briefly to operations of the garbage collector 100.

Figure 2A:
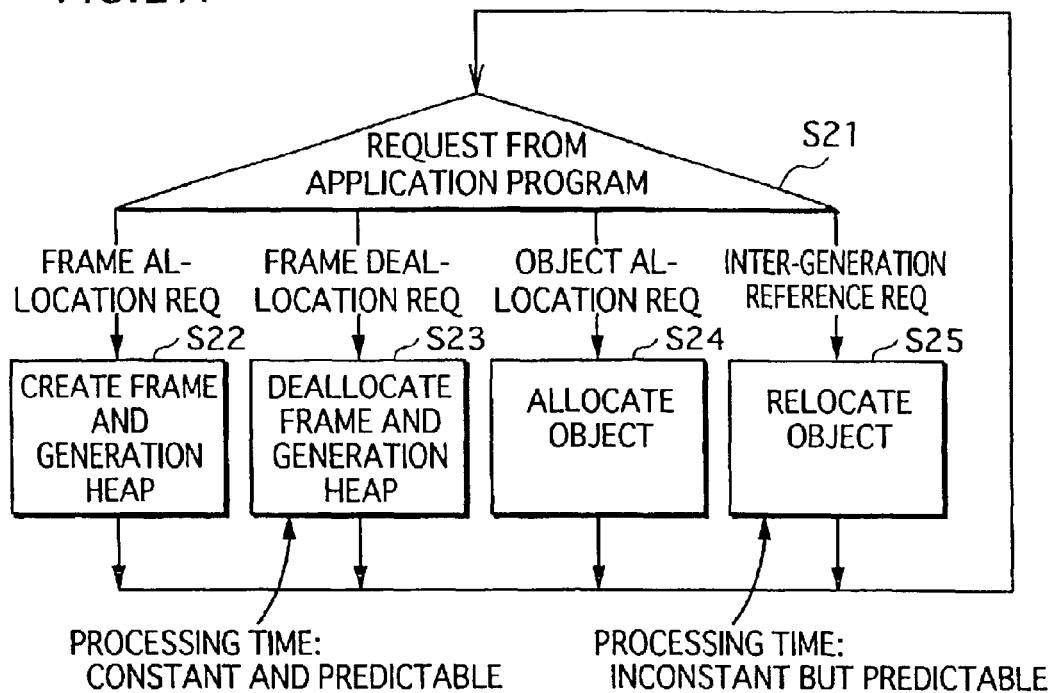
FIG. 2A is a flowchart showing the outline of operations of the garbage collector 100.

FIG. 2A is a view showing the operations of the garbage collector 100.

Step S21: In response to various requests from the application program, the garbage collector 100 performs one of steps S22–S25 according to the request.

Step S22: In response to a frame allocation request from the application program, the frame creator 10 creates a frame and the generation heap creator 20 creates a generation heap corresponding to the frame.

Step S23: In response to a frame deallocation request from the application program, the generation heap deallocator 40 first deallocates the generation heap corresponding to a requested frame and then deallocates the frame.

Step S24: In response to an object allocation request from the application program, the object creator 70 allocates, to an object, a block of the generation heap that corresponds to a current frame.

Step S25: When a value assigned to an object is a pointer to another object in a younger generation heap, the inter-generation object relocator 80 relocates the referenced object from the younger generation heap to the generation heap storing the referencing object.

Figure 2B:
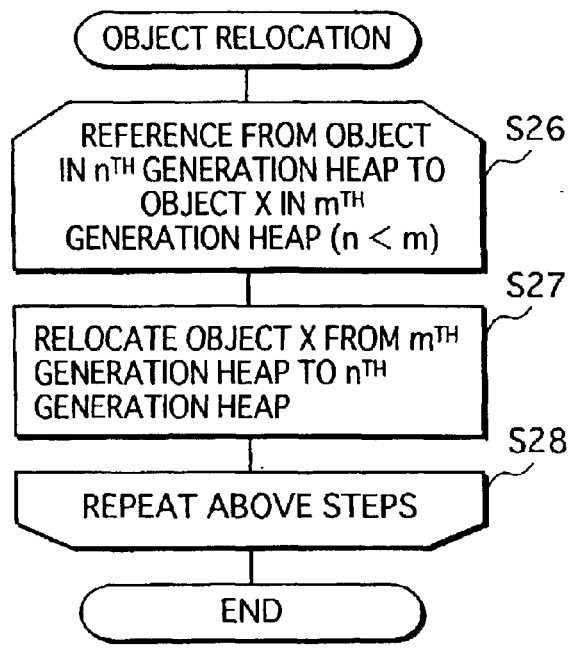
FIG. 2B is a flowchart showing the outline of object relocation processing performed in a step S25.

FIG. 2B is a flowchart showing the outline of object relocation processing performed in the step S25.

Step S26: The garbage collector 100 performs a step S27 when there is a reference from an object in an older generation of $n^{th}$ generation heap to an object X in a younger generation of $m^{th}$ generation heap (n<m).

Step S27: The inter-generation object relocator 80 relocates the object X from the $m^{th}$ generation heap to the $n^{th}$ generation heap.

Step S28: The processing returns to the step S26.

In FIG. 2A, each of the steps S22, S23, and S24 is a routinely processing (see flowcharts shown in FIG. 4A and thereafter) so that processing time of each step is constant every time. That is to say, the processing time required for each step is predictable, and thus the processing time for all the steps is, predictable by summing the time estimated to be required for each step. In addition, the processing in each step is comparatively simple so that the entire processing time is comparatively short.

Especially notable is that the processing performed in the step S23 is to deallocate objects in a target generation heap all at once. Unlike a conventional technique, there is no need to perform time consuming processing of tracing or scanning of all the objects in the entire memory area to identify unnecessary objects one by one. This collective deallocation is made possible by the processing performed in the step S25. The processing in the step S25 leads to that there is no reference from an older generation heap to a younger generation heap. Consequently, at the time of frame deallocation, all the objects in a corresponding generation heap are no longer referenced, so that it is possible to deallocate all the objects without checking each object one by one.

Unfortunately, however, the processing time of the step S25 is not constant as it varies depending on the number of objects to be relocated. Yet, since the processing is performed on one generation heap rather than the entire memory area, the processing time is relatively short. In addition, it is relatively easy to predict the number of objects to be relocated as the processing in this step is performed on one generation heap rather than the entire memory area. Once the number of objects to be relocated is predicted, the processing time of this step is predicted because it is proportional to the predicted number. Further, a reference from an object in an older generation heap to an object in a younger generation heap occurs only when the application program includes a specific instruction, which rarely occurs. Consequently, the step S25 is rarely performed.

As described above, the processing time of each of the steps S22–S25 is either relatively short or predictable. In addition, the processing of the step S25 is performed only rarely. Due to theses advantages, the garbage collector 100 is suitably applied to an application program that needs to be highly responsive.

Figure 3A:
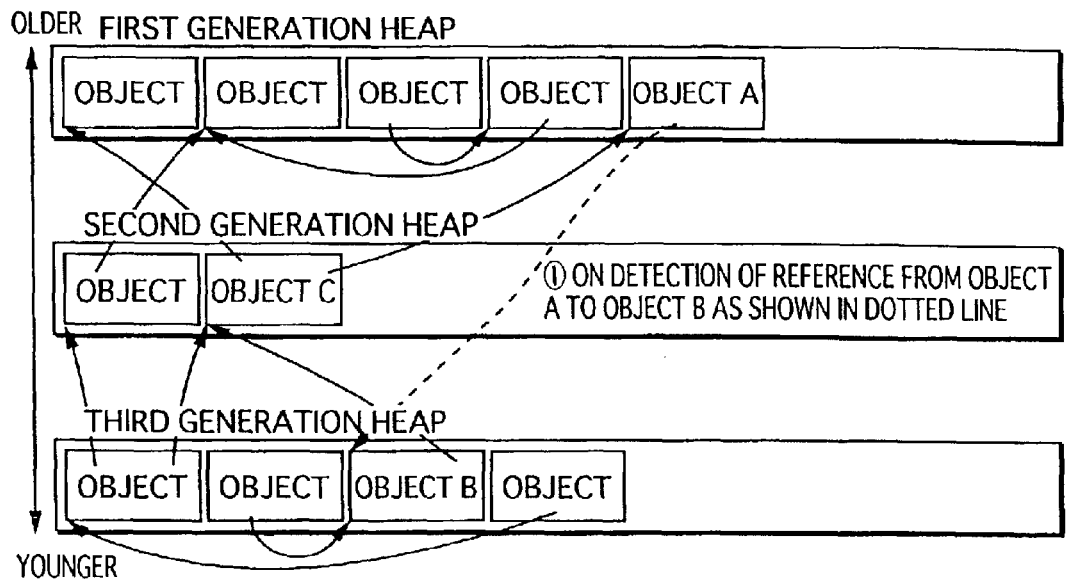
FIGS. 3A and 3B are views showing an example of generation heaps and objects allocated therein, and of a process in which some of the objects are relocated.
Figure 3B:
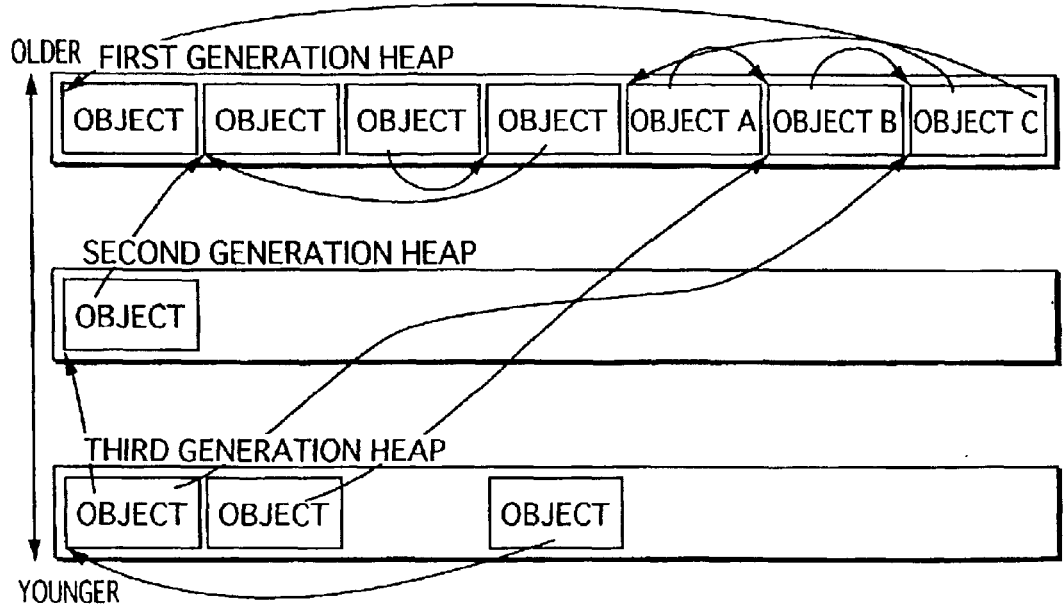

FIGS. 3A and 3B are views showing an example of generation heaps and objects allocated therein, and of a process in which some of the objects are relocated.

Before describing relocation processing, description is given to processing to create generation heaps.

First, when a first method is called by an application program at an early stage of execution, the garbage collector 100 creates one frame for the first method as the work area, and then creates, correspondingly to the frame, the first generation heap shown in FIG. 3A.

Next, when a second method is called by the application program during execution of the first method, the garbage collector 100 creates another frame for the second method as the work area, and then creates, correspondingly to the newly created frame, the second generation heap shown in FIG. 3A. The second generation heap is stacked on the first generation heap. Further, when a third method is called by the application program during execution of the second method, the garbage collector 100 creates yet another frame for the third method as the work area, and then creates, correspondingly to the newly created frame, the third generation heap shown in FIG. 3A. The third generation heap is stacked onto the second generation heap. Here, the ordinal number attached to each method is merely for differentiating that particular method from other methods, and do not represent any instructions included in the method. Instructions included in a method may be the same as, or may differ from instructions included in other methods depending on each application program. Further, although each method in this example calls only one method during its execution, it is possible that two or more methods are called during execution of one method. Still further, although only three generation heaps are created in the example shown in FIGS. 3A and 3B, it does not mean that three is the maximum number of generation heaps, and as many generation heaps as necessary are created. The number of generation heaps to be created differ depending on each application program.

When the application program assigns a value to a member variable through execution of a method, the value of the member variable is stored in an object allocated in the generation heap that corresponds to the method being executed.

The objects in the generation heaps shown in FIGS. 3A and 3B are the ones storing member variables. In the figure, each arrow extending from one object to another object represents a pointer. To be more specific, each object located at the starting point of an arrow has a reference to an object located at the endpoint of the arrow.

As a result that the value of a member variable is stored in an object through execution of the application program, there is a reference, for example, from an object A in the first generation heap to an object B in the third generation heap as shown in FIG. 3A (the reference is represented by a dotted arrow). In response, the inter-generation object relocator 80 relocates the object B to the first generation heap. Consequently, the reference from the object B to the object C is now a reference from an object in the first generation heap to an object in the second generation heap, i.e., from an older generation heap to a younger generation heap. Thus, the inter-generation object relocator 80 relocates the object C from the second generation heap to the first generation heap. At the end, each generation heap has objects as shown in FIG. 3B. As shown in the figure, each pointer of an object is now a reference to an object in the same or older generation heap.

As described above, whenever there is a reference from an older generation heap to a younger generation heap, the inter-generation object relocator 80 relocates a corresponding object from the younger generation heap to the older generation heap.

Next, description is given in detail to processing of the garbage collector 100.

FIGS. 4A, 4B, 4C and 4D show processing performed at the time of method execution.

FIG. 4A shows processing to create a frame.

When a method is called by the application program, the frame creator 10 performs the frame creation processing shown in FIG. 4A.

Step S401: The frame creator 10 defines a variable hp for storing the address of a generation heap corresponding to the method called.

Step S402: The frame creator 10 creates a frame and assigns the address of the frame to a variable frm.

Step S403: The frame creator 10 calls the generation heap creating processing shown in FIG. 4B so that the generation heap creator 20 creates a generation heap. The frame creator 10 then assigns the address of the generation heap to hp.

Step S404: Finally, the frame creator 10 stores the value of hp in the "pointer to generation heap" held in the frame created in the step S402.

FIG. 4B shows the generation heap creation processing.

Step S411: The generation heap creator 20 calls to execute the heap memory creation processing shown in FIG. 4C, so that a block of heap memory is allocated to a generation heap. The generation heap creator 20 then assigns the address adr of the generation heap to hp.

Step S412: The generation heap creator 20 allocates blocks of the generation heap to as many local variables as required in the generation heap, and initializes the allocated blocks.

Step S413: The generation heap creator 20 performs the generation heap push processing shown in FIG. 4D so that the generation heap is pushed onto the stack.

FIG. 4C shows the heap memory creation processing.

Step S421: In response to a call for the heap memory creation processing in the step S411, the heap memory manager 60 reserves, as shown in FIG. 4C, a fixed-size block of heap memory, and assigns the address to adr. Then, the processing returns to the step S411.

FIG. 4D shows the generation heap push processing.

Step S431: The generation heap manager 50 assigns a global variable g to the generation number of the generation heap specified by hp. The global variable g is initially set at the value 1 and represents the generation number of a next generation heap, i.e., the generation heap to be pushed onto the stack.

Step S432: The generation heap manager 50 increments g by 1.

Step S433: The generation heap manager 50 then assigns a value of a variable tp to the parent pointer held in the generation heap. Here, the value of tp is a pointer to a parent generation heap, which is one generation older than the generation heap to be pushed onto the stack by the generation heap push processing being performed. The initial value of tp is a NULL pointer.

Step S434: Lastly, the generation heap manager 50 assigns the value of tp to hp in preparation for next generation heap push processing.

FIGS. 5A, 5B, 5C, and 5D are views showing processing performed at the time a method is completed.

Upon completion of a method, the frame deallocator 30 performs the frame deallocation processing shown in FIG. 5A to deallocate a frame corresponding to the completed method.

Step S501: The frame deallocator 30 calls the generation heap deallocation processing shown in FIG. 5B, so that the generation heap corresponding to a target frame is deallocated.

Step S502: The frame deallocator 30 deallocates the target frame.

FIG. 5B shows the generation heap deallocation processing.

Step S511: The generation heap deallocator 40 calls the generation heap pop processing shown in FIG. 5C, so that the generation heap corresponding to the target frame is popped from the stack and deallocated.

FIG. 5C shows the generation heap pop processing.

Step S521: The generation heap manager 50 defines a variable wrk for storing the address of a generation heap.

Step S522: The generation heap manager 50 decrements, by 1, the variable g storing the generation number of the next generation heap.

Step S523: The generation heap manager 50 assigns the value of tp to wrk.

Step S524: The generation heap manager 50 assigns, to tp, the value of the parent pointer held in the generation heap specified by tp.

Step S525: The generation heap manager 50 calls the heap memory deallocation processing shown in FIG. 5D so as to deallocate the memory block occupied by the generation heap specified by wrk.

FIG. 5D shows the heap memory deallocation processing.

Step S531: The heap memory manager 60 deallocates the target memory block.

FIG. 6A shows the object creation processing performed by the object creator 70.

Step S601: The object creator 70 defines a variable hp for storing the address of a generation heap.

Step S602: The object creator 70 calls the current generation heap acquisition processing shown in FIG. 6B so as to acquire the address of the generation heap that corresponds to a currently executed method.

Step S603: The object creator 70 allocates, to an object, an available memory block within the generation heap located at the acquired address, and assigns the address of the object to a variable obj.

Step S604: The object creator 70 allocates, to member variables, memory blocks in the object specified by obj and initializes allocated blocks.

FIG. 6B shows the current generation heap acquisition processing.

Step S611: The generation heap manager 50 assigns the value of tp to hp.

Figure 7A:
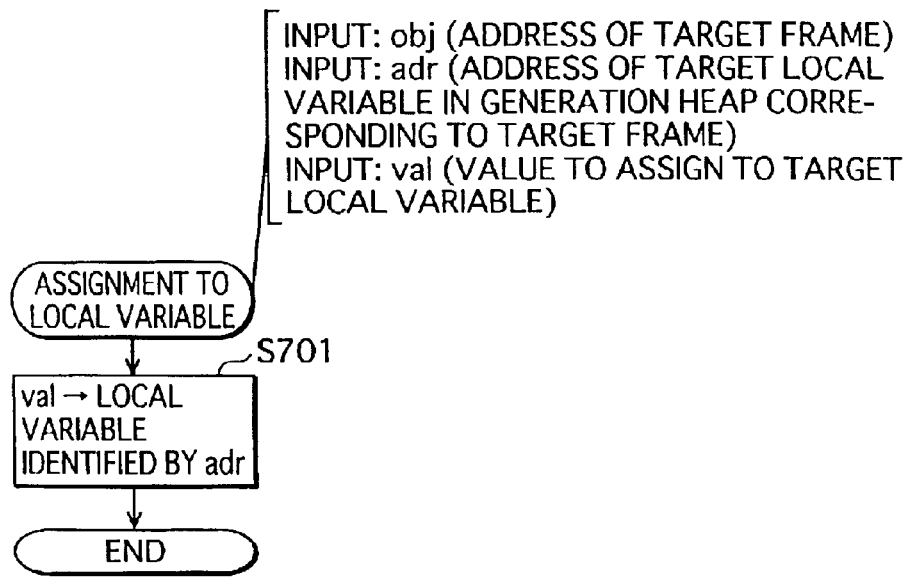
FIG. 7A is a view showing local variable assignment processing performed by an inter-generation object relocator 80.

FIG. 7A shows local variable assignment processing performed by the inter-generation object relocator 80.

Step S701: In response to assignment of a value val to a local variable by the application program during the execution, the inter-generation object relocator 80 assigns val to the local variable specified by the address adr.

Figure 7B:
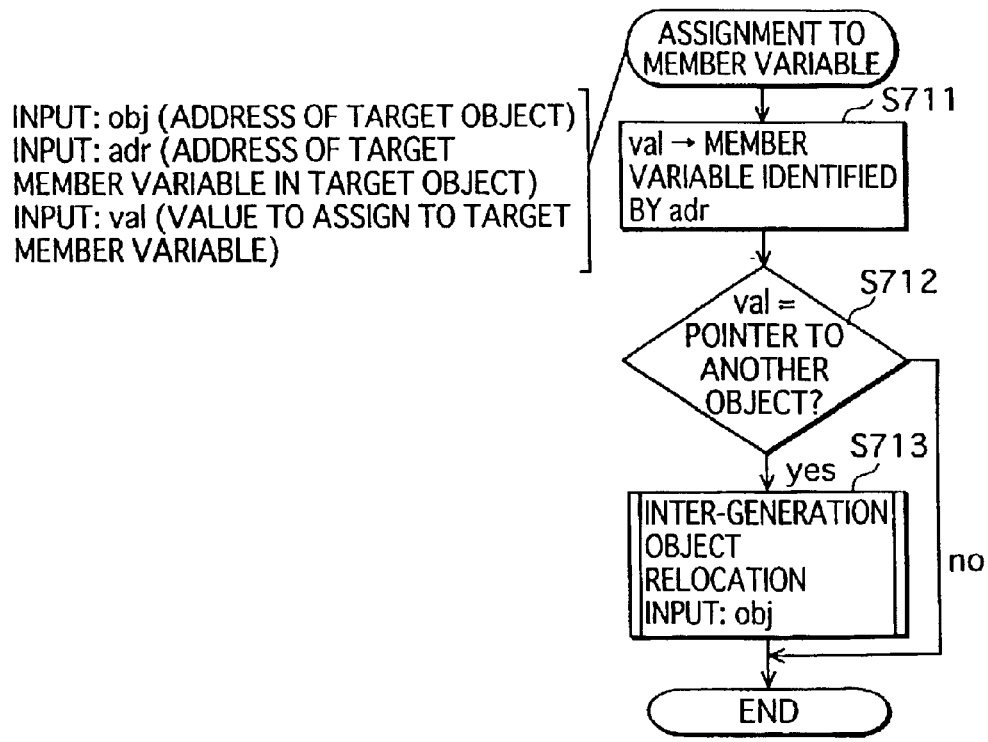
FIG. 7B is a view showing member variable assignment processing performed by the inter-generation object relocator 80.

FIG. 7B shows member variable assignment processing performed by the inter-generation object relocator 80.

Step S711: In response to assignment of the value val to a member variable by the application program during the execution, the inter-generation object relocator 80 assigns val to the member variable specified by the address adr.

Step S712: The inter-generation object relocator 80 determines whether val assigned in the step S711 is a pointer to another object.

Step S713: The inter-generation object relocator 80 calls the inter-generation object relocation processing shown in the FIG. 8A in the case where val is, judged to be a pointer to another object.

Figure 8A:
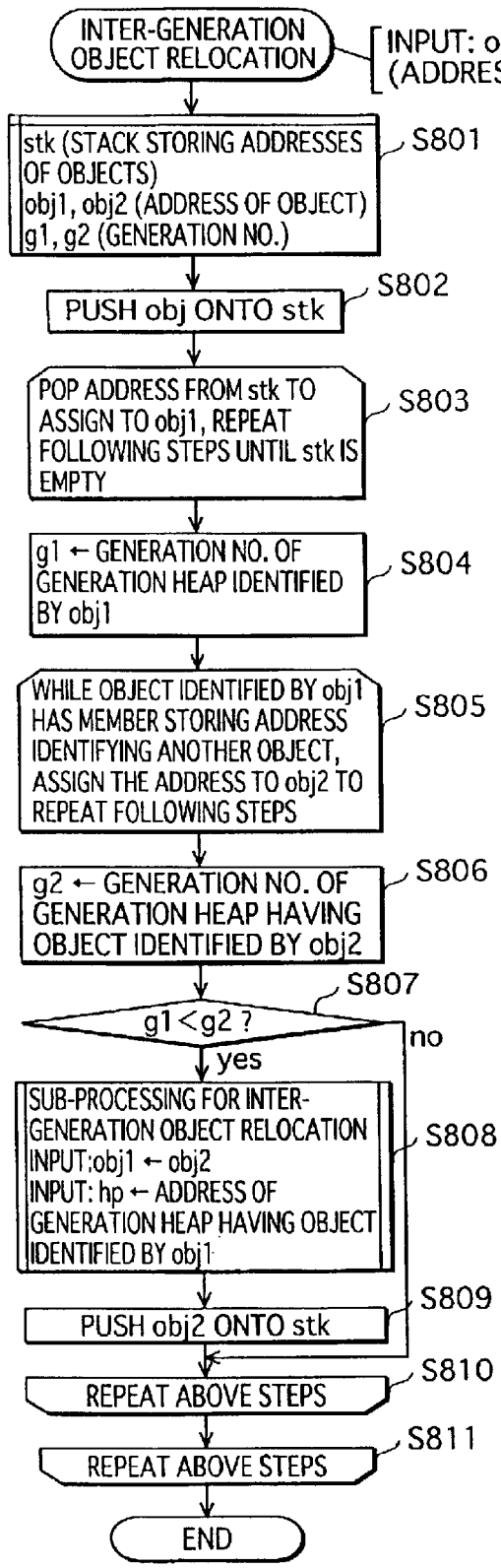
FIG. 8A is a view showing inter-generation object relocation processing performed by the inter-generation object relocator 80.

FIG. 8A shows the inter-generation object relocation processing performed by the inter-generation object relocator 80.

Step S801: The inter-generation object relocator 80 initializes the stack stk for storing addresses of objects, variables obj1 and obj2 each for strong the address of an object, and variables g1 and g2 each for storing a generation number.

Step S802: The inter-generation object relocator 80 pushes, onto the stack stk, the address obj of the object to which val is assigned in the processing shown in FIG. 7B.

Step S803: The inter-generation object relocator 80 pops an address from the stack stk and assigns the popped address to obj1, and repeat the steps S803–S811 until the stack stk is empty.

Step S804: The inter-generation object relocator 80 assigns, to g1, the generation number of the generation heap that includes the object specified by obj1, i.e., by the address popped from the stack stk.

Step S805: As long as there is a member, in the object specified by obj1, storing an address of another object, the inter-generation object relocator 80 assigns the address stored in a member to obj2, and repeats steps S805–S810.

Step S806: The inter-generation object relocator 80 assigns, to g2, the generation number of the generation heap storing the object specified by obj2.

Step S807: The inter-generation object relocator 80 judges whether g1<g2, i.e., whether the generation heap represented by g2 is younger than that of g1. If it is judged that g1<g2 is true, the processing moves onto the step S808, and otherwise, the processing moves onto the step S810.

Steps S808: If g1<g2 is judged to be true in the step S807, the inter-generation object relocator 80 calls the sub-processing for inter-generation object relocation shown in FIG. 8B. At this stage, the inter-generation object relocator 80 inputs the value of obj2 to obj1, and inputs, to hp, the address of the generation heap storing the object specified by obj1.

Step S809: The inter-generation object relocator 80 pushes obj2 onto the stack stk.

Step S810: The processing returns to the step S805.

Step S811: The processing returns to the step S803.

Figure 8B:
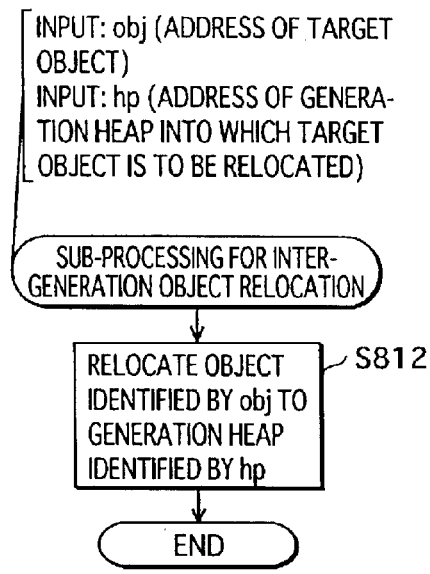
FIG. 8B is a view showing sub-processing performed by the inter-generation object relocator 80 for inter-generation object relocation.

FIG. 8B shows the sub-processing for inter-generation object relocation.

Step S812: The inter-generation object relocator 80 relocates the object specified by obj to the generation heap specified by hp.

As described above, the garbage collector 100 according to the embodiment 1 creates a generation heap for each method called. During execution of a method, objects are created as requested by the method within a generation heap corresponding to the method. When a value is assigned to an object, and the assignment results in a reference from an object in an older generation heap to an object in a younger generation heap, the garbage collector 100 relocates the referenced object from the younger generation heap to the older generation heap. Upon completion of a method, the garbage collector 100 simply deallocates the generation heap corresponding to the completed method. With the stated construction, the garbage collector achieves effects as follows:

(1) The time taken to deallocate each generation heap is relatively short and predictable.

A second method called during execution of a first method completes before the first method completes, and the first method completes after the second method completes. In view of this relationship, when an object in a younger generation heap corresponding to the second method is referenced from an object in an older generation heap corresponding to the first method, it is likely that the referenced object in the second generation heap will be used even after the second method completes as long as the first method is being executed. On the other hand, unless being referenced from an object in the older generation heap, objects in the younger generation heap are no longer needed after the second method completes. Since all the objects referenced from an object in the older generation heap are relocated to the older generation heap, all the objects remain in the younger generation heap will be no longer necessary after the second method completes. Thus, the younger generation heap is simply deallocated upon completion of the second method without identifying whether each object therein is necessary. Consequently, the deallocation is completed within a short time.

In addition, the deallocation is carried out by performing a routinely processing shown in the flowchart 5B, 5C, and 5D. Consequently, the time taken for deallocation is constant and easily predicted. The processing time is predicted by simply summing the time estimated to be taken for each step.

(2) The time taken for a series of operations for reclusively relocating objects over to a different generation heap is relatively short and predictable.

An object to be relocated is not in an older generation heap but always in a younger generation heap between which a reference relationship exits. That is to say, those objects to be reallocated are likely to be found locally rather than being spread throughout the memory area. This helps to shorten the time taken for the relocation processing.

Further, the time taken for relocation is proportional to the total size of the objects to be relocated. Thus, by setting an upper limit to the total size of an object and all the objects referencing directly or indirectly to the object, the maximum time taken for the relocation processing is estimated. Alternatively, an upper limit may be set to the size of each generation heap. Since objects to be relocated is always in a younger generation heap than a generation heap storing a referencing object, a total size of all the younger generation heaps makes it known the maximum time taken for the relocation processing.

Still further, only a specific instruction results in such a reference from an object in an older generation heap to an object in a younger generation heap. Thus, occurrence of the inter-generation object relocating processing is relatively low, so that occurrence of an interruption of application program execution is relatively low.

As described in (1) and (2) above, the garbage collector 100 completes main processing, such as deallocation of generation heaps and relocation of objects, within a short time. In addition, it is possible to predict the time taken for such processing as well as its maximum time. Accordingly, the garbage collector 100 is suitably applied to a highly-responsive application program.

<Embodiment 2>

Hereinafter, description is given to a garbage collector according to an embodiment 2 of the present invention.

In addition to the function of the garbage collector 100 of the embodiment 1, the garbage collector of the embodiment 2 has a function to perform scavenging processing based on the mark-and-sweep system. The scavenging processing is performed when there is no sufficient memory left in a relevant generation heap, on the relevant generation heap in addition to all the younger generation heaps. In the scavenging processing, unneeded objects within the generation heaps are collected, so that the available memory area is increased. Here, the scavenging processing may be performed using any conventional garbage collection algorithm instead of the mark-and-sweep system.

Figure 9:
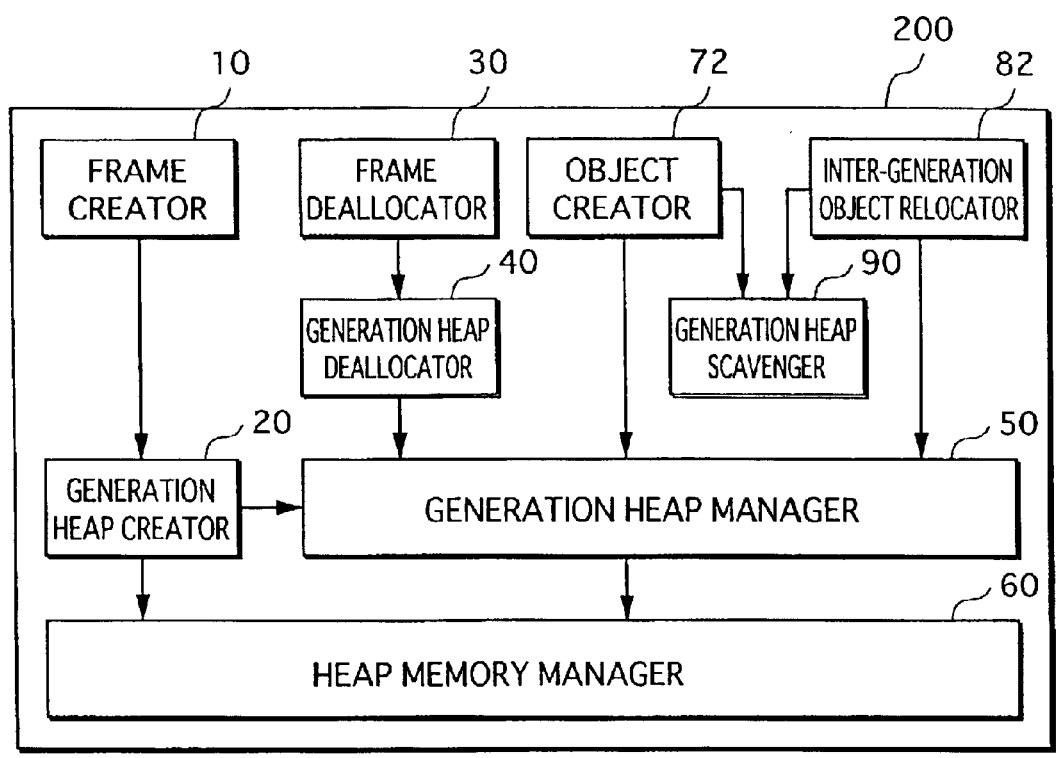
FIG. 9 is a view showing the construction of a garbage collector 200 according to an embodiment 2.

FIG. 9 is a view showing the construction of a garbage collector 200 according to the embodiment 2.

In the figure, the garbage collector 200 is composed of the frame creator 10, the generation heap creator 20, the frame deallocator 30, the generation heap deallocator 40, the generation heap manager 50, the heap memory manager 60, an object creator 72, an inter-generation object relocator 82, and a generation heap scavenger 90. In the figure, components denoted by the same reference numeral as those of embodiment 1 are basically similar in construction to corresponding components, and thus description of such components are omitted. Now, description is given below to components having different construction.

The object creator 72 allocates, in response to creation of an object by an application program, a block of memory area to the object. Upon the allocation, the object creator 72 provides a one-bit area in the management information of the object. The one-bit area is for storing a reachability flag indicating whether the object is reachable from a root pointer directly or indirectly through another object.

In addition, when detecting that there is not sufficient memory available in a relevant generation heap to create an object, the object creator 72 instructs the generation heap scavenger 90 to perform the scavenging processing. The object is then created in a memory area that is made available by the scavenging processing.

The inter-generation object relocator 82 performs assignment of a local variable and a member variable. Detecting that assignment results in a reference from an object in an older generation heap to an object in a younger generation heap, the inter-generation object relocator 82 relocates the referenced object from the younger generation heap to the older generation heap. If detecting, upon relocating the object, there is not sufficient memory available in that older generation heap targeted to relocate the object, the inter-generation object relocator 82 instructs the generation heap scavenger 90 to perform the scavenging processing on the target generation heap as well as on all the generation heaps that are younger than that generation heap. Then, the inter-generation object relocator 82 stores the object to be relocated in a memory area made available in the target generation heap by the scavenging processing.

As described above, the generation heap scavenger 90 performs, upon the object creator 72 or the inter-generation object relocator 82 detects there is not sufficient memory available in a generation heap targeted for the processing, the scavenging processing on the target generation heap.

Figure 10:
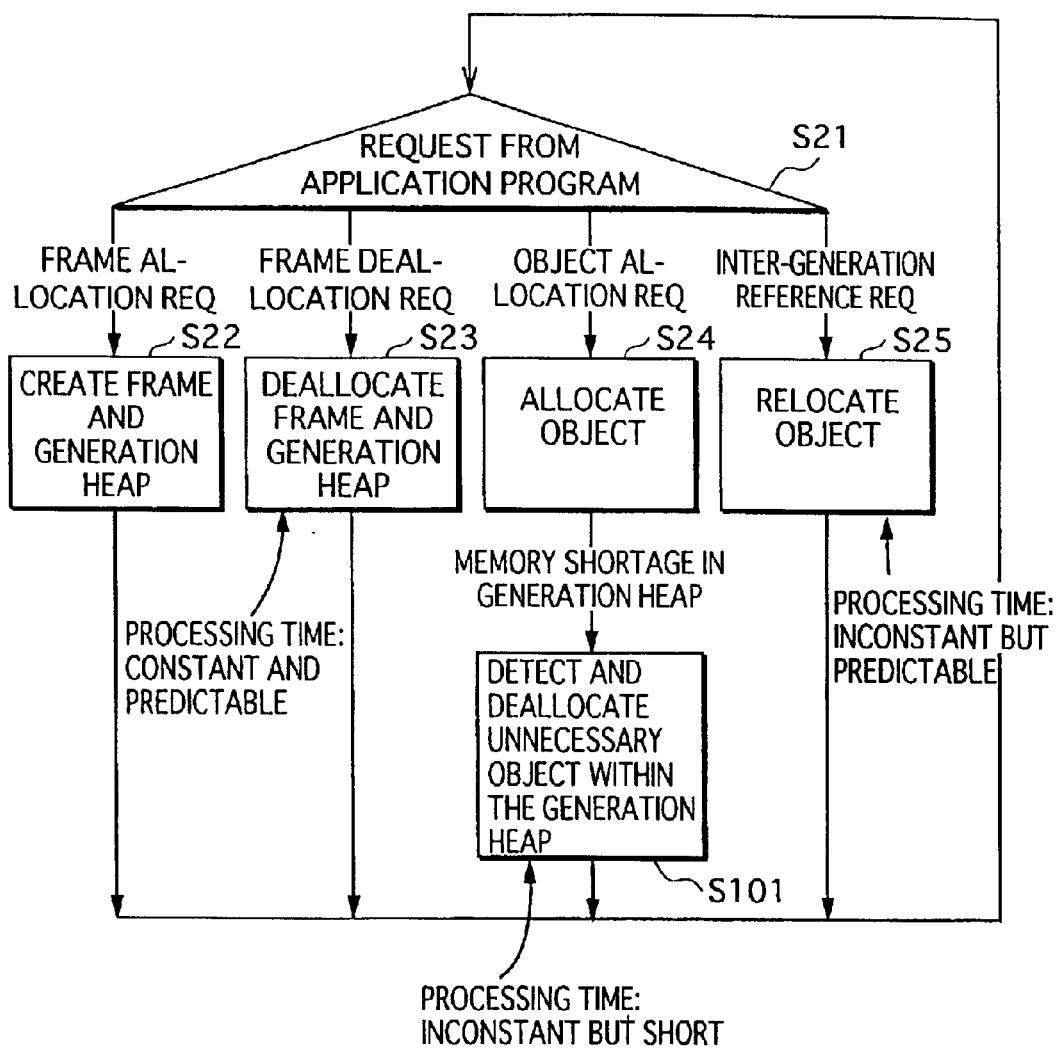
FIG. 10 is a flowchart showing the outline of processing performed by the garbage collector 200.

FIG. 10 is a flowchart showing the outline of processing performed by the garbage collector 200.

FIG. 10 is different from FIG. 2A in that a step S101 is added. To be more specific, the garbage collector 200 performs the scavenging processing upon detecting in the step S24 there is not sufficient memory available in a relevant generation heap to create an object. In the scavenging processing, the garbage collector 200 detects no longer referenced but not yet deallocated objects within the relevant generation heap, and deallocates the detected objects, so that available memory area increases.

Hereinafter, description is given in detail to the processing of the garbage collector 200.

Note that the processing similar to that of the embodiment 1 is not described, and description is given to processing different from the embodiment 1. In the flowchart mentioned below, steps bearing the same step numbers as those in the flowcharts of the embodiment 1 perform basically similar processing to corresponding steps.

Figure 11A:
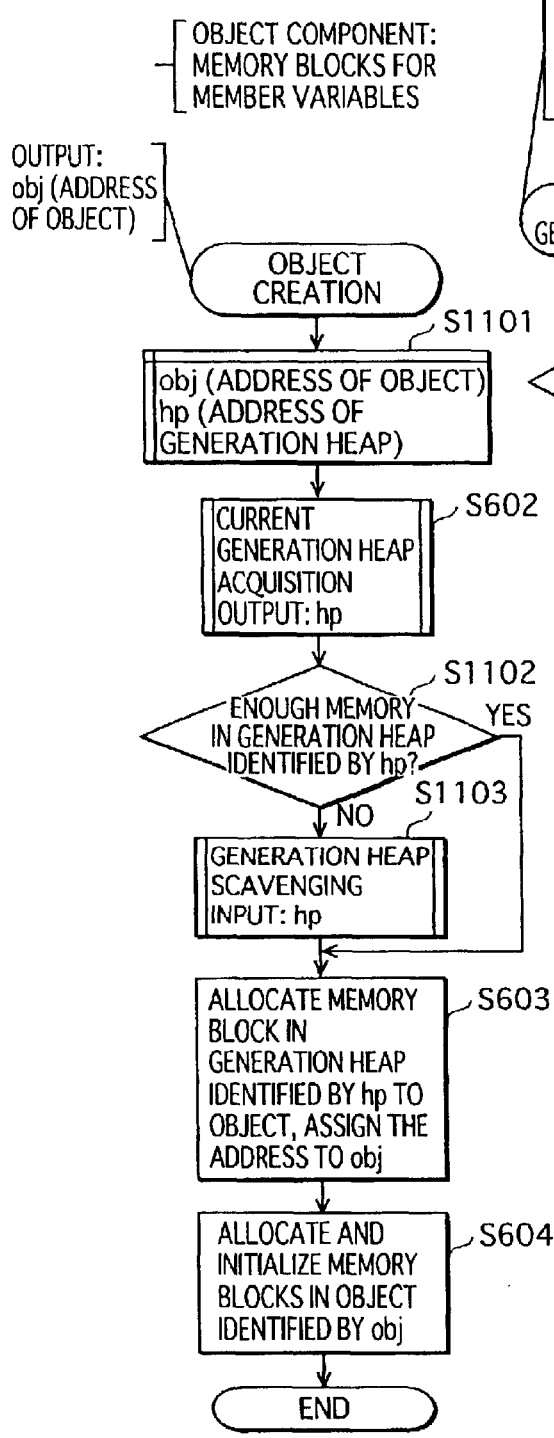
FIG. 11A is a view showing object creation processing performed by an object creator 72.

FIG. 11A shows object creation processing performed by the object creator 72.

The object creator 72 performs the object creation processing shown in FIG. 11A in place of the processing shown in FIG. 6A.

Step S1101: The object creator 72 defines a variable obj for storing the address of an object and a variable hp for storing the address of a generation heap.

Step S602: The object creator 72 calls the current generation heap acquisition processing shown in FIG. 6B so as to acquire the address of the generation heap that corresponds to a currently executed method.

Step S1102: The object creator 72 judges whether there is sufficient memory available in a generation heap specified by the address acquired in the step S602. The judgment may be made based on whether the available memory area is larger than a size of the object to be stored or than a predetermined threshold.

Step S1103: When it is judged, in the step S1102, there is not sufficient memory available, the object creator 72 calls the generation heap scavenging processing shown in FIG. 11C, so that the generation heap scavenger 90 performs the scavenging processing on the generation heap in which the object is to be created.

Step S603: The object creator 72 allocates, to the object, an available memory block within the generation heap, and assigns the address of the object to obj.

Step S604: The object creator 72 allocates, to member variables, memory blocks in the object specified by obj and initializes allocated blocks.

As described above, the object creator 72 judges, upon creating an object, whether there is sufficient memory available in a relevant generation heap to store the object. If there is no sufficient memory available, the object creator 72 calls the scavenging processing to increase the available memory area, so that the object is created in the generation heap.

Figure 11B:
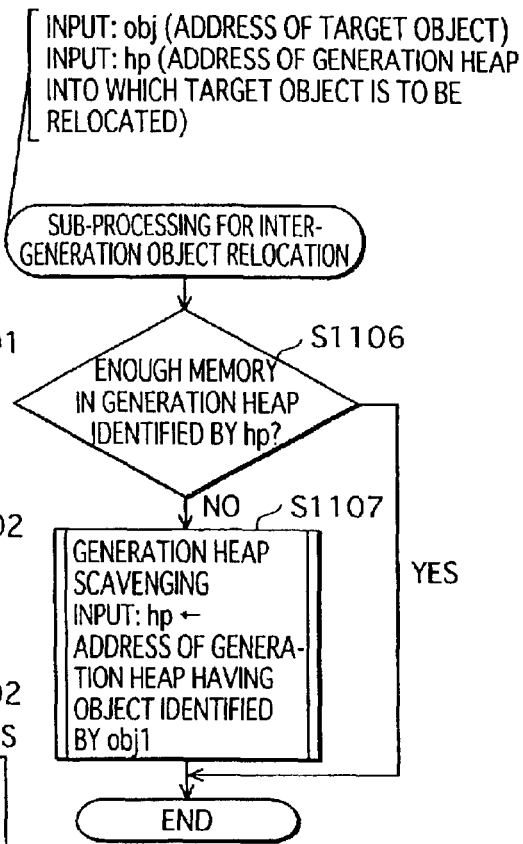
FIG. 11B is a view showing sub-processing for inter-generation object relocation.

FIG. 11B shows sub-processing for the inter-generation object relocation.

The inter-generation object relocator 82 first performs processing shown in FIGS. 7A, 7B, and 8A, and then performs, in the step S808 of FIG. 8A, the sub-processing shown in FIG. 11B for inter-generation object relocation processing in place of the sub-processing shown in FIG. 8B.

Step S1106: The inter-generation object relocator 82 judges whether there is sufficient memory available in the generation heap specified by hp, i.e., the generation heap to which the object is to be relocated. The judgment is made on a similar criterion to that of the step S1102.

Step S1107: If it is judged, in the step S1106, that there is not sufficient memory available, the inter-generation object relocator 82 calls the generation heap scavenging processing shown in FIG. 11C, so that the generation heap scavenger 90 performs the scavenging on the generation heap.

As described above, the inter-generation object relocator 82 judges, at the time of relocating an object, whether there is sufficient memory available in a relevant generation heap to relocate the object. If it is judged that there is no sufficient memory available, the inter-generation object relocator 82 calls the scavenging processing to increase the available memory, so that the object is relocated to the generation heap.

Figure 11C:
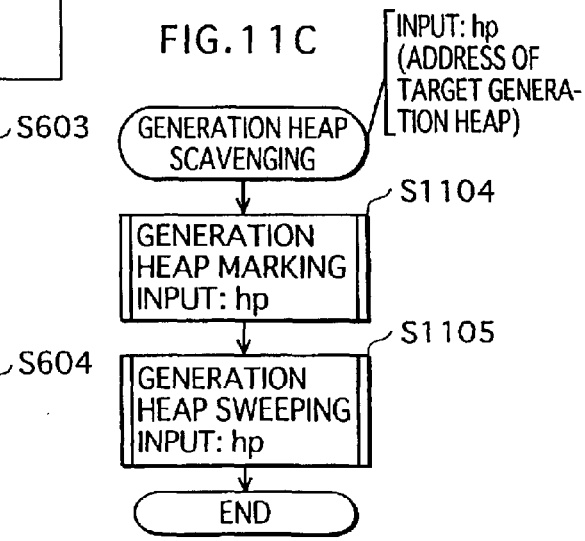
FIG. 11C is a view showing generation heap scavenging processing.

FIG. 11C shows the generation heap scavenging processing.

Step S1104: The generation heap scavenger 90 calls to perform the processing for generation heap marking shown in FIG. 12A.

Step S1105: The generation heap scavenger 90 then calls to perform the processing for generation heap sweeping shown in FIG. 13A.

The marking is processing performed on a target generation heap to trace references in order to mark all reachable objects by setting respective reachability flags from 0 to 1. The sweeping that follows is processing to collect all unmarked objects, i.e., to deallocate all objects whose reachability flags remain 0.

FIG. 12A shows the processing for the generation heap marking.

Step S1201: The generation heap scavenger 90 prepares a stack stk for storing the addresses of objects, and defines a variable wrk for storing the address of a generation heap, and variables obj and ptr each for storing the address of an object.

Step S602: The generation heaps scavenger 90 calls the current generation heap acquisition processing shown in FIG. 6B so as to acquire the address of the generation heap that corresponds to a currently executed method, and assigns the obtained address to wrk.

Step S1203: The generation heap scavenger 90 sets, to 0, flags of all objects in the generation heap specified by wrk, i.e., the generation heap corresponding to the currently executed method.

Step S1204: The generation heap scavenger 90 assigns, to wrk, a value of the parent pointer held in the generation heap specified by wrk.

Step S1205: The generation heap scavenger 90 repeats the steps S1203 and S1204 until wrk becomes equal to hp (the address of the generation heap targeted to the scavenging). By repeating the steps, flags of all objects in each generation heap younger than the target generation heap are set to 0.

Step S602: The generation heap scavenger 90 calls the current generation heap acquisition processing shown in FIG. 6B so as to acquire the address of the generation heap that corresponds to a currently executed method, and assigns the acquired address to wrk.

Step S1208: The generation heap scavenger 90 sequentially assigns, to obj, values of all local variables within the generation heap specified by wrk and repeats steps S1209 and S1210.

Step S1209: The generation heap scavenger 90 judges whether obj is a valid pointer to another object, i.e., whether the local variable is an address specifying another object.

Step S1210: When the judgment in the step S1209 results in affirmative, the generation heap scavenger 90 calls to execute the reachability flag marking shown in FIG. 12B.

Here, description is given to the reachability flag marking prior to describing the rest of the generation heap marking processing.

FIG. 12B is a view showing steps for the reachability flag marking.

Step S1220: The generation heap scavenger 90 judges whether the reachability flag held in an object specified by obj is 0.

Step S1221: When the judgment in the step S1220 results in affirmative, the generation heap scavenger 90 sets the reachability flag to 1.

Step S1222: The generation heap scavenger 90 pushes obj onto the stack stk. The stacked value is later used to trace an object referenced from the object specified by obj.

Now, description is back to FIG. 12A.

Step S1212: The generation heap scavenger 90 assigns, to wrk, a value of the parent pointer held in the generation heap specified by wrk.

Step S1213: The generation heap scavenger 90 repeats steps S1208–S1212 until wrk becomes equal to hp. By repeating these steps, the marking is performed on not only on the target generation heap but also ones in the generation heaps younger than the target generation heap, so that the reachability flag of each object in those generation heaps is set to 1 if the object is reachable from any local variable stored in the target generation heap.

Step S1214: The generation heap scavenger 90 pops a value from the stack stk and assigns the popped value to obj to repeat the steps S1214–S1210 until the stack stk becomes empty.

Step S1215: The generation heap scavenger 90 sequentially assigns to ptr, the values of all the member variables in the object specified by obj, and repeats processing of the steps S1215–S1218.

Step S1216: The generation heap scavenger 90 judges whether ptr is a valid pointer to another object.

Step S1210: When the judgment in the step S1216 results in affirmative, the generation heap scavenger 90 calls to execute the reachability flag marking shown in FIG. 12B.

By repeating the above steps S1214–S1219, the generation heap scavenger 90 sets, to 1, reachability flags of all objects that are reachable from any object whose reachability flag has been set to 1.

As described above, through the processing shown in FIGS. 12A and 12B, all the objects in the generation heap targeted to scavenging or in the younger generation heaps are set their reachability flags to 1 if they are reachable directly or indirectly from any local variable in the target generation heap.

Figure 13:
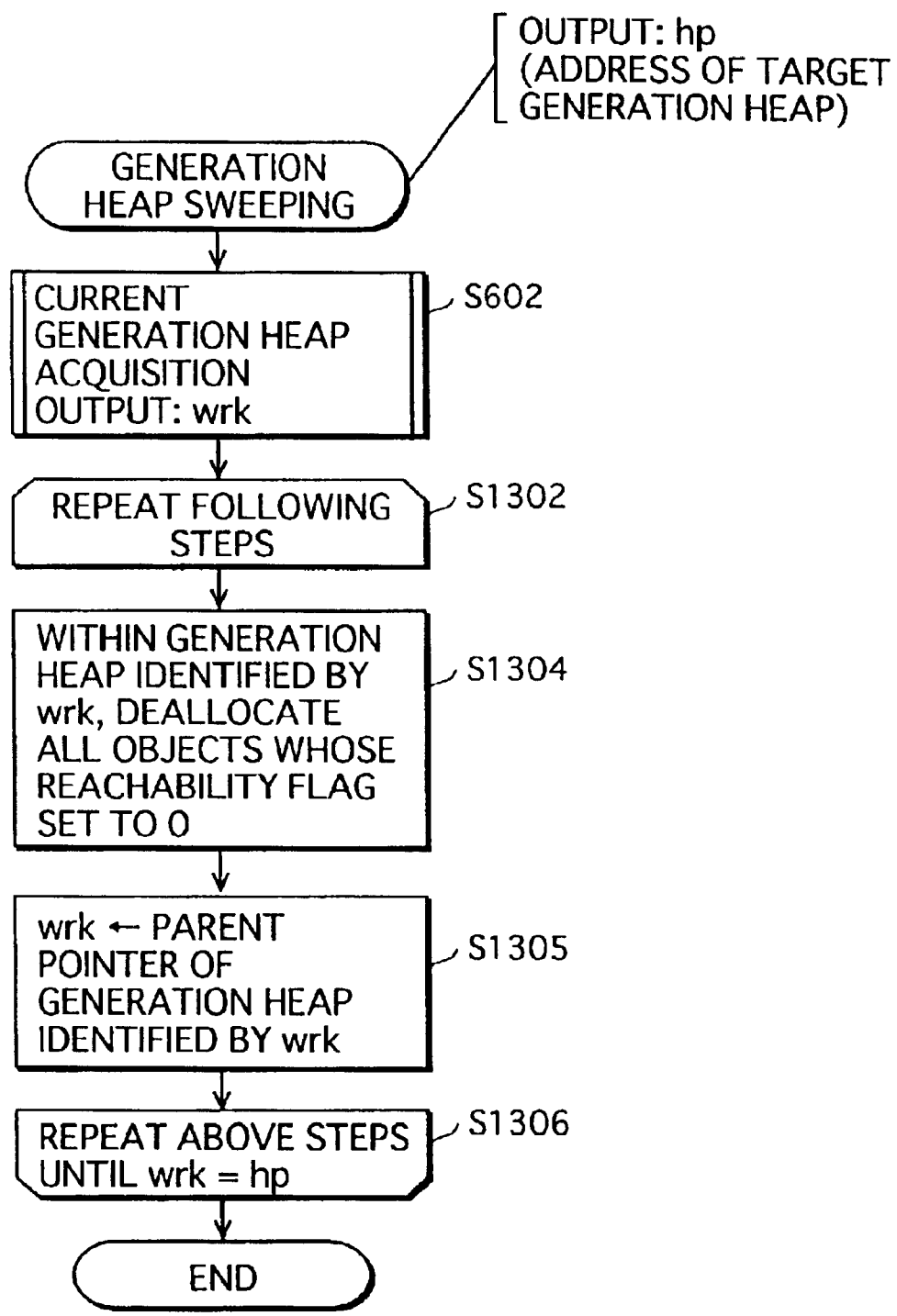
FIG. 13 is a view showing generation heap sweeping processing.

FIG. 13 shows the generation heap sweeping.

Step S602: The generation heap scavenger 90 calls the current generation heap acquisition processing shown in FIG. 6B so as to acquire the address of the generation heap that corresponds to a currently executed method, and assigns the obtained address to wrk.

Step S1304: The generation heap scavenger 90 deallocates all unmarked objects (i.e., objects whose reachability flags are set to 0) in the generation heap specified by wrk.

Step S1305: The generation heap scavenger 90 assigns to wrk, the value of the parent pointer held in the generation heap specified by wrk.

Step 1306: The steps S1302–1306 are repeated until wrk becomes equal to hp.

By repeating the steps S1302–S1306, the generation heap scavenger 90 deallocates all the objects that are no longer referenced from any local variable in the generation heap targeted to the scavenging and the younger generation heaps.

Consequently, only objects remain in those generation heaps are the objects that are reachable directly or indirectly from at least one of the local variables. As a result, the available memory increases.

As described above, the garbage collector 200 according to the embodiment 2 has, in addition to the function of the garbage collector 100 according to the embodiment 1, the function to perform scavenging processing when creation or relocation of an object can not be carried out due to insufficient memory in a relevant generation heap. The scavenging processing deallocates unneeded objects in the relevant generation heap and younger generation heaps. Consequently, the available memory area is increased, so that the creation or relocation of the object is performed. The scavenging processing is performed on relatively young generation heaps rather than the entire memory area, and thus the processing time is relatively short. With the above advantage, the garbage collector 200 is suitably applied to a highly-responsive application program.

<Embodiment 3>

Hereinafter, description is given to a garbage collector according to an embodiment 3 of the present invention.

In addition to the function of the garbage collector 200, the garbage collector of the embodiment 3 has a function to relocate, to an older generation heap, objects not deallocated through the scavenging processing shown in FIG. 11C.

Figure 14:
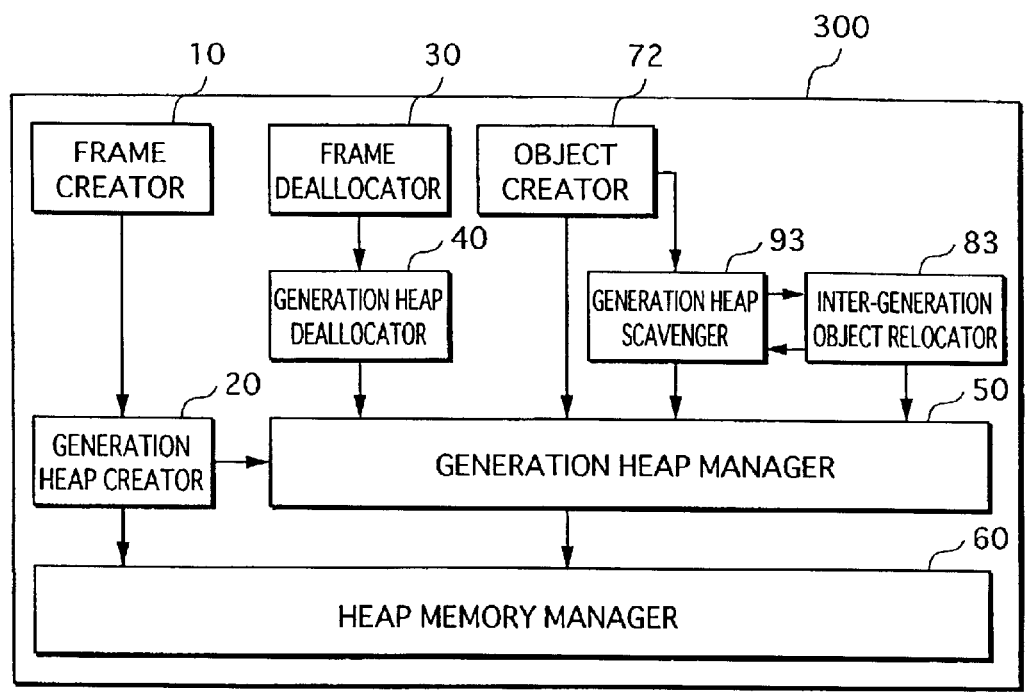
FIG. 14 is a view showing the construction of a garbage collector 300 according to an embodiment 3.

FIG. 14 is a view showing the construction of a garbage collector 300 according to the embodiment 3.

In the figure, the garbage collector 300 is composed of the frame creator 10, the generation heap creator 20, the frame deallocator 30, the generation heap deallocator 40, the generation heap manager 50, the heap memory manager 60, the object creator 72, a generation heap scavenger 93, and an inter-generation object relocator 83.

The components denoted by the same reference numeral as those shown in FIGS. 1 and 9 are basically similar in construction to corresponding components, and thus description of such components are omitted. Now, description is given below to components having different construction.

Similarly to the inter-generation object relocator 82 of the embodiment 2, the inter-generation object relocator 83 performs such processing as assignment of values to local variables and member variables, relocation of an object, invocation of the generation heap scavenging processing. In addition, the inter-generation object relocator 83 relocates objects that are not deallocated by the scavenging processing to a generation heap that is one generation older.

Similarly to the generation heap scavenger 90 of the embodiment 2, the generation heap scavenger 93 performs the generation heap scavenging processing. In addition, the generation heap scavenger 93 calls, during execution of the scavenging, the inter-generation object relocation processing performed by the inter-generation object relocator 83.

Hereinafter, description is given in detail to the processing of the garbage collector 300.

Note that description of the similar processing to that of embodiments 1 and 2 is omitted, and description is given below mainly to different processing. In the flowchart mentioned below, steps bearing the same step numbers as those in the flowcharts of the embodiments 1 and 2 are basically similar to corresponding steps.

Figure 15:
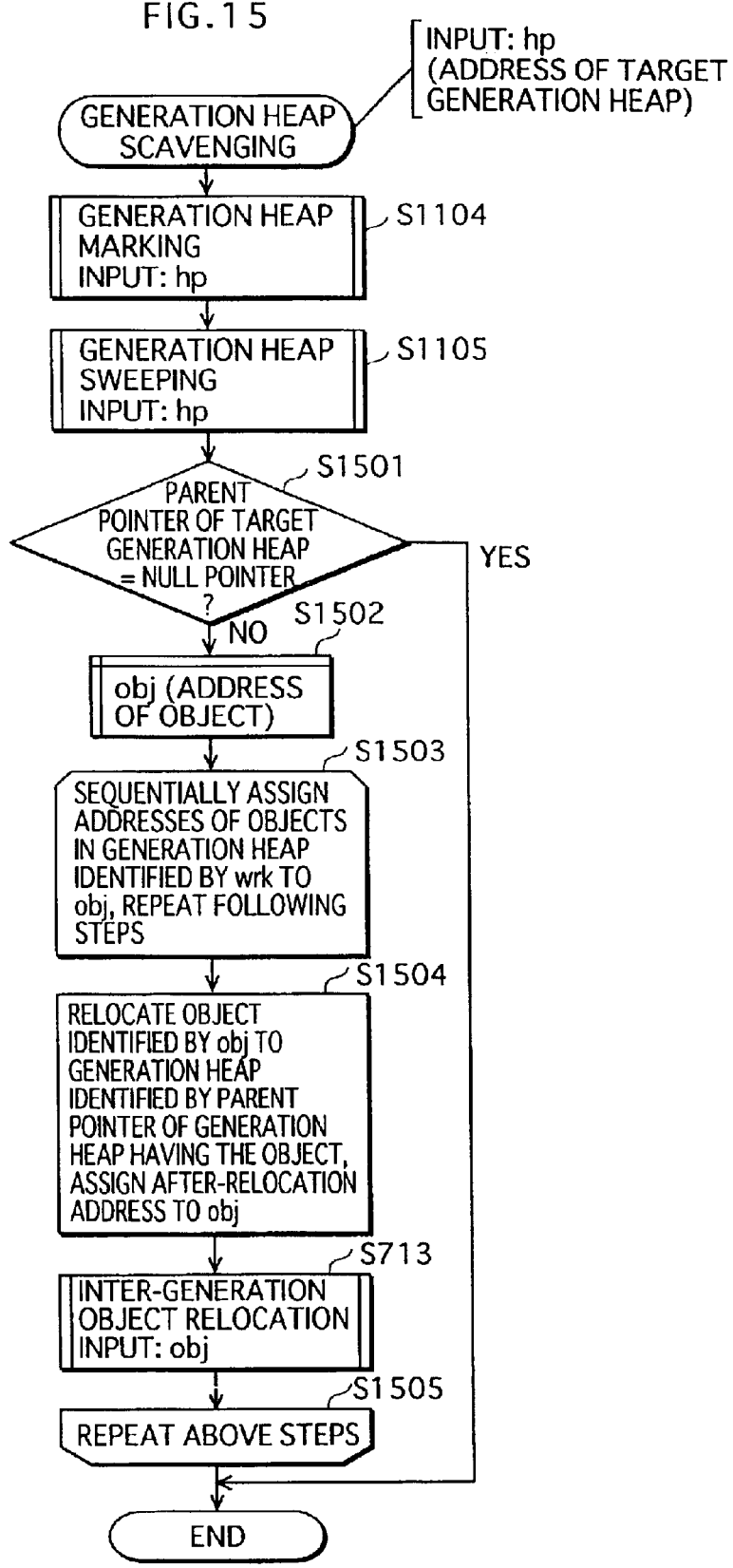
FIG. 15 is a view showing generation heap scavenging processing performed by a generation heap scavenger 93.

FIG. 15 shows the processing of generation heap scavenging performed by the generation heap scavenger 93.

In response to a call made in the processing shown in FIG. 11A or 11B, the generation heap scavenger 93 performs the generation heap scavenging processing shown in FIG. 15 in place of the processing shown in FIG. 11C.

Step S1104: The generation heap scavenger 93 calls to execute the generation heap marking shown in FIG. 12A.

Step S1105: The generation heap scavenger 93 calls to execute the processing for generation heap sweeping shown in FIG. 13.

Step S1501: The generation heap scavenger 93 judges whether the parent pointer held in the generation heap specified by hp, i.e., the generation heap targeted to the scavenging, is a NULL pointer. If the judgment results in affirmative, it means that there is no heap generation older than the one specified by hp. Thus, the scavenging is terminated.

Step S1502: If the judgment in the step S1501 results in negative, on the other hand, objects in the target generation heap are to be relocated to an older generation heap. In preparation for the relocation, the generation heap scavenger 93 defines a variable obj for storing the address of an object.

Step S1503: The generation heap scavenger 93 sequentially assigns the addresses of all objects in the generation heap specified by wrk to obj, and repeats the steps S1503–S1505.

Step S1504: The generation heap scavenger 93 relocates an object specified by obj to a generation heap corresponding to the parent pointer held in the generation heap that the object is currently located. The generation heap scavenger 93 then assigns the new address of the object to obj.

Step S713: The generation heap scavenger 93 performs the inter-generation object relocation processing shown in FIG. 8A. Here, during execution of the inter-generation object relocation processing, the processing shown in FIG. 11B may be performed in place of the processing shown in FIG. 8B.

By repeating the steps S1502–S1505, each object that is not deallocated through the marking and sweeping processing is now relocated to a generation heap that is one generation older than the currently stored generation heap.

To be noted here that the generation heap scavenging shown in FIG. 15 is the processing locally performed only on relatively young generation heaps, which requires a relatively short processing time. In addition, the generation heap scavenging processing shown in FIG. 15 is performed only during execution of a method corresponding to the generation heap targeted to the scavenging. That is, the garbage collector 300 according to the present embodiment interrupts an application program only shortly, and the time at which such an interruption occurs is predictable. Thus, the garbage collector of the present embodiment is suitably applied to a highly-responsive application program.

<Embodiment 4>

Now, description is given to a garbage collector according to an embodiment 4 of the present invention.

The garbage collector of the embodiment 4 has, in addition to the function of the garbage collector 100 of the embodiment 1, a function of performing reference counting. The reference counting is processing to keep, for each object, a count of reference to the object, and to deallocate the object when the reference count falls to 0.

Figure 16:
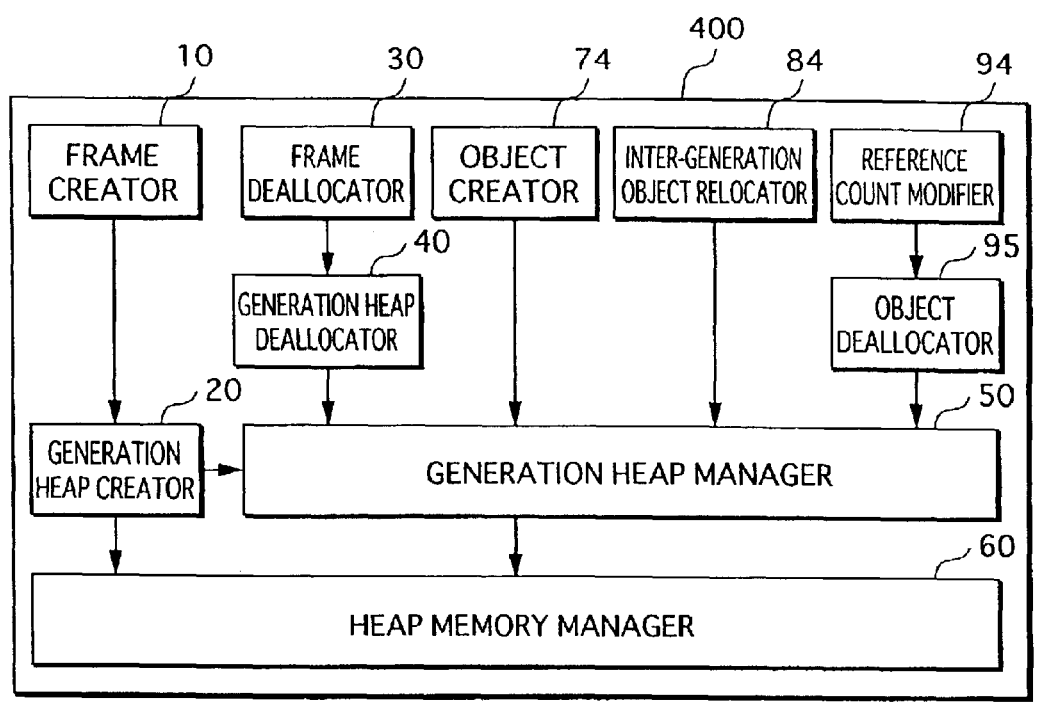
FIG. 16 is a view showing the construction of a garbage collector 400 according to an embodiment 4.

FIG. 16 is a view showing the construction of a garbage collector 400 according to the embodiment 4.

In the figure, the garbage collector 400 is composed of the frame creator 10, the generation heap creator 20, the frame deallocator 30, the generation heap deallocator 40, the generation heap manager 50, the heap memory manager 60, an object creator 74, an inter-generation object relocator 84, a reference count modifier 94, and an object deallocator 95. In the figure, components denoted by the same reference numerals as those of embodiment 1 are basically similar in construction to corresponding components, and thus description of such components are omitted. Now, description is given below to components having different construction.

The object creator 74 allocates, when an object is created during execution of the application program, a memory block for the object. At the time of the allocation, the object creator 74 also provides in, management information held in the object, an area of for keeping a reference count. A reference count (also referred to as "reference counter") is a value showing how many references there are to the object.

The inter-generation object relocator 84 assigns values to member variables of objects and local variables in each generation heap. Upon detecting a reference from an object in an older generation heap to an object in a younger generation heap as a result of value assignment, the inter-generation object relocator 84 relocates the referenced object from the younger generation heap to the older generation heap.

Further, each time a reference relationship is modified, the inter-generation object relocator 84 instructs the reference count modifier 94 to modify a reference count so that the reference count is consistent with the modified reference relationship.

The reference count modifier 94 modifies a reference count of each object each time a reference to the object is modified due to value assignment to a local variable or a member variable or due to deallocation of an object referencing the object. When the reference counter of an object falls to 0, the reference count modifier 94 instructs the object deallocator 95 to deallocate the object.

The object deallocator 95 deallocates an object whose reference count falls to 0. At the time of deallocation, in addition, the object deallocator 95 instructs the reference count modifier 94 to modify a reference count so as to reflect the change resulting from the deallocation of the object.

Hereinafter, description is given in detail to the processing of the garbage collector 400.

Note that description to the similar processing to that of embodiments 1, 2, and 3 is omitted, and description is given below mainly to different processing.

Figure 17:
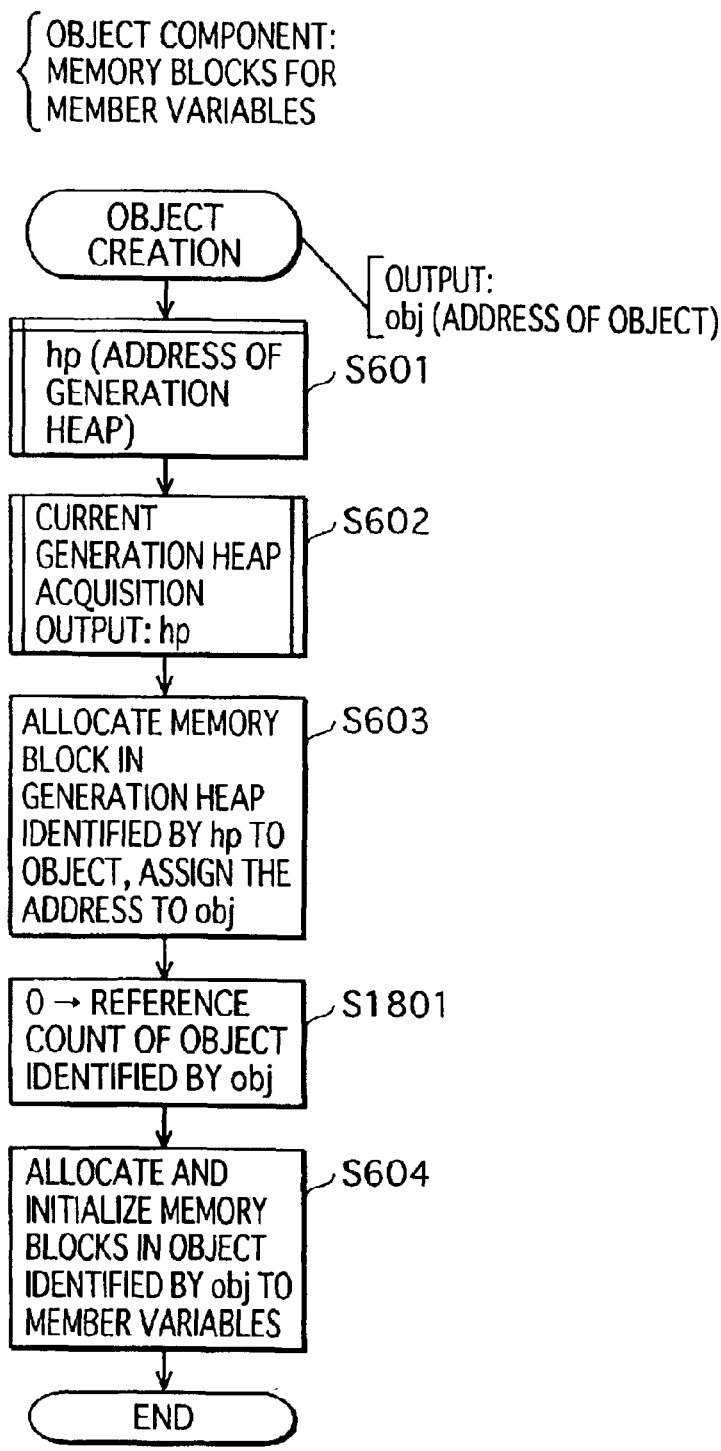
FIG. 17 is a view showing object creation processing performed by an object creator 74.

FIG. 17 is a view showing the object creation processing performed by the object creator 74. The object creator 74 performs the processing shown in FIG. 17 in place of the processing shown in FIG. 6A.

Step S601: The object creator 74 defines a variable hp for storing the address of a generation heap.

Step S602: The object creator 74 calls the current generation heap acquisition processing shown in FIG. 6B so as to acquire the address of a generation heap corresponding to the currently executed method.

Step S603: The object creator 74 allocates, to an object, an available block of generation heap specified by the acquired address, and assigns the address of the object to obj.

Step S1801: The object creator 74 sets the reference count of the object specified by obj to 0.

Step S604: The object creator 74 allocates, to member variables, memory blocks in the object specified by obj and initializes allocated blocks.

Figure 18A:
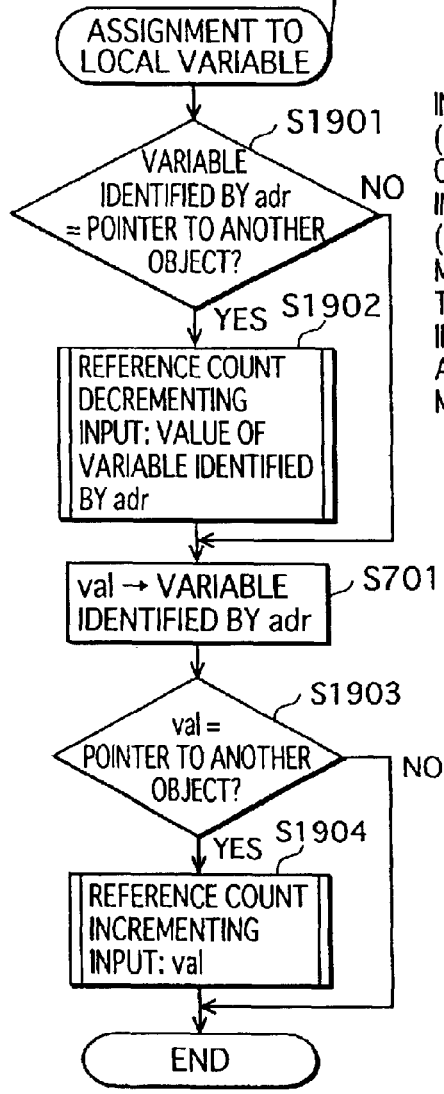
FIG. 18A is a view showing local variable assignment processing performed by an inter-generation object relocator 84.

FIG. 18A shows processing performed by the inter-generation object relocator 84 to assign a value to a local variable.

Step S1901: The inter-generation object relocator 84 judges, when it is requested by the application program to assigns a value val to a local variable, whether the current value of the local variable specified by adr is a pointer to another object. The variable adr is the address of the local variable to which val is to be assigned. Naturally, the local variable is in the generation heap corresponding to the frame for a currently executed method. In short, the step S1901 is to judge, prior to newly assigning the value val, whether the value currently stored in the local variable is a pointer.

Step S1902: When the judgment in the step S1901 results in affirmative, the inter-generation object relocator 84 instructs the reference count modifier 94 to perform the reference count decrement processing shown in FIG. 19A. This processing is to decrement the reference count of the object according to the decrement in the pointer to the object, and to deallocate the object if it is no longer referenced from any other object. That is, in the steps S1901 and S1902, respectively, the reference counter of an object is modified and the object is deallocated according to the change in the reference relationship rustling directly or indirectly from overwriting of a pointer currently stored in a local variable with a value to be newly assigned.

Step S701: The inter-generation object relocator 84 assigns the value val to the local variable after modifying, when the current value of the local variable is a pointer, the reference relationship resulting from the pointer.

Step S1903: The inter-generation object relocator 84 judges whether val is a pointer to another object.

Step S1904: When the judgment in the step S1903 results in affirmative, the inter-generation object relocator 84 instructs the reference count modifier 94 to perform the reference count increment processing shown in FIG. 19B. The reference count increment processing is to increment the reference count of an object in accordance with a new reference to the object. In other words, in the steps S1903 and S1904, when a value to be newly assigned to a local variable is a pointer, the reference count of the object referenced by the pointer is incremented by 1 to be consistent with the new reference.

Figure 18B:
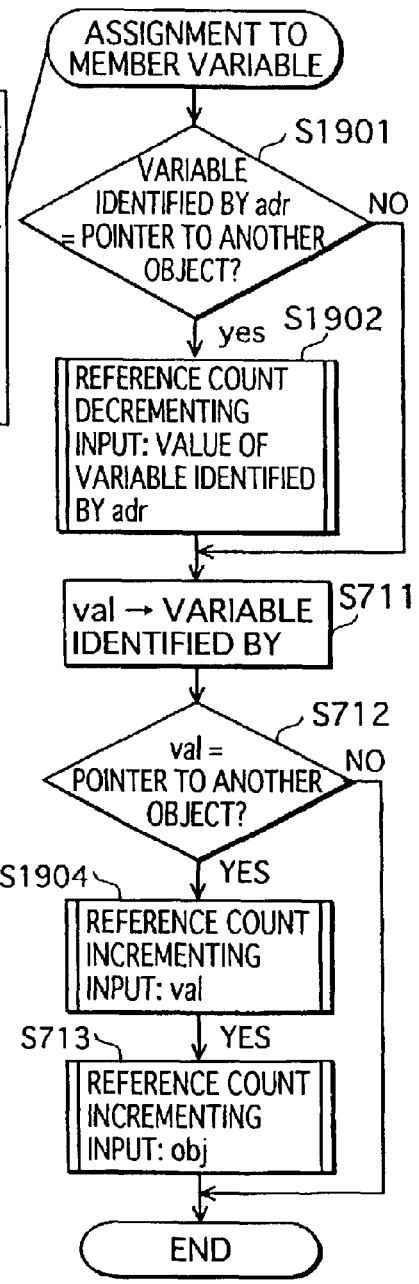
FIG. 18B is a view showing member variable assignment processing performed by the inter-generation object relocator 84.

FIG. 18B shows processing performed by the inter-generation object relocator 84 to assign a value to a member variable.

Step S1901: The inter-generation object relocator 84 judges, when it is requested by the application program to assigns a value val to a member variable, whether the current value of the member variable specified by adr is a pointer to another object. The variable adr is the address of the member variable to which val is to be assigned. Naturally, the member variable is in the object to which val is to be assigned and which is specified by obj. In short, the step S1901 is to judge, prior to newly assigning the value val, whether the value currently stored in the member variable is a pointer.

Step S1902: When the judgment in the step S1901 results in affirmative, the inter-generation object relocator 84 instructs the reference count modifier 94 to perform the reference count decrement processing shown in FIG. 19A.

Step S711: The inter-generation object relocator 84 assigns the value val to the member variable.

Step S712: The inter-generation object relocator 84 judges whether val is a pointer to another object.

S1904: When the judgment in the step S712 results in affirmative, the inter-generation object relocator 84 instructs the reference count modifier 94 to perform the reference count increment processing shown in FIG. 19B.

Step S713: The intergeneration object relocator 84 performs the inter-generation object relocation processing shown in FIG. 8A.

Figure 19A:
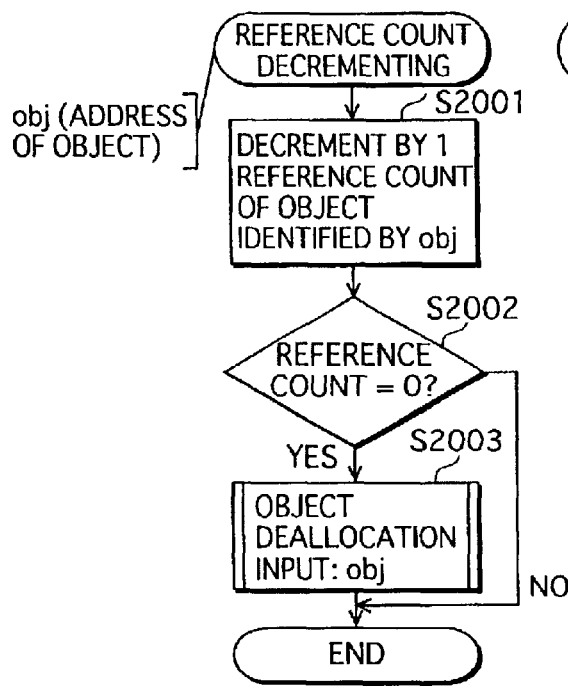
FIG. 19A is a view showing reference count decrement processing performed by a reference count modifier 94.

FIG. 19A shows the reference count decrement processing performed by the reference count modifier 94.

Step S2001: The reference count modifier 94 decrements, in response to an input of obj representing the address of an object, the reference count of the object specified by obj by 1. Here, the value of obj is a pointer stored in the variable (the local variable in the case of the step S1902 shown in FIG. 18A and the member variable in the case of the step S1902 shown in FIG. 18B) before val is newly assigned thereto.

Step S2002: The reference count modifier 94 judges whether the reference count of the object specified by obj falls to 0 as a result of the processing performed in the step S2001.

Step S2003: When the reference count is judged to be 0, the reference count modifier 94 instructs the object deallocator 95 to perform the object deallocation processing shown in FIG. 20, so that the object whose reference count falls to 0 is deallocated.

Figure 19B:
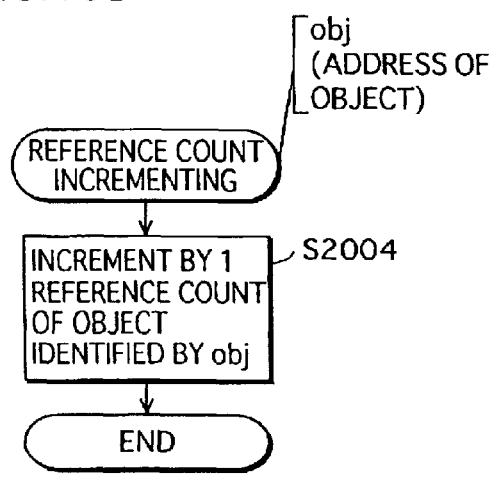
FIG. 19B is a view showing reference count increment processing performed by the reference count modifier 94.

FIG. 19B shows reference count increment processing performed by the reference count modifier 94.

Step S2004: The reference count modifier 94 increments the reference count specified by obj by 1. Here, the value of obj is a pointer to be newly assigned to the local variable in the case of the step S1904 shown in FIG. 18A, and to the member variable in the case of the step S1904 shown in FIG. 18B.

Figure 20:
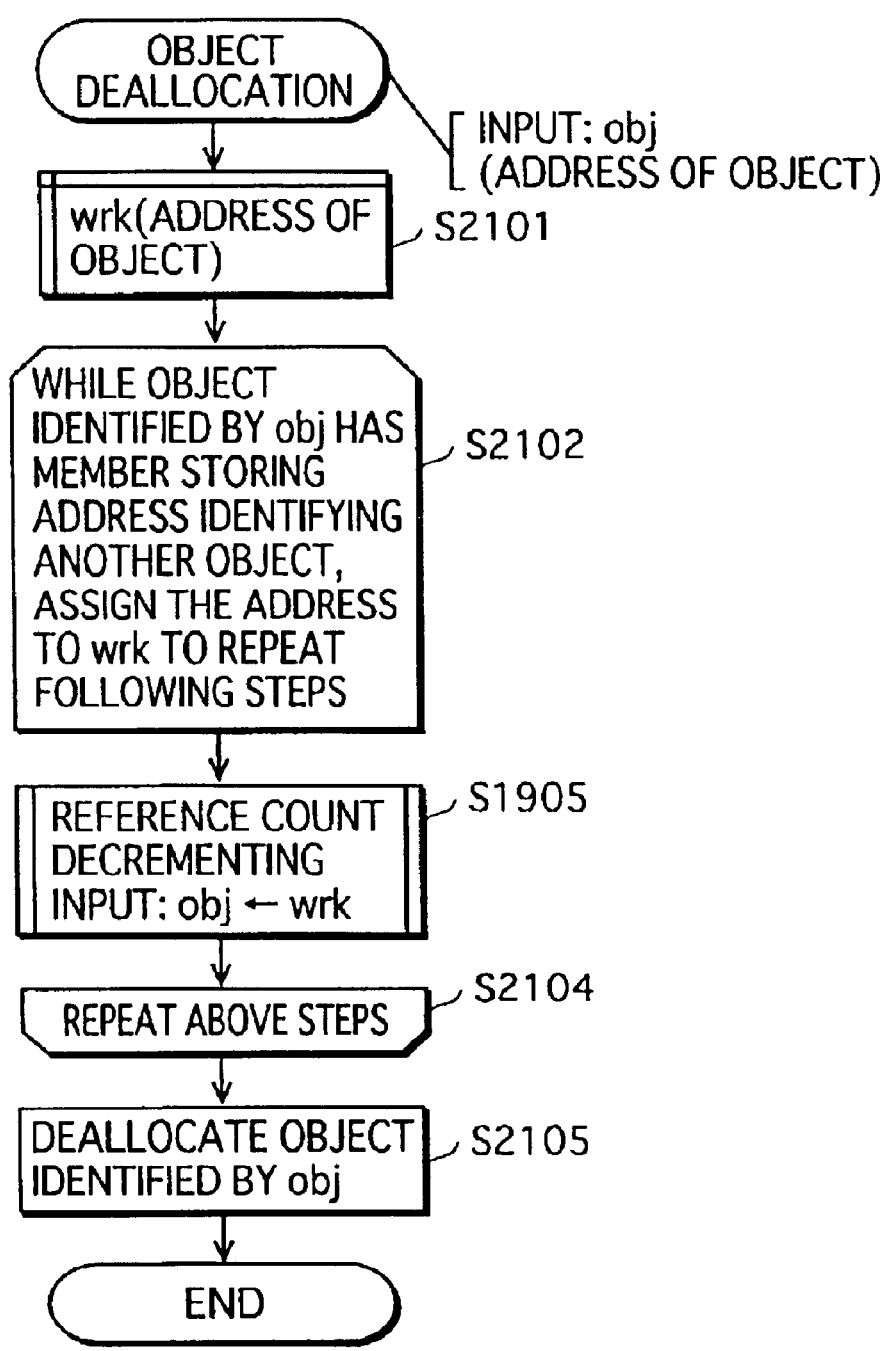
FIG. 20 is a view showing object deallocation processing performed by an object deallocator 95.

FIG. 20 shows the object deallocation processing performed by the object deallocator 95.

Step S2101: The object deallocator 95 defines a variable wrk for storing the address of an object.

Step S2102: As long as there is a member, in the object specified by obj, storing an address of another object, the object deallocator 95 assigns the address of another object to wrk, and repeats the step S1904.

Step S1904: The object deallocator 95 instructs the reference count modifier 94 to execute the reference count decrement processing shown in FIG. 19A.

Step S2105: The object deallocator 95 deallocates the object specified by obj.

As described above, the garbage collector 400 according to the embodiment 4 has an advantageous feature of deallocating an object to make it available for reuse immediately upon the object becomes unnecessary.

<Embodiment 5>

Hereinafter, description is given to a garbage collector according to an embodiment 5 of the present invention.

First of all, description is given to one possible setback of the reference counting system. The garbage collector 400 employing the reference counting system may fail to deallocate objects that are no longer reachable from any root pointer if the objects have references forming a loop structure and the objects thus have a non-zero reference count. To address this limitation, the garbage collector of the embodiment 5 has a construction into which the garbage collectors 200 and 400 shown in FIGS. 9 and 16, respectively are incorporated, so that the garbage collector of this embodiment performs garbage collection by both the reference counting system and the mark-and-sweep system.

To be more specific, although not illustrated, the garbage collector of the embodiment 5 is composed of a frame creator, a generation heap creator, a frame deallocator, a generation heap deallocator, a generation heap manager, a heap memory manager, an object creator, an inter-generation object relocator, a generation heap scavenger, a reference count modifier, and an object deallocator.

Among the above components, the frame creator, the generation heap creator, the frame deallocator, the generation heap deallocator, the generation heap manager and the heap memory manager are basically similar in construction to corresponding components of the garbage collectors 200 and 400. Further, the reference count modifier and the object deallocator are basically similar in construction to corresponding components of the garbage collector 400. Still further, the generation heap scavenger is basically similar in construction to a corresponding component of the garbage collector 200.

On the other hand, the object creator and the inter-generation object relocator respectively have combined functions of their corresponding components of the garbage collectors 200 and 400, namely of the object creators 72 and 74, and the inter-generation object relocators 82 and 84.

Accordingly, the object creator of the embodiment 5 allocates a block of memory area to the object when the application program creates an object. At the time of allocation, the object creator also provides in the management information of the object, an area for storing a reference count and another area for storing a reachability flag. When detecting that there is no sufficient memory in a relevant generation heap to create the object, the object creator then instructs the generation heap scavenger to perform the scavenging on the relevant generation heap to make more memory area available, so that the object is created in the generation heap.

Further, the inter-generation object relocator of the embodiment 5 assigns values to member variables of objects and local variables in each generation heap. Upon detecting that assignment to a member variable results in a reference from an object in an older generation heap to an object in a younger generation heap, the inter-generation object relocator relocates the referenced object from the younger generation heap to the older generation heap. Still further, the inter-generation object relocator instructs the reference count modifier to modify the reference count of a relevant object according to the modification of the reference relationship and to deallocate an object, if any, that is no longer referenced from any object. Upon detecting there is no sufficient memory available in a relevant generation heap to relocate an object, the inter-generation object relocator instructs the generation heap scavenger to perform the scavenging on the relevant generation heap so as to increase the available memory area. Consequently, the object is relocated to the generation heap.

Figure 21:
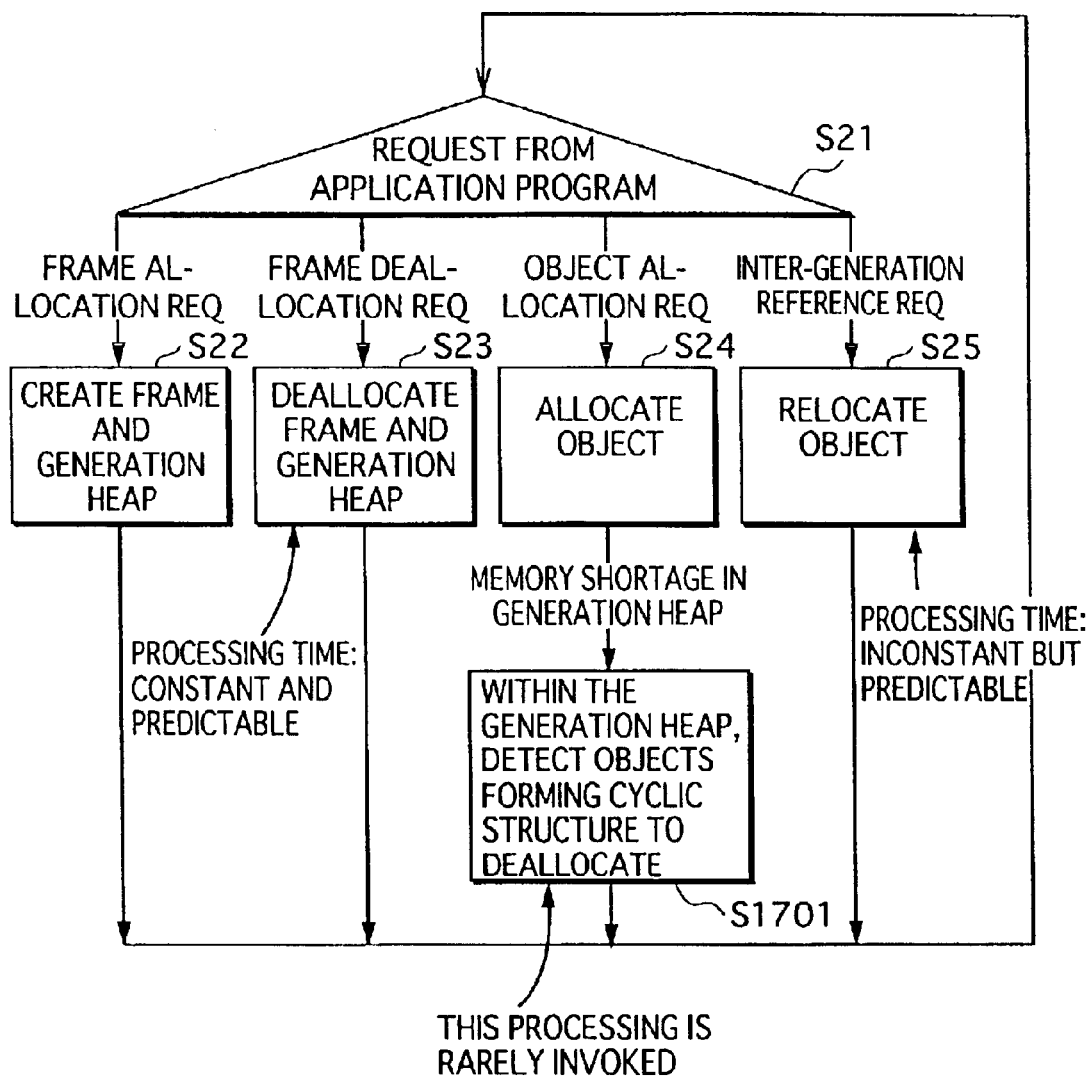
FIG. 21 is a view showing the outline of operations of a garbage collector 400.

FIG. 21 shows operations of the garbage collector according to the embodiment 5.

In the figure, the steps S21, S22, and S23 are similar to corresponding steps of the embodiment 1.

In the step S24, the object creator creates, in a corresponding generation heap, an object having an area for storing a reference count and an area for storing a reachability flag. In the case where the object can not be created because there is no sufficient memory available in the generation heap, the processing moves onto the step S1701. In the step S1701, the generation heap scavenger performs the marking followed by the sweeping on the generation heap.

In the step S25 that follows, the inter-generation object relocator performs value assignment to variables and resulting object relocation processing. In according with the processing performed, the reference count modifier modifies the reference count of an object and deallocation of an object as necessary. In the case where an object can not be relocated as there is no sufficient memory available in a relevant generation heap to relocate the object, the processing moves onto the step S1701.

As described above, deallocation of unnecessary objects is performed based on the reference counting system in addition to the mark-and-sweep system. To be more specific, an object is deallocated in the steps S24 and S25 by the reference counting upon the reference count falls to 0, and objects that are part of a cyclic data structure are deallocated in the step S1701 that is performed when the available memory area in a generation heap falls short. Note that the step S1701 is performed only when there is not sufficient memory area, which occurs rarely as the steps S24 and S25 are performed on each applicable occasion to deallocate objects based on the reference counting system. Further, the step S1701 is performed only on relatively younger generation heaps, so that the processing time is relatively shorter than the processing performed on the entire memory area. Still further, although description thereof is omitted, other processing similar to the one performed in the embodiment 1 is completed within a relatively short time, and the processing time is predictable. Accordingly, the garbage collector of the embodiment 5 is suitably applied to an application program that needs to be highly responsive.

<Embodiment 6>

A garbage collector of an embodiment 6 relocates, after the step S1701 similarly to the garbage collector 300 of the embodiment 3, objects that are note deallocated in the step S1701 to a generation heap that is one generation older than a current generation heap.

<Embodiment 7>

Hereinafter, description is given to a garbage collector according to an embodiment 7 of the present invention.

The garbage collector of this embodiment differs from each garbage collector according to the embodiments above in the following respect. Unlike the garbage collectors each constructed to create an object in a corresponding generation heap that is created for each method called, the garbage collector of the embodiment 7 creates an object in a separate memory area (hereinafter, referred to as entity memory) from generation heaps, and creates a pointer to that object in a corresponding, generation heap.

Figure 28A:
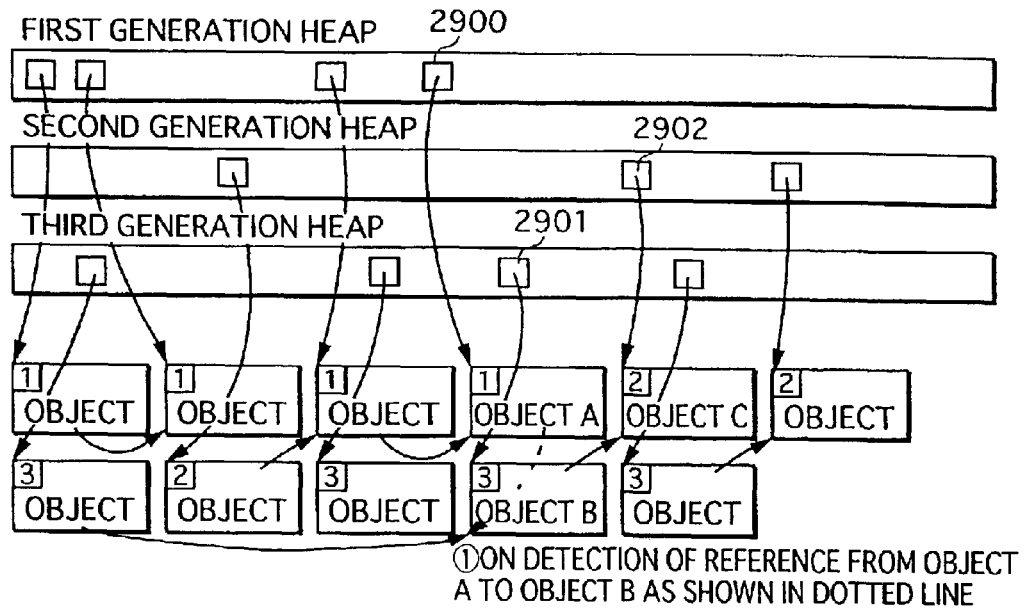
FIG. 28A is a view showing one example of a memory structure of the garbage collector according to the embodiment 7.
Figure 28B:
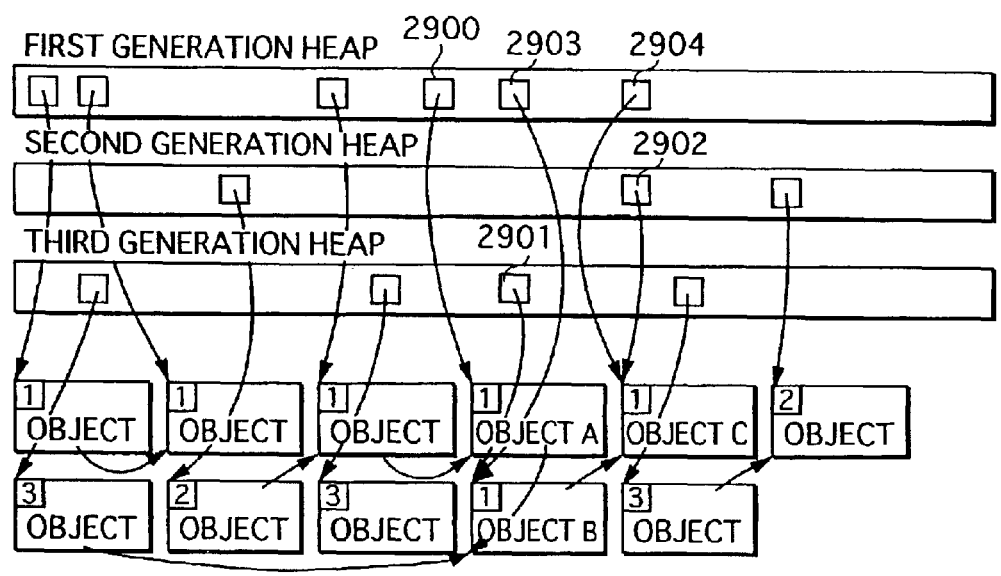
FIG. 28B is a view showing the memory structure of the example in FIG. 28A after pointer copying.

FIGS. 28A and 28B show one example of the memory structure of the garbage collector according to the embodiment 7.

In FIG. 28A, the garbage collector first creates a frame (not illustrated) as the work area for a first method in response to a call to the first method, and then creates a first generation heap corresponding to the frame. Then, the garbage collector allocates blocks of the first generation heap for local variables (not illustrated) as well as for pointers to objects, and initialize each block.

When a second method is called during execution of the first method, the garbage collector, in a similar manner to the above, cerates a frame (not illustrated) and a second generation heap, and then allocates blocks of the second generation heap for local variables (not illustrated) and for pointers to objects, followed by initialization of each allocated block.

Further, when a third method is called during execution of the second method, the garbage collector, in a similar manner to the above, cerates a frame (not illustrated) and a third generation heap, and then allocates blocks of the third generation heap for local variables (not illustrated) and for pointers to objects, followed by initialization of each allocated block. Here, each object has an area for storing a generation number identifying a generation heap in which a pointer to the object is stored. In FIGS. 28A and 28B, the generation number is shown in an upper-left corner of each object.

As described above, a generation heap is created as necessary. When an object is created during execution of a method, the object is stored in the entity memory, and what is stored in a generation heap corresponding to the method is a pointer to the object.

Upon detecting a reference from an object specified by a pointer in an older generation heap to an object specified by a pointer in a younger generation heap, the pointer corresponding to the referenced object is copied from the younger generation heap to the older generation heap.

Next, description is given concretely to the copy processing.

In FIG. 28A, a pointer 2900 in the first generation heap specifies an object A stored in the entity memory, a pointer 2901 in the third generation heap specifies an object B in the entity memory, and a pointer 2902 in the second generation heap specifies an object C stored in the entity memory. Further, the object A has a reference to the object B, and the object B has a reference to the object C (in the figure, each reference is shown by a dotted arrow).

When there is such reference relationship, the reference from the object A to the object B is a reference from the object specified by the pointer 2900 in the first generation heap to the object specified by the pointer 2901 in the third generation heap, which means the reference is from an older generation heap to a younger generation heap. Upon detecting such a reference, the garbage collector copies the value of the pointer in the younger generation heap to the older generation heap. In other words, the value of pointer 2901 specifying the object B is copied from the third generation heap to the first generation heap. In FIG. 28A, a pointer 2903 in the first generation heap is a replication of the pointer 2901. Upon copying, the generation number stored in the object B is modified from "3" to "1" to be consistent with the pointer copied to the first generation heap.

As a result of creating a replication, which is the pointer 2903, of the pointer 2901, the reference from the object B to the object C is now a reference from the object B specified by the pointer 2903 in the first generation heap to the object C specified by the pointer 2902 in the second generation heap, in addition to a reference from the object B specified by the pointer 2901 in the third generation heap to the object C specified by the pointer 2902 in the second generation heap. Accordingly, the copying of the pointer specifying the object B causes change in the reference relationship between the objects B and C, so that there is another reference from an object specified by a pointer in an older generation heap to an object specified by a pointer in a younger generation heap. Thus, the garbage collector also copies the value of the pointer 2902 in the second generation heap and a pointer 2904 in the first generation heap is the replication. Then, the garbage collector modifies the generation number held in the object C from "2" to "1" in accordance with the copying of the pointer from the second generation heap to the first generation heap. As a result of this series of copying processing, the memory structure is now as shown in FIG. 28B.

Copying processing as above is advantageous in that after creating, in an older generation heap, a replication of a pointer, it is not necessary to delete the original pointer in a younger generation heap.

Now, description is given concretely to deallocation of a generation heap.

Figure 29A:
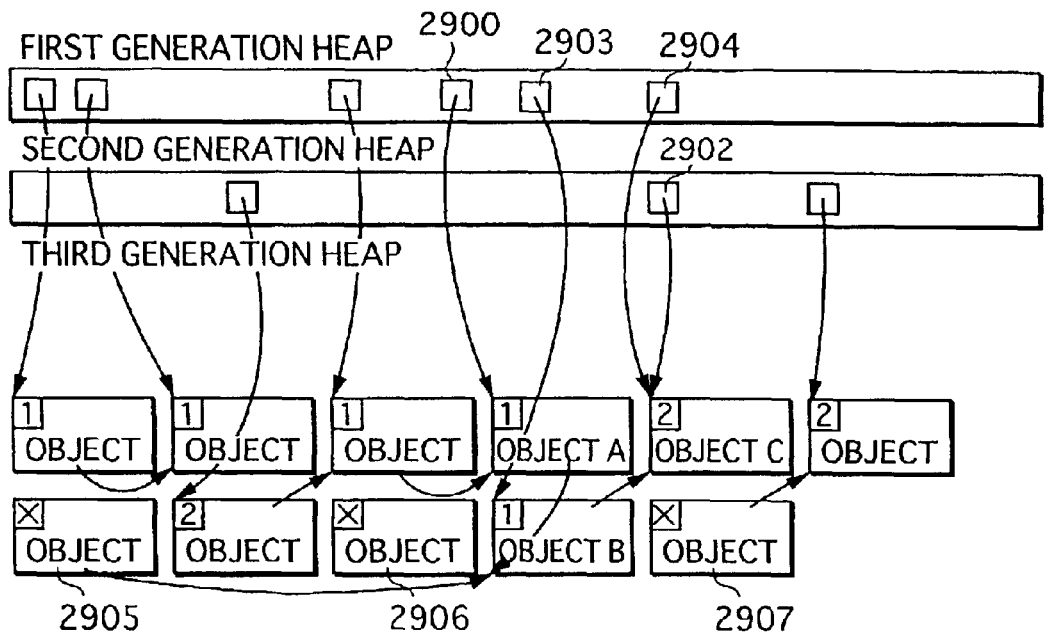
FIG. 29A is a view showing one example of change in the memory structure resulting from deallocation of the third generation heap.
Figure 29B:
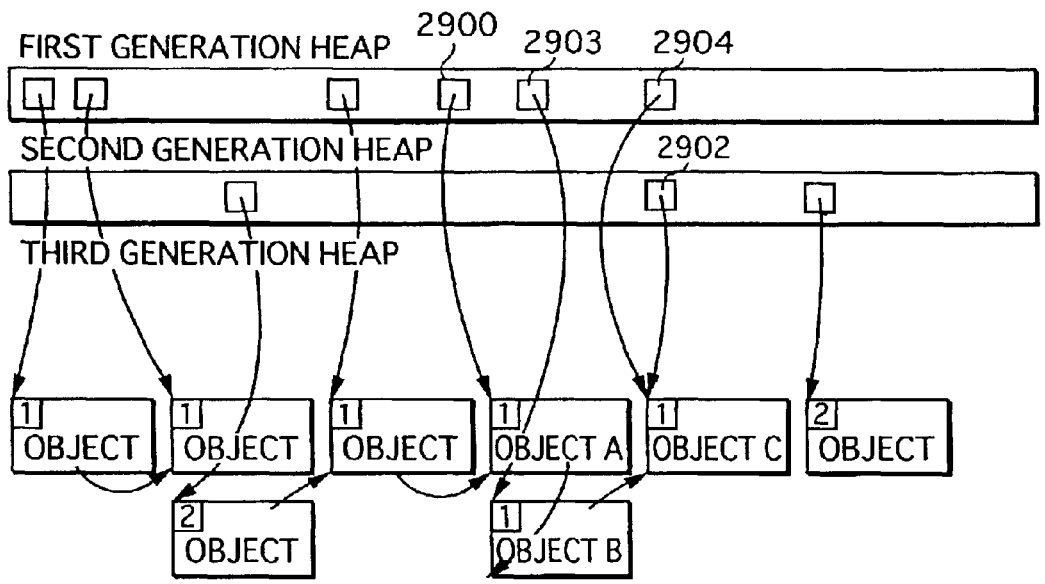
FIG. 29B is a view showing the memory structure of the example in FIG. 29A after object relocation.

FIGS. 29A and 29B are views showing one example of change in the memory structure resulting from deallocation of the third generation heap.

Upon completion of a method corresponding to the third generation heap shown in FIG. 28B, the garbage collector judges whether the generation number held in each object specified by a pointer is 3. This is because the generation number of an object matches that of a generation heap including a pointer to the object. That is to say, an object having a generation number not matching that of the to-be-deallocated generation heap is to be retained, while an object having a matching generation number is to be deallocated. As a result, objects 2905, 2906, and 2907 are judged to hold the generation number 3. Accordingly, the garbage collector deallocates the objects 2905, 2906, and 2907, so that the memory structure is now as shown in FIG. 29B.

Hereinafter, description is given in detail to processing of the garbage collector according to the embodiment 7. The garbage collector of the embodiment 7 is basically similar in construction to the garbage collector 100 shown in FIG. 1. Thus, the description thereof is given with reference to FIG. 1 mainly to the difference.

Figure 23:
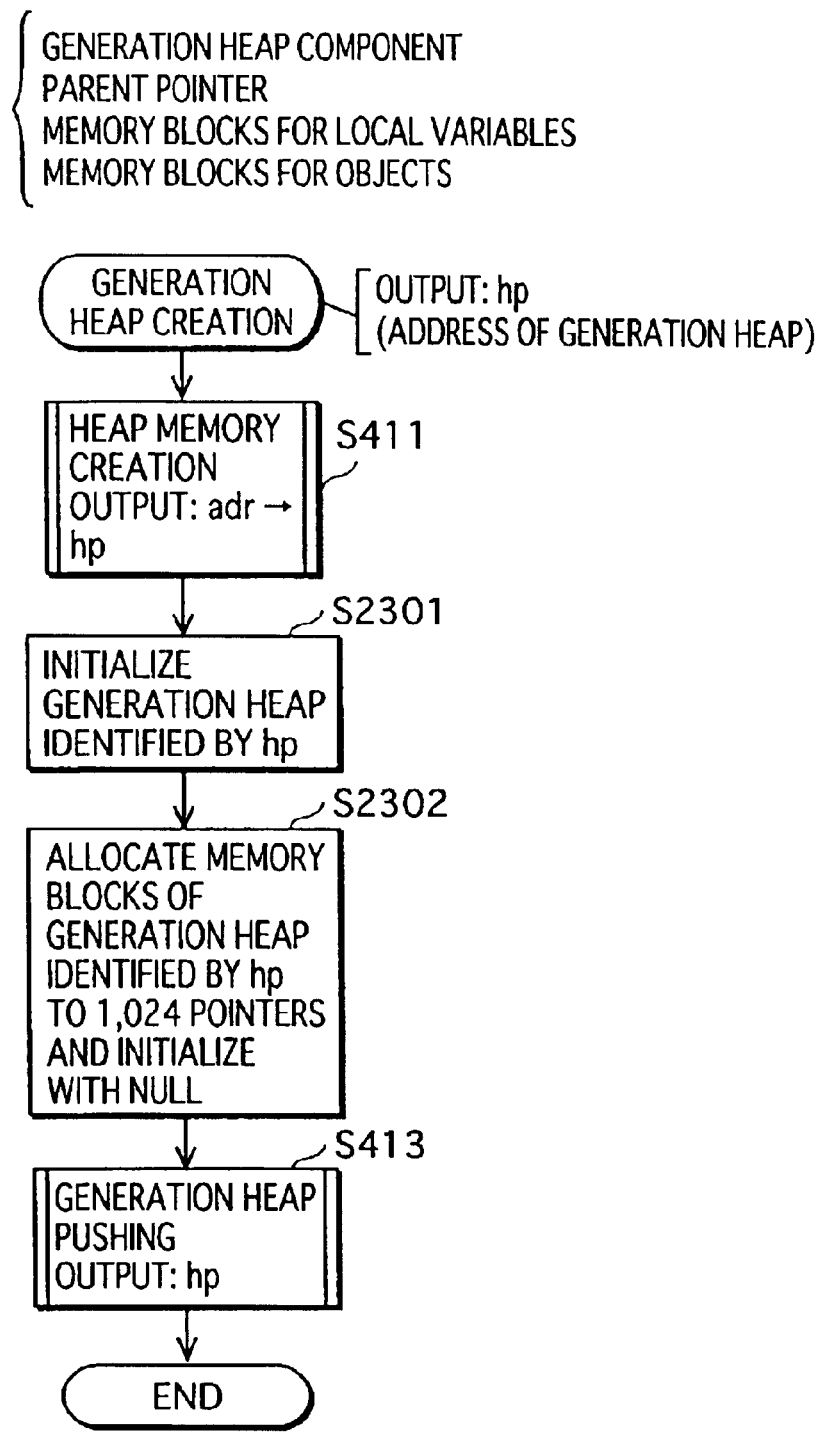
FIG. 23 is a view showing generation heap creation processing performed by the generation heap creator 20 of an embodiment 7.

FIG. 23 is the view showing the generation heap creation processing performed by the generation heap creator 20 of the embodiment 7.

Step S411: The generation heap creator 20 instructs the heap memory manager 60 to execute the heap memory creation processing shown in FIG. 4C, so that a generation heap is created in a heap memory area, and assigns the address of the generation heap to hp.

Step S2301: The generation heap creator 20 allocates blocks of the generation heap to local variables, and initializes each block.

Step S2302: The generation heap creator 20 allocates a block of generation heap specified by hp for each of a predetermined number of pointers (for example, 1,024), and initializes each pointer with a NULL pointer.

Step S413: The generation heap creator 20 instructs the generation heap manager 50 to execute the generation heap push processing shown in FIG. 4D, so that the generation heap is pushed onto the stack.

As above, the generation heap creator 20 creates, for each method called, a generation heap that includes local variables, pointers to objects, and a parent pointer specifying a generation heap that is one generation older than that generation heap.

Figure 25A:
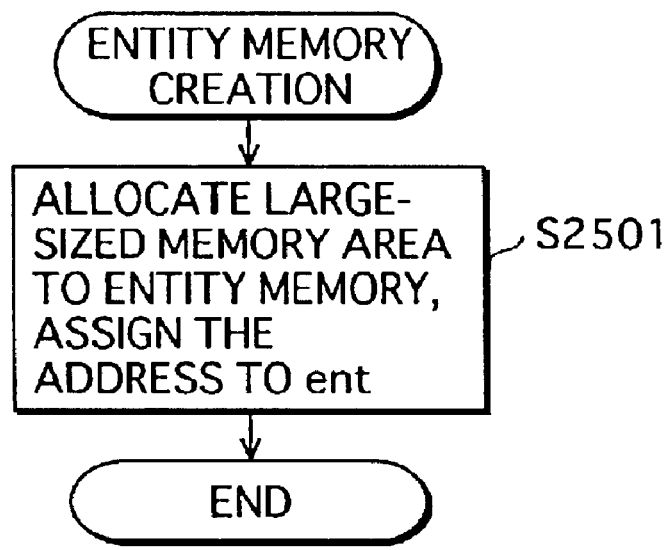
FIG. 25A is a view showing entity memory creation processing.
Figure 25B:
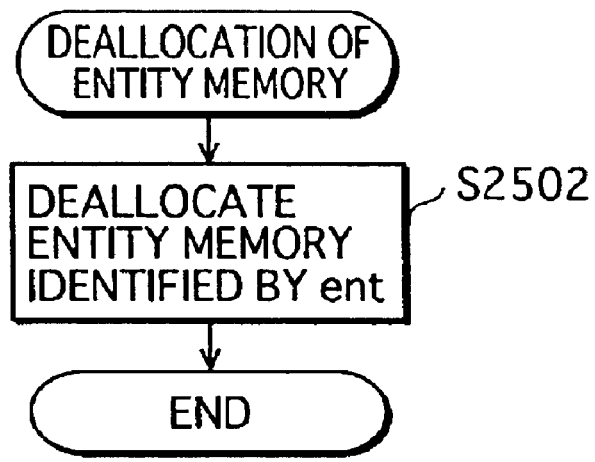
FIG. 25B is a view showing entity memory deallocation processing.

FIGS. 25A and 25B show the entity memory creation processing and the entity memory deallocation processing, respectively.

The heap memory manager 60 performs the heap memory creation processing and the heap memory deallocation processing shown in FIGS. 4C and 5D, respectively. In addition, at a start of the application program, the heap memory manager 60 allocates a large-sized block of memory for storing objects, and assigns the address of the memory block to a variable ent (steps S2501). At a completion of the application program, the heap memory manager 60 deallocates the memory block specified by ent (step S2502).

Figure 26:
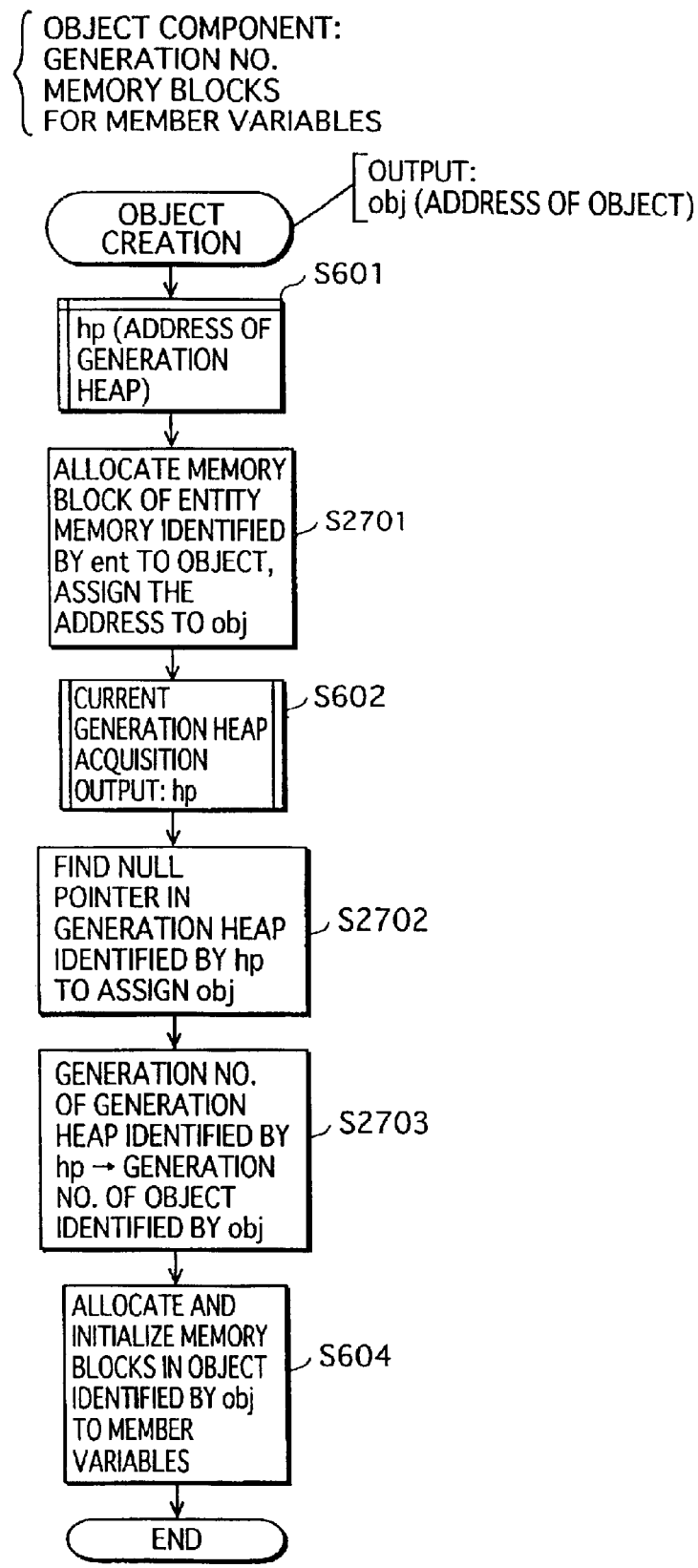
FIG. 26 is a view showing object creation processing performed by an object creator 70 of the garbage collector according to the embodiment 7.

FIG. 26 is a view showing object creation processing performed by the object creator 70 of the garbage collector according to the embodiment 7.

Step S601: The object creator 70 defines a variable hp for storing the address of a generation heap.

Step S2701: The object creator 70 allocates a block of entity memory specified by ent to an object, and assigns the address of the object to obj.

Step S602: The object creator 70 calls the current generation heap acquisition processing shown in FIG. 6B so as to acquire the address of a generation heap corresponding to a currently executed method.

Step S2702: The object creator 70 detects a NULL pointer in the generation heap specified by hp, and assigns the value of obj to the pointer.

Step S2703: The object creator 70 assigns the generation number of a generation heap that is specified by hp to the generation number held in the object that is specified by obj.

Step S604: The object creator 70 allocates, to member variables, memory blocks in the object specified by obj and initializes allocated blocks.

Figure 27:
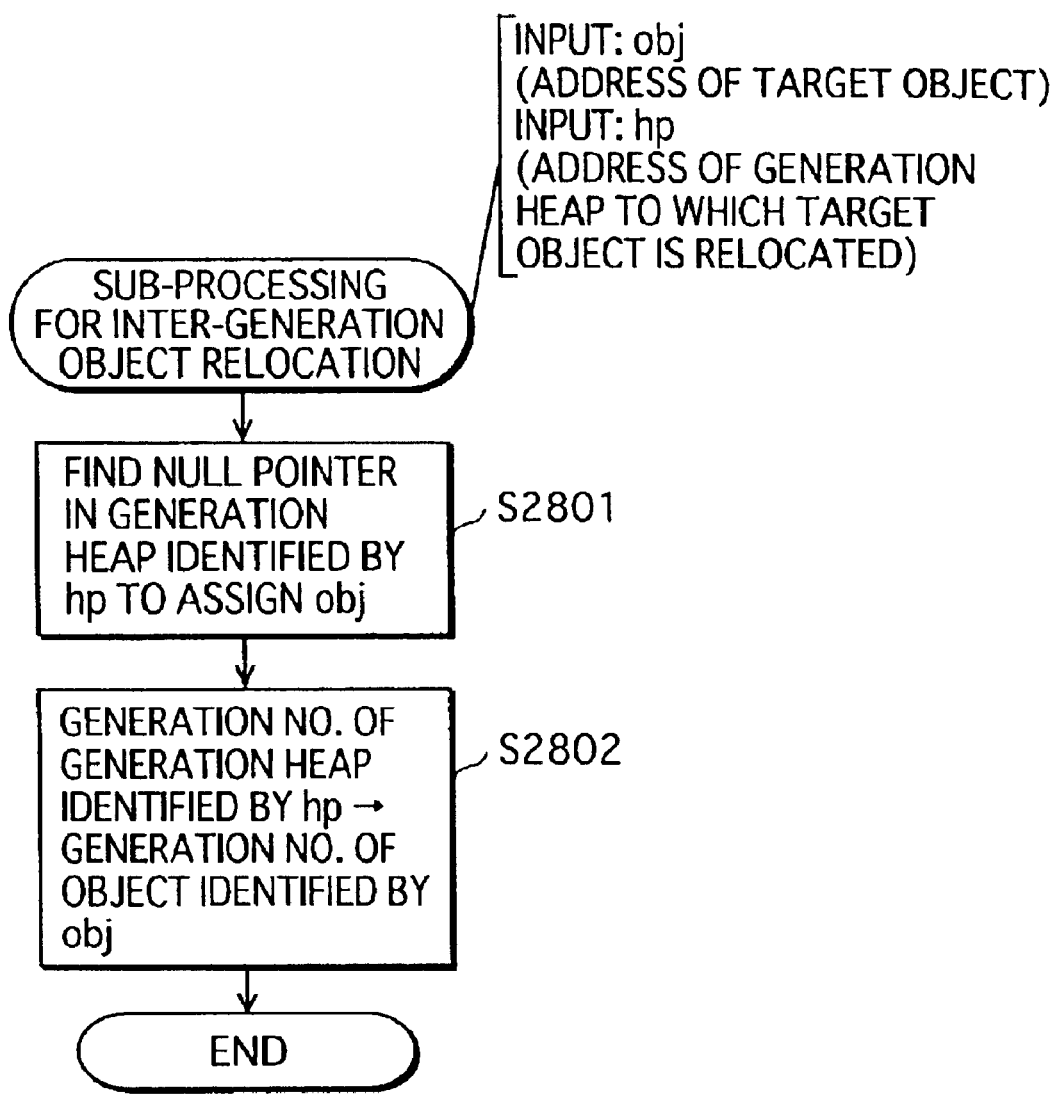
FIG. 27 is a view showing sub-processing for inter-generation object relocation performed by the inter-generation object relocator 80 of the garbage collector according to the embodiment 7.

FIG. 27 shows sub-processing for inter-generation object relocation performed by the inter-generation object relocator 80 of the garbage collector according to the embodiment 7. The inter-generation object relocator 80 assigns values to local variables that are in a generation heap or to member variables of objects that are in the entity memory. Upon detecting a reference from one object to another object as a result of value assignment, the inter-generation object relocator 80 executes the inter-generation object relocation processing shown in FIG. 8A. In this embodiment, however, the inter-generation object relocator 80 performs, in the step S808 shown in FIG. 8A, the processing shown in FIG. 27 in place of the processing shown in FIG. 8B.

Step S2801: The inter-generation object relocator 80 detects a NULL pointer in the generation heap specified by hp, and assigns the value of obj to the pointer.

Step S2802: The inter-generation object relocator 80 assigns the generation number of the generation heap that is specified by hp to the generation number held in the object that is specified by obj.

As described above, when relocating a pointer to another generation heap, the inter-generation object relocator 80 assigns an after-relocation generation number of the pointer to the generation number held in the object that the pointer specifies.

Figure 24:
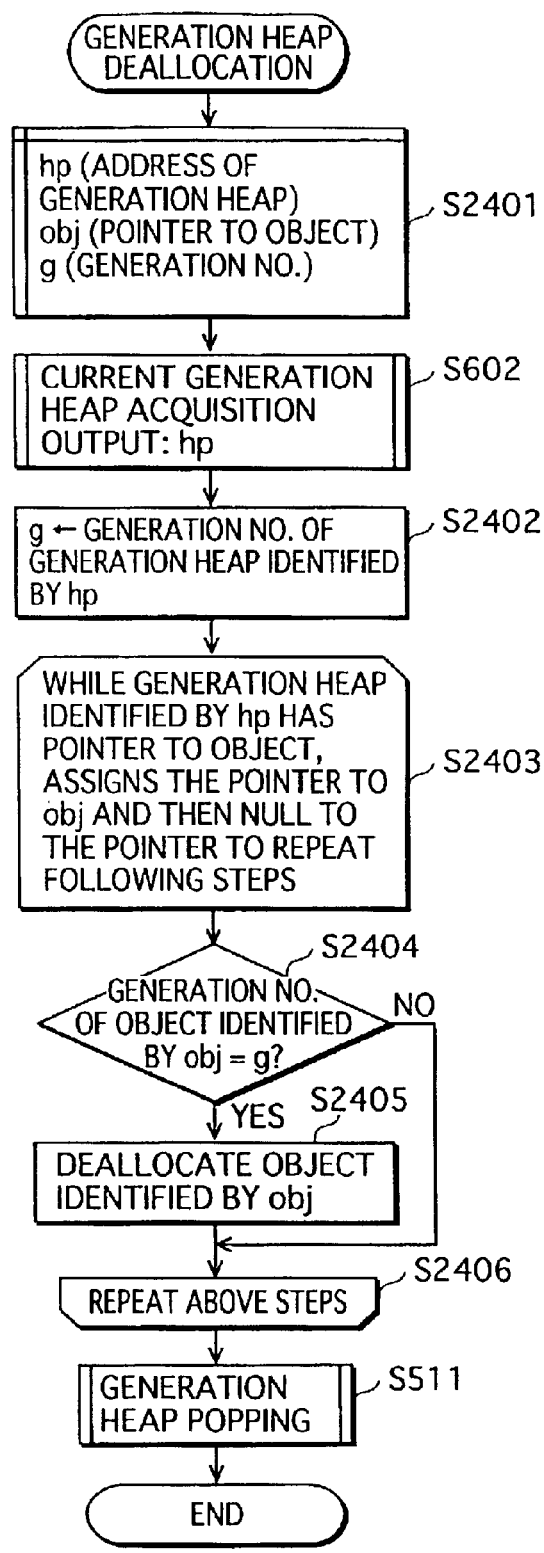
FIG. 24 is a view showing generation heap deallocation processing performed by the generation heap deallocator 40 according to the embodiment 7.

FIG. 24 shows generation heap deallocation processing performed by the generation heap deallocator 40 according to the embodiment 7. When a method included in the application program is completed, the frame relocator 30 starts executing the processing shown in FIG. 5A, and consequently calls, in the step S501, the generation heap deallocator processing. In response, the generation heap deallocator 40 performs the processing shown in FIG. 24.

Step S2401: The generation heap deallocator 40 defines a variable hp for storing the address of a generation heap, a variable obj for storing the pointer to an object, and a variable g for storing a generation number.

Step S602: The generation heap deallocator 40 instructs the generation heap manager 50 to execute the current generation heap acquisition processing shown in FIG. 6B so as to acquire hp, which stores the address of the generation heap corresponding to a currently executed method.

Step S2402: The generation heap deallocator 40 assigns, to the variable g, the generation number of the generation heap specified by hp.

Step S2403: The generation heap deallocator 40 sequentially assigns, to obj, the values of pointers in the generation heap specified by hp, and then assigns NULL to the pointer. The steps S2403–S2406 are repeated until there are no more pointers left in that generation heap.

Step S2404: The generation heap deallocator 40 judges whether the generation number of the object specified by obj matches the value of g that is assigned in the step S2402.

Step S2405: When the judgment in the step S2404 results in affirmative, the generation heap deallocator 40 deallocates the object specified by obj.

On the other hand, when the judgment in the step S2404 results in negative, no additional processing is performed. That is to say, in the case where the generation number held in the object does not match the generation number of the generation heap to be deallocated, the object is not deallocated. It is because such an object is pointed to by a pointer in the generation heap corresponding to the generation number held in the object.

Step S511: The generation heap deallocator 40 calls the generation heap pop processing shown in FIG. 5C, so that the generation heap corresponding to the target frame is popped from the stack and deallocated.

As described above, in response to an object created during execution of a method, the garbage collector of the embodiment 7 stores the object in the entity memory, and creates a pointer to the object in a generation heap corresponding to the method. When a value assigned to a member variable results in a reference from an object whose pointer is in an older generation heap to an object whose pointer is in a younger generation heap, the garbage collector creates, in the older generation heap, a replication of the pointer in the younger generation heap. Upon completion of a method, the garbage collector deallocates a corresponding frame and a corresponding generation heap. To deallocate the generation heap, the garbage collector assigns NULL to each pointer in the generation heap, and deallocates objects corresponding to the pointers in that generation heap unless the objects are specified by other pointers in other generation heaps.

<Embodiment 8>

Hereinafter, description is given to garbage collector according to an embodiment 8.

Similarly to the garbage collector of the embodiment 7, the garbage collector of the embodiment 8 creates objects in an entity memory, and creates, in each generation heap, pointer to the objects. The embodiment 8 differs from the embodiment 7 in that each object stores not a generation number but a reverse pointer, which is the address of a pointer to the object, and that the pointer to an object is not copied but relocated as necessary. In other respects, the embodiment 8 is basically similar to the embodiment 7, thus description is given mainly to the difference.

Figure 22A:
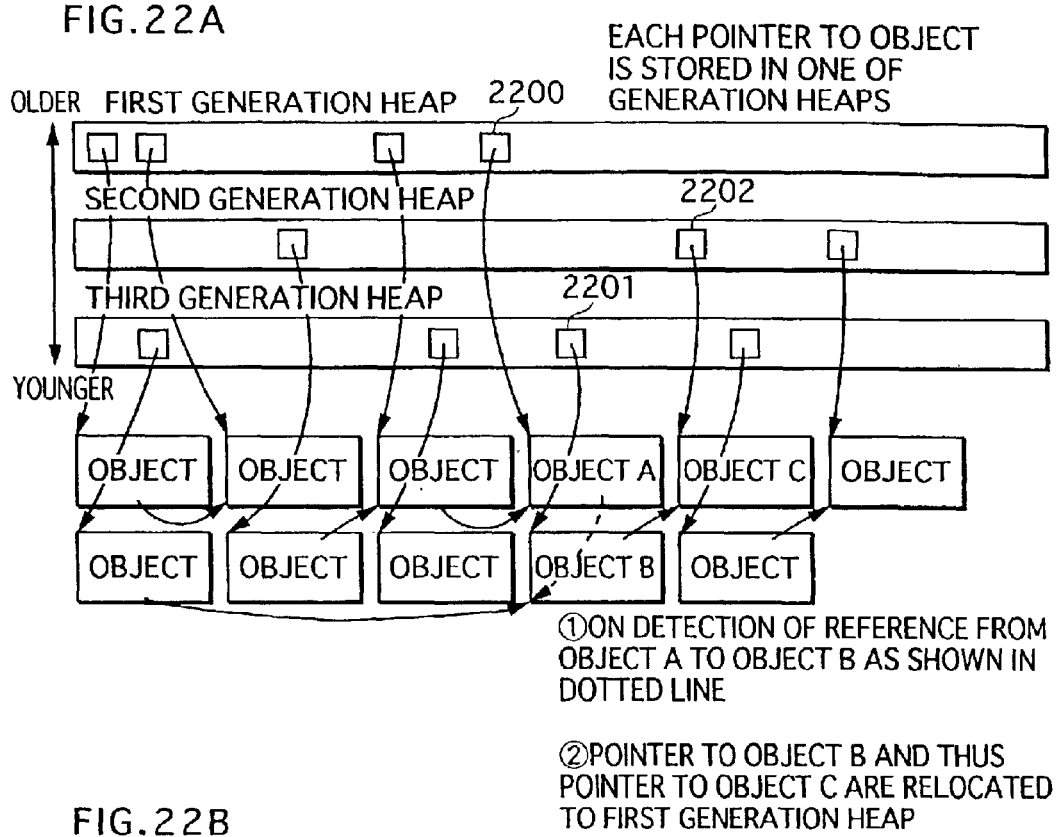
FIG. 22A is a view showing one example of memory structure of a garbage collector according to an embodiment 8.

FIG. 22A shows one example of memory structure of the garbage collector according to the embodiment 8.

As shown in the figure, when a first method is called during execution of the application program, the garbage collector creates a frame (not illustrated) as the work area of the first method, and creates a first generation heap corresponding to the frame. The garbage collector then allocates memory blocks in the first generation heap for storing local variables (not illustrated) and pointers to objects, followed by initialization of each memory block.

Next, when a second method is called during execution of the first method, the garbage collector creates, in a similar manner to the above, a frame (not illustrated) and a second generation heap, and allocates memory blocks in the second generation heap for storing local variables (not illustrated) and pointers to objects, followed by initialization of each memory block.

Further, when a third method is called during execution of the second method, the garbage collector creates, in a similar manner to the above, a frame (not illustrated) and a third generation heap, and allocates memory blocks in the third generation heap for storing local variables (not illustrated) and pointers to objects, followed by initialization of each memory block.

As described above, the garbage collector creates a generation heap as necessary, and when the application program creates an object during execution of a method, the garbage collector allocates a block of the entity memory for the object, and stores a pointer to the object in a generation heap corresponding to the method being executed.

Upon detecting a reference from an object specified by a pointer in an older generation heap to an object specified by a pointer in a younger generation heap, the garbage collector relocates the pointer in the younger generation heap to the older generation.

Hereinafter, description is given concretely to operations for the relocation of a pointer.

In FIG. 22A, a pointer 2200 in the first generation heap specifies an object A stored in the entity memory, a pointer 2201 in the third generation heap specifies an object B stored in the entity memory, and a pointer 2202 in the second generation heap specifies an object C stored in the entity memory. The object A has a reference to the object B, and the object B has a reference to the object C (each reference is shown in the figure by a dotted arrow).

In the reference relationship as above, the reference from the object A to the object B, in other words, is a reference from the object specified by the pointer 2200 in the first generation heap to the object specified by the pointer 2201 in the third generation heap. In short, the reference is from an object specified by a pointer in an older generation heap to an object specified by a pointer in a younger generation heap. Upon detecting such a reference, the garbage collector relocates the pointer in the younger generation heap to the older generation heap. Tat is to say, the pointer 2201 in the third generation heap is relocated to the first generation heap.

Figure 22B:
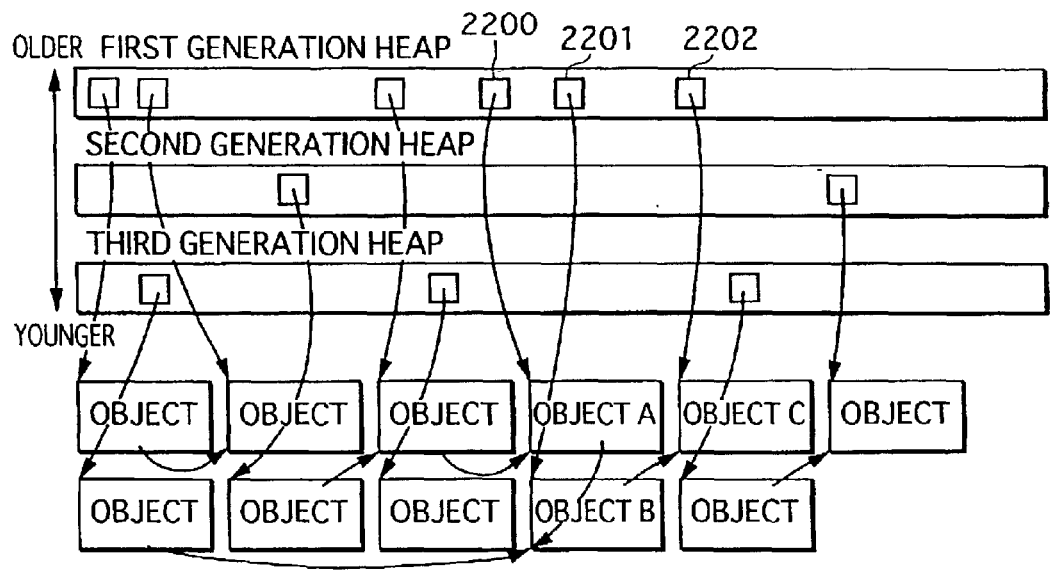
FIG. 22B is a view showing the memory structure of the example in FIG. 22B after pointer relocation.

As a result of the relocation of the pointer 2201, the reference from the object B to the object C is now a reference from the object specified by the pointer 2201 in the first generation heap to the object specified by the pointer 2202 in the second generation heap. In short, this reference is also a reference from an object specified by a pointer in an older generation heap to an object specified by a pointer in a younger generation heap. Thus, the pointer 2202 in the second generation heap is also relocated to the first generation heap. The memory structure after the relocation operations is as shown in FIG. 22B.

As described above, the garbage collector according to the embodiment 8 does not relocate any object stored in the entity memory. Instead of directly relocating objects, the garbage collector relocates pointers to the objects so that each object belongs to a different generation heap from the one the object initially belongs to. Upon completion of a method, the garbage collector deallocates a frame corresponding to the completed method, and then simply deallocates a generation heap corresponding to the frame. Unlike a conventional technique, the deallocation as above does not require the time consuming processing of detecting unneeded objects to deallocate each detected object. Thus, the deallocation of this embodiment is completed within a short time.

Hereinafter, description is given in detail to the processing of the garbage collector according to the embodiment 8. Note that the garbage collector of this embodiment is basically similar in construction to the garbage collector 100 shown in FIG. 1. In addition, operations performed by each component are basically similar to those performed by each component of the garbage collector according to the embodiment 7. Thus, description is given below with reference to FIG. 1 mainly to the difference.

Figure 31:
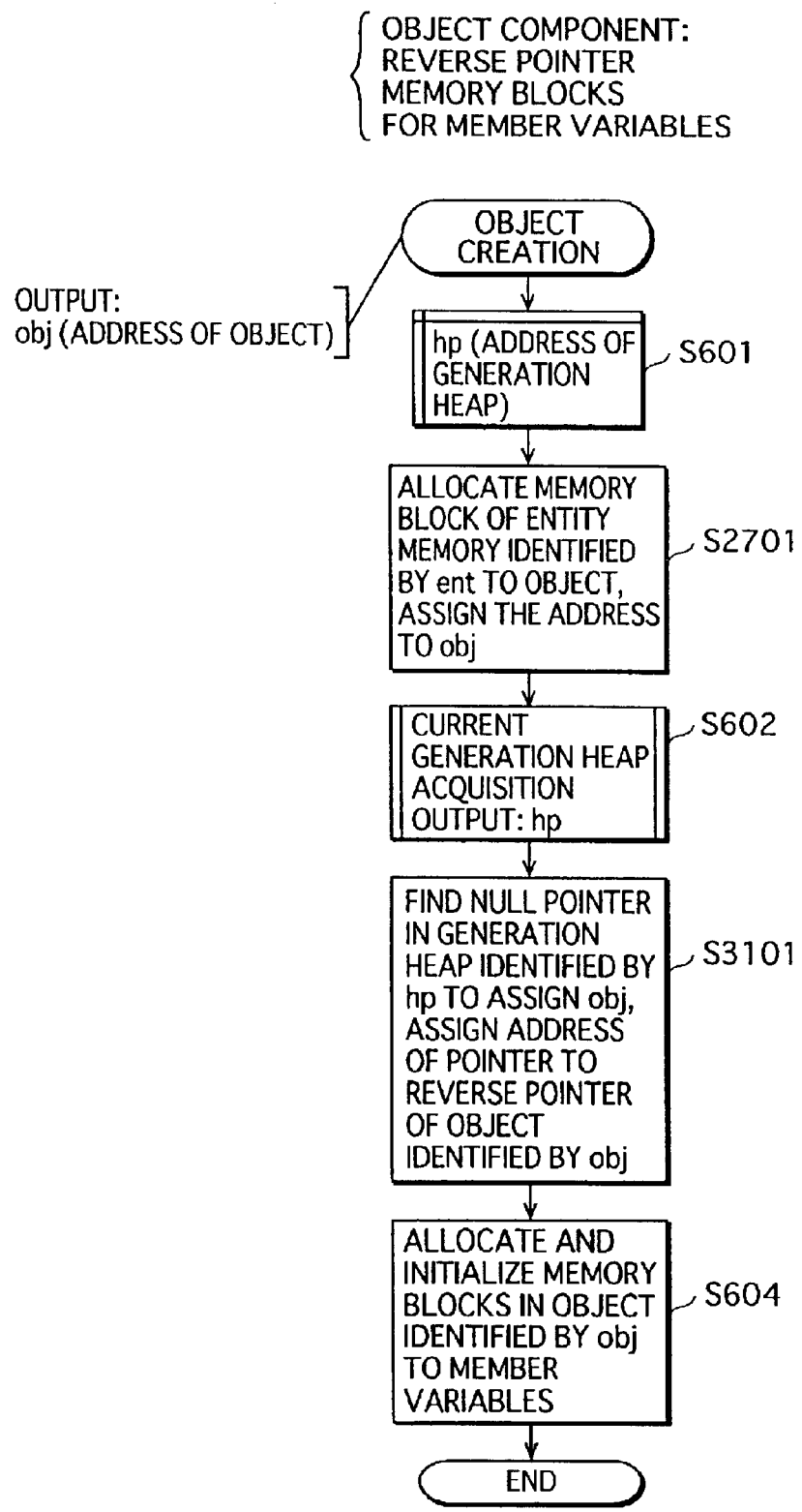
FIG. 31 is a view showing object creation processing performed by the object creator 70 of the garbage collector according to the embodiment 8.

FIG. 31 shows object creation processing performed by the object creator 70 of the garbage collector according to the embodiment 8.

Step S601: The object creator 70 defines hp for storing the address of a generation heap.

Step S2701: The object creator 70 allocates an available block of the entity memory specified by ent to an object, and assigns the address of the object to obj. Similarly to the embodiment 7, the entity memory is created and deallocated by the entity memory creation processing and the entity memory deallocation processing, respectively, shown in FIGS. 25A and 25B.

Step S602: The object creator 70 calls the current generation heap acquisition processing, so as to acquire the value of hp storing the address of a generation heap corresponding to the currently executed method.

Step S3101: The object creator 70 detects, in the generation heap specified by hp, an available memory block for storing a pointer to the object, and assigns obj to the memory block. In addition, the object creator 70 assigns, to a reverse pointer held in the object specified by obj, the address of the memory block storing the pointer.

Step S604: The object creator allocates memory blocks of the object specified by obj for member variables, and initializes the memory blocks.

Figure 32:
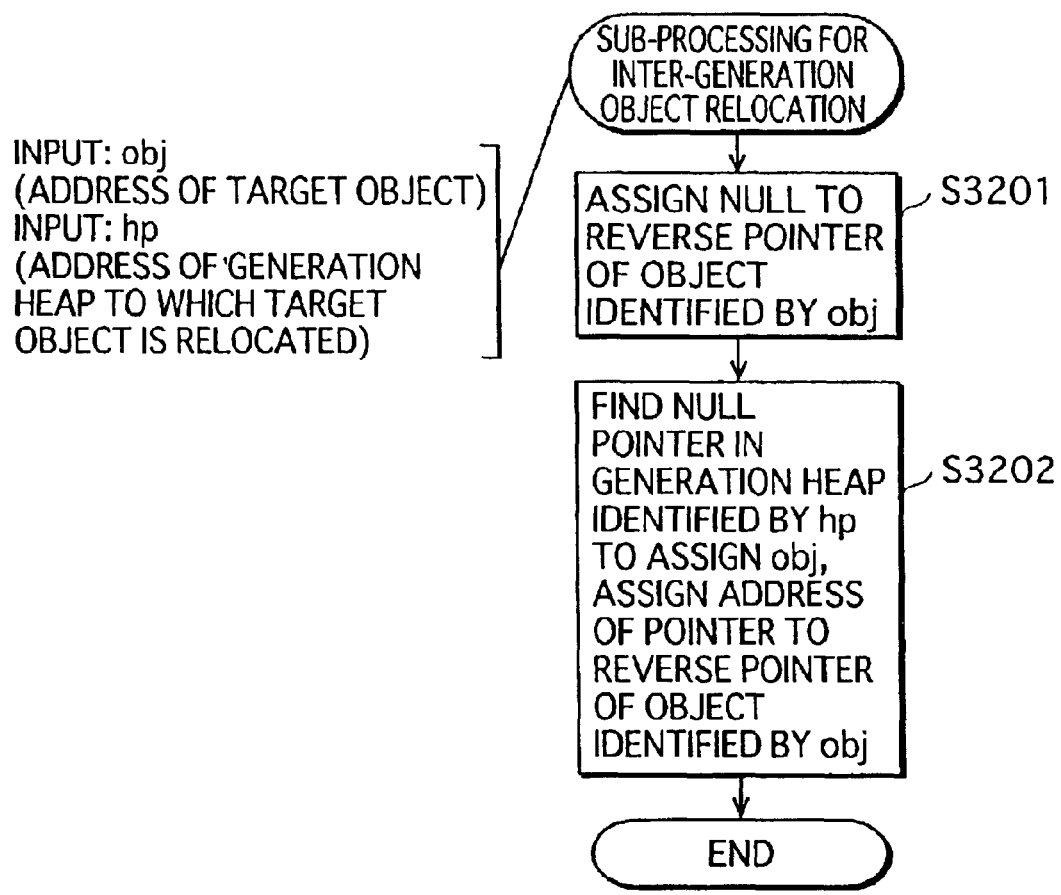
FIG. 32 is a view showing sub-processing for inter-generation object relocation performed by the inter-generation object relocator 80 of the garbage collector according to the embodiment 8.

FIG. 32 shows sub-processing for inter-generation object relocation performed by the inter-generation object relocator 80 of the garbage collector according to the embodiment 8. The inter-generation object relocator 80 performs assignment of local variables stored in the generation heap or member variables in objects stored in the entity memory. When the assignment results in a reference from one object to another object, the inter-generation object relocator 80 performs the inter-generation object relocation processing shown in FIG. 8A. In the step S808 in the processing shown in FIG. 8A, the inter-generation object relocator 80 performs the processing shown FIG. 32 in place of the processing shown in FIG. 8B.

Step S3201: The inter-generation object relocator 80 assigns NULL to a memory block that is specified by the reverse pointer held in the object specified by obj.

Step S3202: The inter-generation object relocator 80 detects, in the generation heap specified by hp, an available block to store a pointer to the object, and assigns obj to the detected memory block. In addition, the inter-generation object relocator 80 assigns the address of the memory block to the reverse pointer held in the object specified by obj.

As described above, to relocate an object from a younger generation heap to an older generation heap, the inter-generation object relocator 80 first assigns NULL to the pointer stored in the younger generation heap, so that the object is no longer specified by the pointer in the younger generation heap. Then, the inter-generation object relocator 80 creates, in the older generation heap, a new pointer to the object, and creates a reverse pointer in the object.

Figure 30:
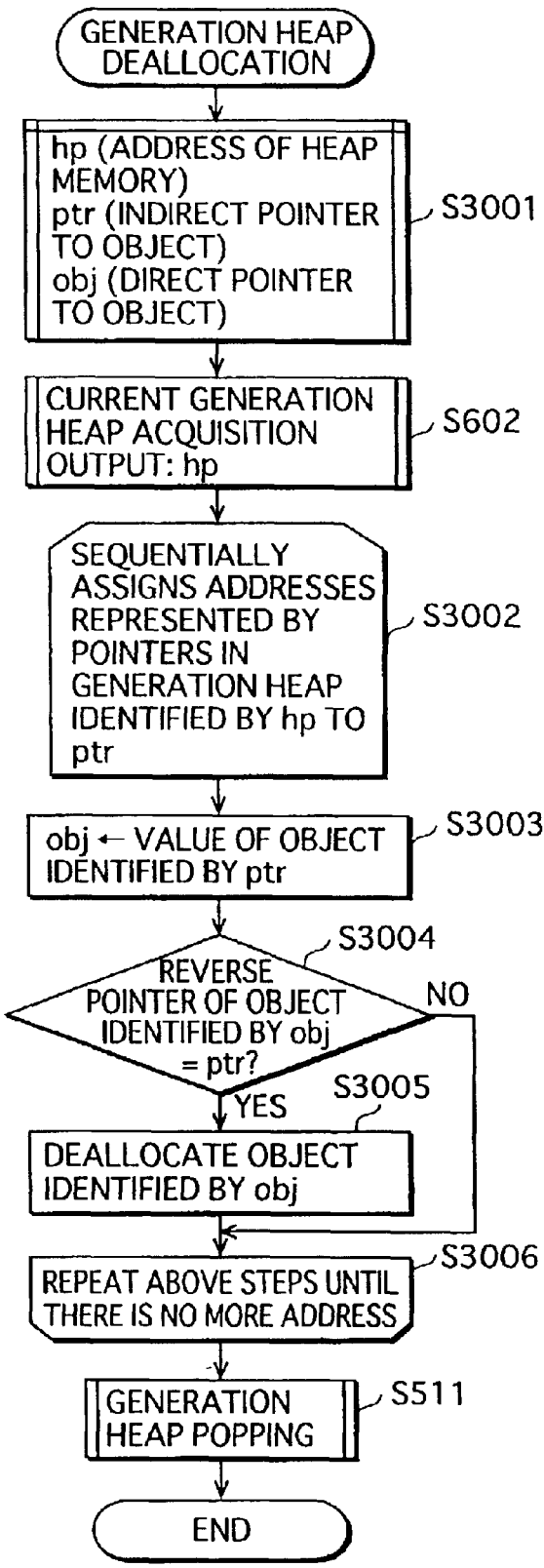
FIG. 30 is a view showing generation heap deallocation processing performed by the generation heap deallocator 40.

FIG. 30 shows the generation heap deallocation processing performed by the generation heap deallocator 40. The generation heap deallocator 40 of the garbage collector according to the embodiment 8 performs the processing shown in FIG. 30 when the generation heap deallocation processing is called in the step S501 during the frame deallocation processing shown in FIG. 5A.

Step S3001: The generation heap deallocator 40 defines variables hp for storing the address of a generation heap, ptr for storing an indirect pointer to an object, and obj for storing a direct pointer to the object.

Step S602: The generation heap deallocator 40 calls the current generation heap acquisition processing shown in FIG. 6B so as to acquire the address of a generation heap that corresponds to a currently executed method.

Step S3002: The generation heap deallocator 40 sequentially assigns, to ptr, the address of a pointer to an object in the generation heap specified by hp, and repeats the steps S3002–S3006 until there is no more pointers.

Step S3003: The generation heap deallocator 40 assigns the value of ptr to obj.

Step S3004: The generation heap deallocator 40 judges whether the reverse pointer held in an object specified by obj matches ptr.

Step S3005: Upon judging affirmative, the generation heap deallocator 40 deallocate the object specified by obj. If judging negative, on the other hand, the generation heap deallocator 40 performs no additional processing.

Step S511: The generation heap deallocator 40 calls the generation heap pop processing shown in FIG. 5C, so that generation heaps are popped from the stack one by one and deallocated.

<Modifications>

In the embodiments 1–6 above, a reference relation between two objects is a direct reference established by one object holding a pointer to the other object. Instead of the direct reference, however, a reference relation between objects may be an indirect reference established via a handle stored in a handle memory. In the embodiments 1–6, a reference from an object A to an object B, for example, is established by that the object A holding a pointer to the object B. In the case of a reference via a handle, such a reference between the objects A and B is established by the object A holding a pointer to a handle in the handle memory, and the handle holding a pointer to the object B. With this arrangement, when the object B is relocated to another generation heap, to be modified is not the pointer held in the object A but the pointer held in the handle.

Hereinafter, description is given to changes and additions to the embodiments 1–6 when such indirect referencing is applied thereto.

Figure 33A:
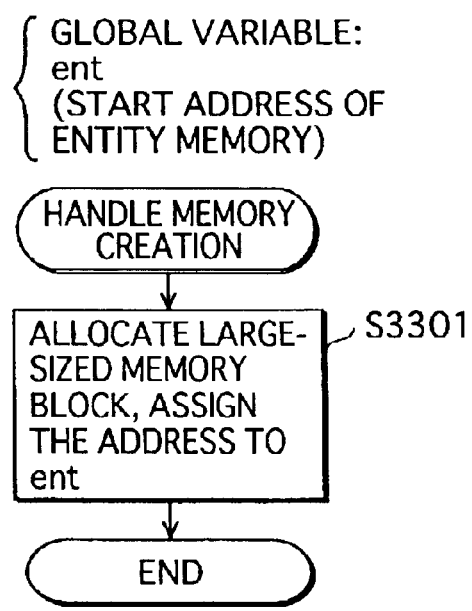
FIGS. 33A and 33B are views showing handle memory creation processing and handle memory deallocation processing that each garbage collector of the embodiments 1–6 needs to additionally perform.
Figure 33B:
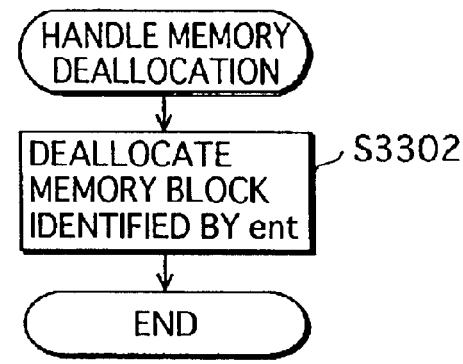

FIGS. 33A and 33B show processing that each garbage collector of the embodiments 1–6 needs to additionally perform. As shown in FIG. 33A, at a start of the application program, the garbage collector allocates a large-sized memory block to a handle memory for storing handles, and assigns the address of the memory block to ent (step S3301). In addition, at a completion of the application program, the garbage collector deallocates the handle memory specified by ent (step S3302).

Figure 34:
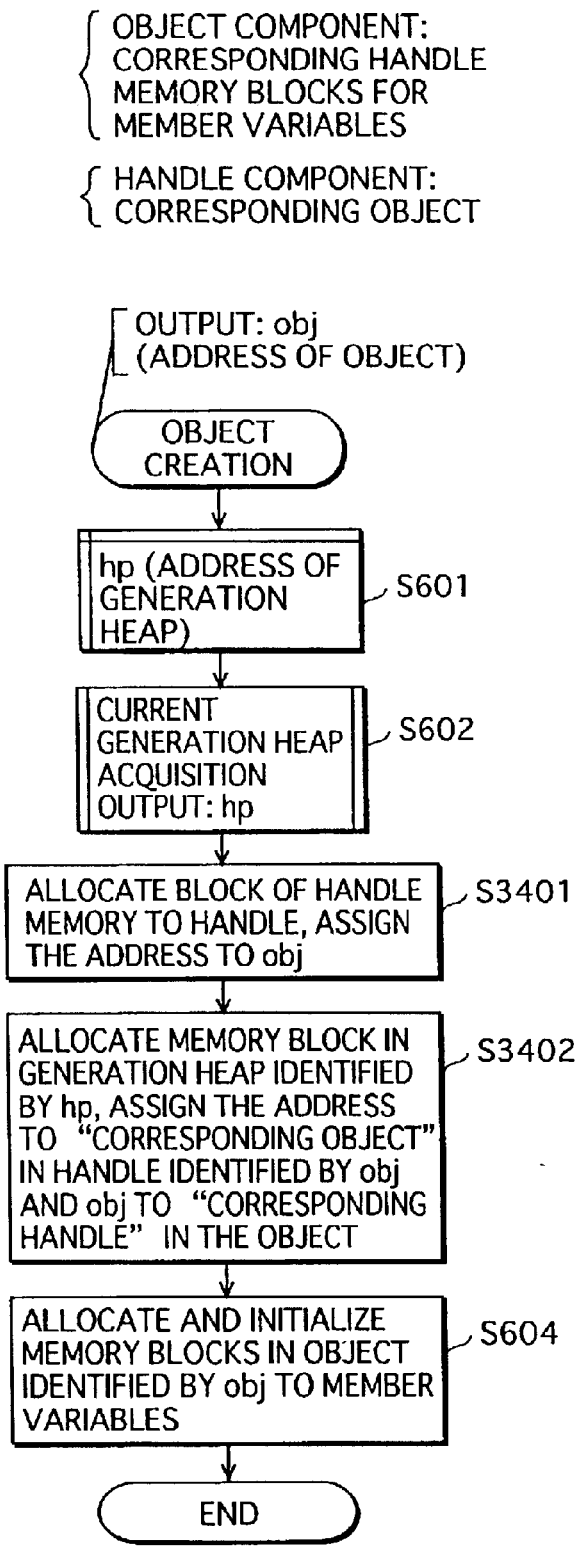
FIG. 34 is a view showing object creation processing performed by the object creator of the embodiment 1 instead of the processing shown in FIG. 6A.

FIG. 34 shows object creation processing performed by the object creator of the embodiment 1 instead of the processing shown in FIG. 6A.

Step S601: The object creator defines a variable hp for storing the address of a generation heap.

Step S602: The object creator calls the current generation heap acquisition processing shown in FIG. 6B so as to acquire the address of a generation heap that corresponds to a currently executed method.

Step S3401: The object creator allocates an available block of the handle memory for a handle, and assigns the address of the handle to obj.

Step S3402: The object creator allocates an available block of generation heap specified by hp to an object. In addition, the object creator assigns the address of the object to the "corresponding object" area held in the handle specified by obj, and the value of obj to the "corresponding handle" area held in the object.

S604: The object creator assigns memory blocks of the object specified by obj for storing member variables, and initialize the memory blocks.

Figure 37:
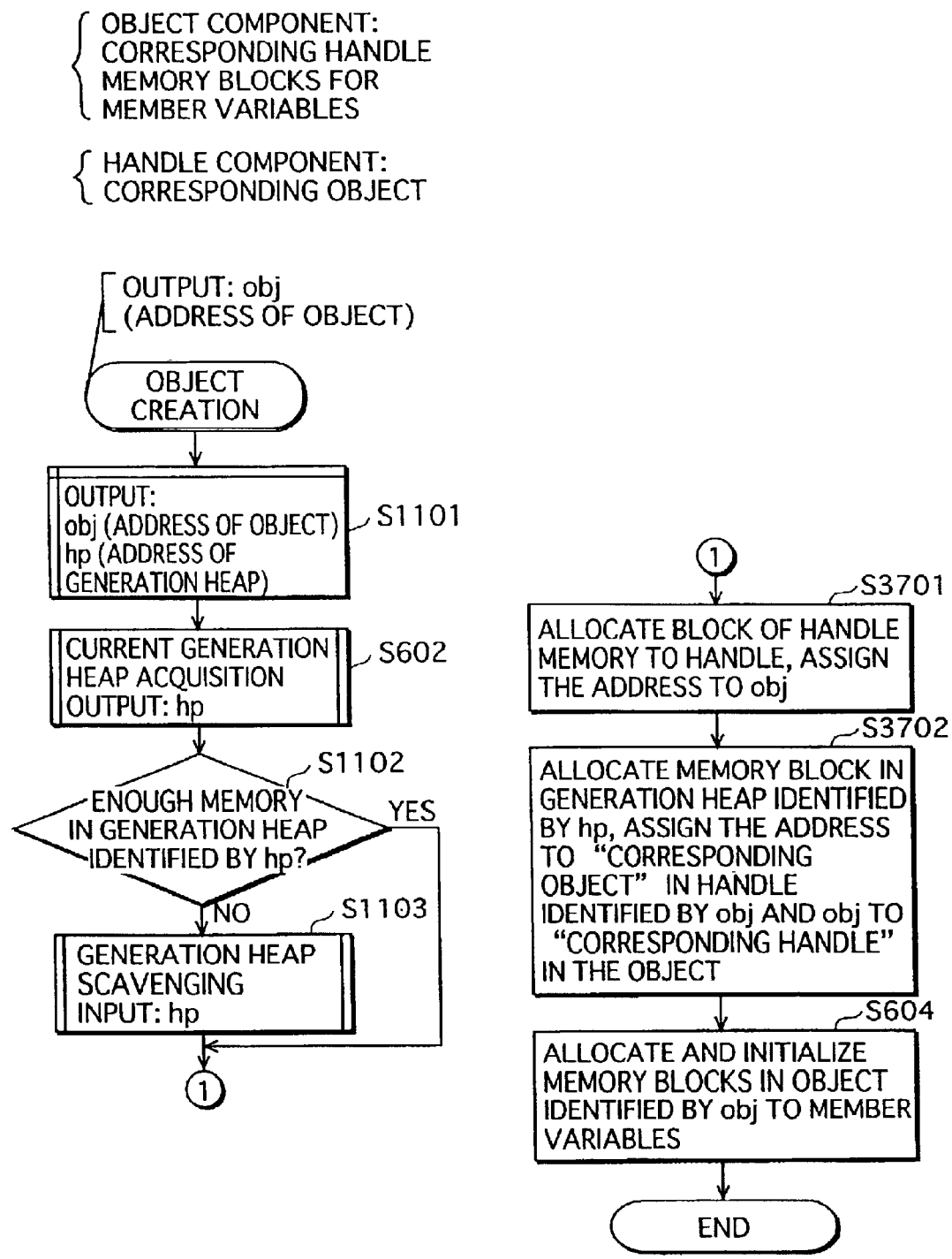
FIG. 37 is a view showing object creation processing performed by each object creator of the embodiments 2 and 3 instead of the processing shown in FIG. 11A.

FIG. 37 shows object creation processing performed by each object creator of the embodiments 2 and 3 instead of the processing shown in FIG. 11A.

Step S1101: The object creator defines a variable obj for storing the address of an object and a variable hp for storing the address of a generation heap.

Step S602: The object creator calls the current generation heap acquisition processing shown in FIG. 6B so as to acquire the address of the generation heap that corresponds to a currently executed method.

Step S1102: The object creator judges whether there is enough memory available in the generation heap specified by the address acquired in the step S602.

Step S1103: When judging in the step S1102 that there is no sufficient memory available, the object creator instructs the generation heap scavenger to execute the generation heap scavenging processing on that generation heap.

Step S3701: The object creator allocates a block of the handle memory to a handle and assigns the address of the handle to obj.

Step S3702: The object creator allocates a block of generation heap specified by hp to an object. In addition, the object creator assigns the address of the object to the "corresponding object" area held in the handle specified by obj, and the value of obj to the "corresponding handle" area held in the object.

Step S604: The object creator assigns memory blocks of the object specified by obj for storing member variables, and initialize the memory blocks.

Figure 38:
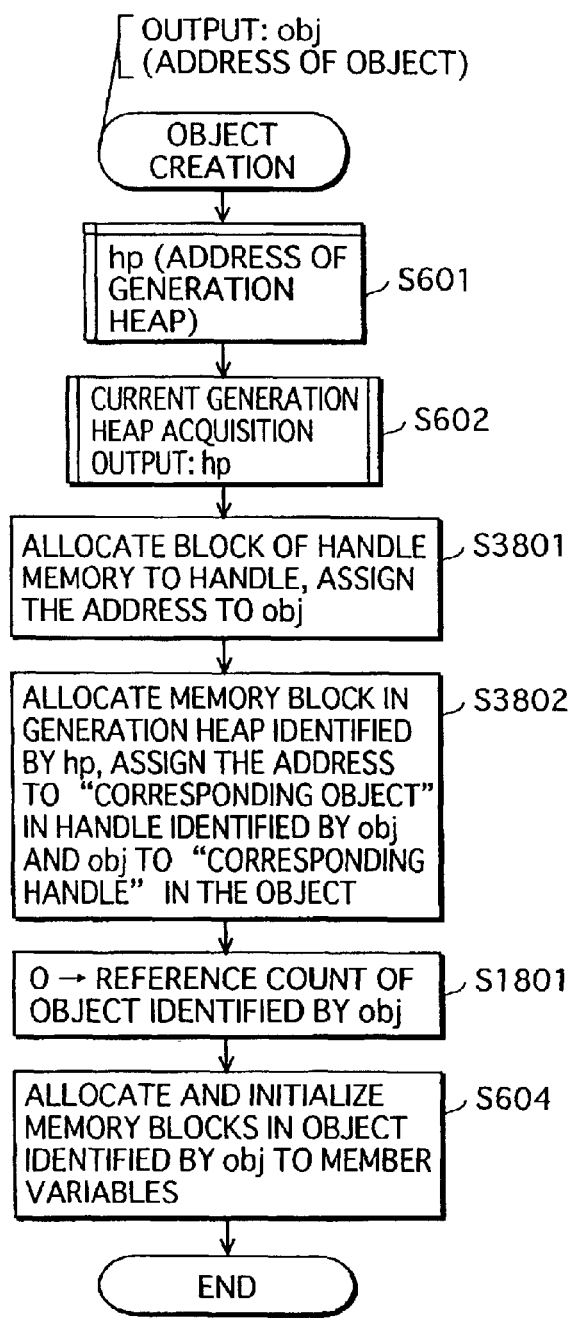
FIG. 38 is a view showing object creation processing performed by the object creator of the embodiment 4 instead of the processing shown in FIG. 17.

FIG. 38 is a view showing object creation processing performed by the object creator of the embodiment 4 instead of the processing shown in FIG. 17.

Step S601: The object creator defines a variable hp for storing the address of a generation heap.

Step S602: The object creator calls the current generation heap acquisition processing shown in FIG. 6B so as to acquire the address of a generation heap that corresponds to a currently executed method.

Step S3801: The object creator allocates a block of handle memory to a handle, and assigns the address of the handle to obj.

Step S3802: The object creator allocates a block of generation heap specified by hp to an object. In addition, the object creator assigns the address of the object to the "corresponding object" area held in the handle specified by obj, and the value of obj to the "corresponding handle" area held in the object.

Step S1801: The object creator 74 sets the reference count of the object specified by obj to 0.

Step S604: The object creator assigns memory blocks of the object specified by obj for storing member variables, and initialize the memory blocks.

Figure 40:
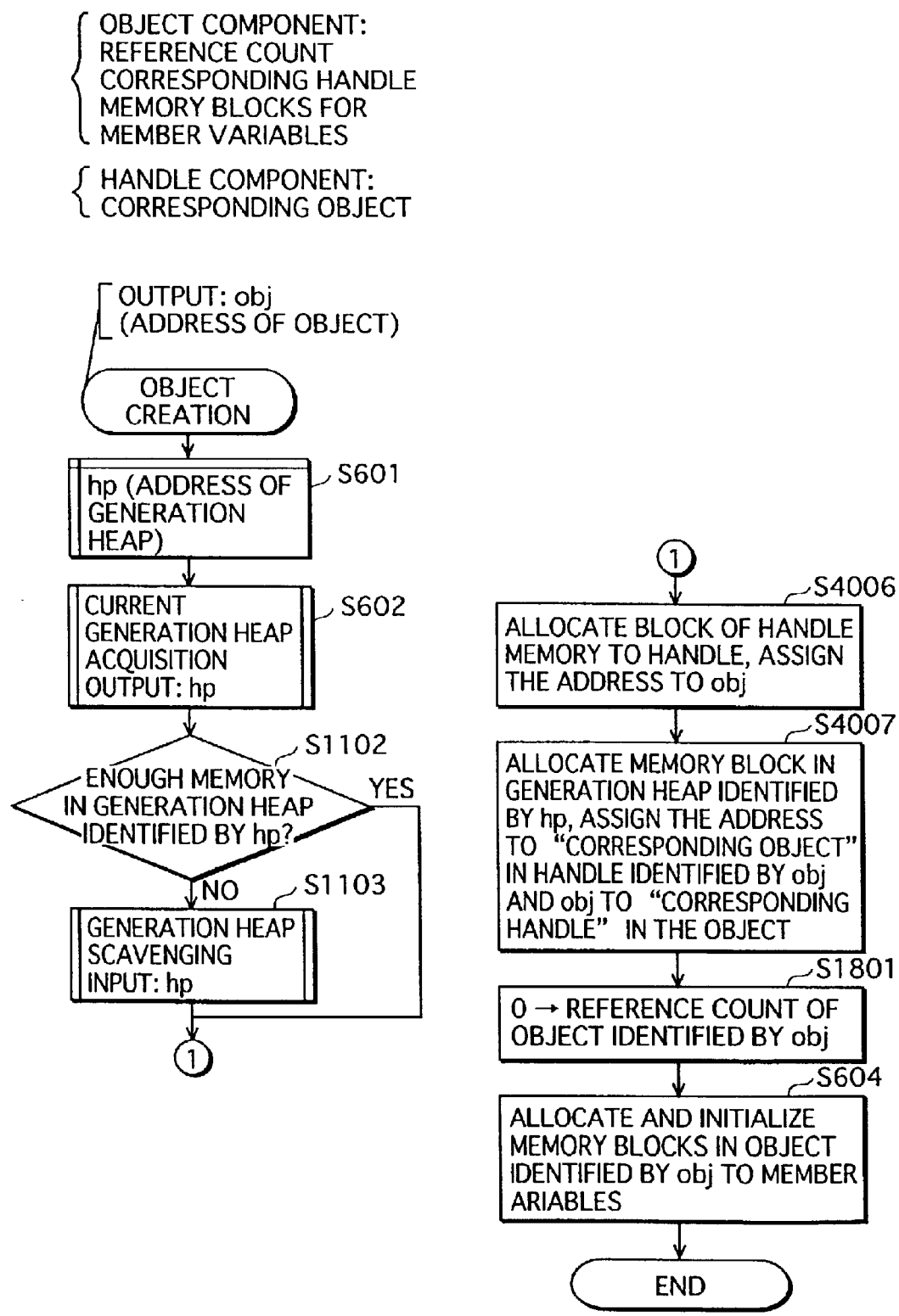
FIG. 40 is a view showing object creation processing performed by each object creator of the embodiments 5 and 6.

FIG. 40 shows processing performed by each object creator of the embodiments 5 and 6.

Step S601: The object creator defines a variable hp for storing the address of a generation heap.

Step S602: The object creator calls the current generation heap acquisition processing shown in FIG. 6B so as to acquire the address of a generation heap that corresponds to a currently executed method.

Step S1102: The object creator judges whether there is enough memory available in the generation heap specified by the address acquired in the step S602.

Step S1103: When judging in the step S1102 that there in not enough memory available, the object creator instructs the generation heap scavenger to execute the generation heap scavenging processing on that generation heap.

Step S4006: The object creator allocates a block of handle memory to a handle, and assigns the address of the handle to obj.

Step S4007: The object creator allocates a block of the generation heap specified by hp to an object. The object creator then assigns the address of the object to the "corresponding object" area held in the handle specified by obj, and obj to the "corresponding handle" area held in the object.

Step S1801: The object creator sets the reference count held in the object specified by obj to 0.

Step S604: The object creator allocates memory blocks in the object specified by obj for member variables, and initializes the memory blocks.

Figure 36:
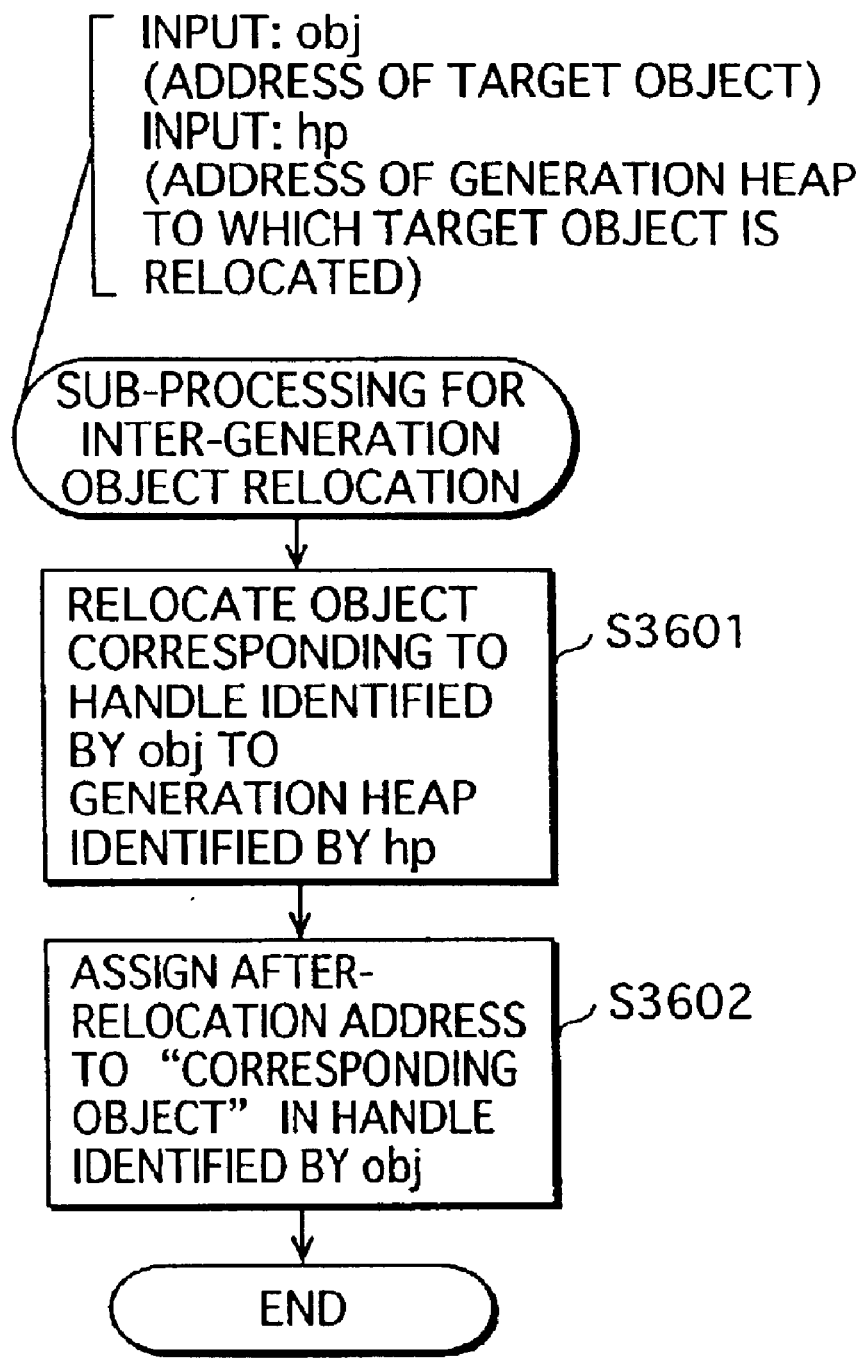
FIG. 36 is a view showing sub-processing for inter-generation object relocation performed by each inter-generation object relocator according to the embodiments 1 and 4 instead of the processing shown in FIG. 8B.

FIG. 36 shows sub-processing for inter-generation object relocation performed by the inter-generation object relocator according to the embodiments 1 and 4 instead of the processing shown in FIG. 8B.

Step S3601: The inter-generation object relocator relocates an object corresponding to the handle specified by obj to the generation heap specified by hp.

Step S3602: The inter-generation object relocator assigns the after-relocation address of the object to the "corresponding object" area held in the handle specified by obj.

Figure 39:
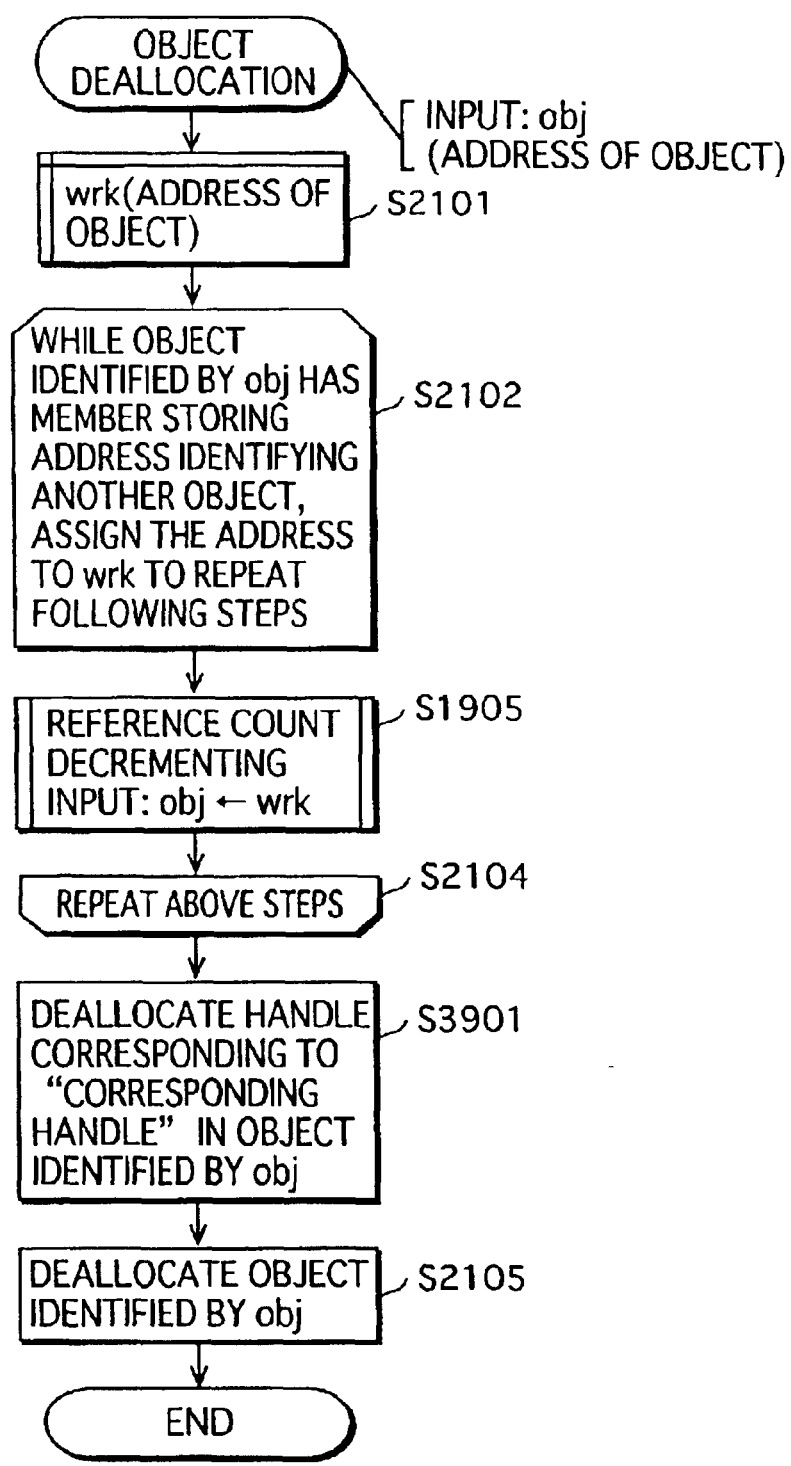
FIG. 39 is a view showing object deallocation processing performed by each object deallocator of the embodiments 4–6 instead of the processing shown in FIG. 20.

FIG. 39 shows object deallocation processing performed by each object deallocator of the embodiments 4–6 instead of the processing shown in FIG. 20.

Step S2101: The object deallocator defines a variable wrk for storing the address of an object.

Step S2102: As long as there is a member, in the object specified by obj, storing an address of another object, the object deallocator assigns the address of another object to wrk, and repeats the step S1904.

Step S1904: The object deallocator instructs the reference count modifier to execute the reference count decrement processing.

Step S3901: The object deallocator deallocates the handle specified by the "corresponding handle" area held in the object specified by obj.

Step S2105: The object deallocator deallocates the object specified by obj.

Figure 35:
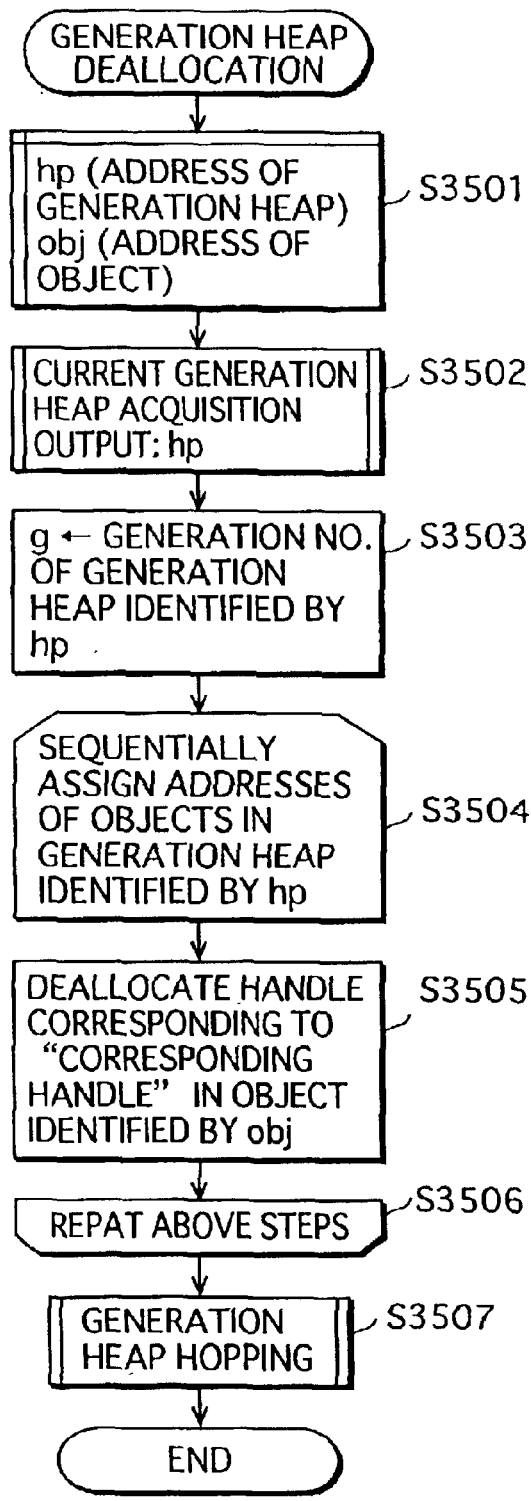
FIG. 35 is a view showing generation heap deallocation processing performed by each generation heap deallocator of the embodiments 1–6 instead of the processing shown in FIG. 5B.

FIG. 35 shows generation heap deallocation processing performed by each generation heap deallocator of the embodiments 1–6 instead of the processing shown in FIG. 5B.

Step S3501: The generation heap deallocator defines a variable hp for storing the address of a generation heap and a variable obj for storing the address of an object.

Step S602: The generation heap deallocator calls the current generation heap acquisition processing shown in FIG. 6B so as to acquire hp storing the address of a generation heap corresponding to a currently executed method.

Step S3503: The generation heap deallocator assigns, to g, the generation number of the generation heap specified by hp.

Step S3504: The generation heap deallocator sequentially assigns, to obj, the addresses of all the objects in the generation heap specified by hp to perform a step S3505.

Step S3505: The generation heap deallocator deallocates the handle specified by the "corresponding handle" held in an object specified by obj.

Step S511: The generation heap deallocator calls the generation heap pop processing shown in FIG. 5C, so that the generation heap corresponding to the target frame is popped from the stack and deallocated.

As described above, when a reference to an object is represented via a handle, what needs to be done to relocate an object from one generation heap to another generation heap is to modify a pointer held in the handle corresponding to the object. In contrast, when a reference to an object is represented directly without using a handle, relocation of an object results in modification of all the pointers to the object.

In short, when a reference is represented via a handle, the processing time for relocation of an object is the sum of the time taken to relocate the object and the time taken to modify the pointer in the corresponding handle. Note that the processing time is constant. Thus, if the number of objects to be relocated is known in advance, the processing time is accurately predicted by multiplying the time taken for relocating one object by the number of objects to be relocated. As the processing time is predictable, the garbage collector of this modification is suitably applicable to an application program that needs to be highly responsive.

Up to this point, the specific embodiments and their modifications have been described. The present invention, however, is not limited the specific embodiments and modifications described above. In addition, each of the above embodiments and modifications may be implemented in combination with another embodiment and/or modification.

Further, the processing performed by each garbage collector of the above embodiments may be embodied as a computer program to be executed by a general purpose computer or by a device capable of executing a program. Further, such a computer program may be distributed via a recording medium storing the program or over various communications paths. Examples of the recording medium include an IC card, an optical disc, a flexible disk, and ROM.

Further, the processing of the garbage collector of each embodiment may be implemented as a method or process.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A garbage collection apparatus for deallocating memory that is not used by an application program, the application program being composed of methods, comprising:
   an allocation unit operable to allocate a memory area for each method prior to execution of the method;
   a storage unit operable to store an allocation time as to when each memory area is allocated;
   a relocation unit operable to judge, when a pointer to an object is recorded in one memory area allocated for a method, whether an allocation time of the memory area is prior to an allocation time of a memory area storing the object, and to relocate, when judging affirmative, the object to the memory area in which the pointer is recorded; and
   a deallocation unit operable to deallocate, at completion of a method, a memory area corresponding to the completed method.

2. The garbage collection apparatus of claim 1, further comprising
   a garbage collection unit operable to detect an object that is not pointed to by any pointer and deallocate a memory block occupied by the detected object, the detection and deallocation being performed within a memory area corresponding to a currently executed method or a memory area to which the object is to be relocated by the relocation unit upon detection of shortage in the memory area.

3. The garbage collection apparatus of claim 2, wherein the garbage collection unit performs the detection and deallocation in a mark-and-sweep system.

4. The garbage collection apparatus of claim 1, further comprising
   an object deallocation unit operable to update a reference count held in each object according to a modification of a pointer during execution of the application program, and to deallocate an object whose reference count falls to zero.

5. The garbage collection apparatus of claim 2, further comprising
   an object deallocation unit operable to update a reference count held in each object according to a modification of a pointer during execution of the application program, and to deallocate an object whose reference count falls to zero.

6. The garbage collection apparatus of claim 3, further comprising
   an object deallocation unit operable to update a reference count held in each object according to a modification of a pointer during execution of the application program, and to deallocate an object whose reference count falls to zero.

7. The garbage collection apparatus of claim 2, wherein the relocation unit further relocates objects remaining in the memory area that is garbage-collected by the garbage collection unit to a memory area that is allocated prior to the garbage-collected memory area being allocated.

8. The garbage collection apparatus of claim 3, wherein the relocation unit further relocates objects remaining in the memory area that is garbage-collected by the garbage collection unit to a memory area that is allocated prior to the garbage-collected memory area being allocated.

9. The garbage collection apparatus of claim 4, wherein the relocation unit further relocates objects remaining in the memory area that is garbage-collected by the garbage collection unit to a memory area that is allocated prior to the garbage-collected memory area being allocated.

10. The garbage collection apparatus of claim 1, wherein a reference relationship between two objects is shown indirectly by one object holding a pointer to a handle stored in a handle area and the handle holding a pointer to the other object.

11. The garbage collection apparatus of claim 2, wherein a reference relationship between two objects is shown indirectly by one object holding a pointer to a handle stored in a handle area and the handle holding a pointer to the other object.

12. The garbage collection apparatus of claim 3, wherein a reference relationship between two objects is shown indirectly by one object holding a pointer to a handle stored in a handle area and the handle holding a pointer to the other object.

13. The garbage collection apparatus of claim 4, wherein a reference relationship between two objects is shown indirectly by one object holding a pointer to a handle stored in a handle area and the handle holding a pointer to the other object.

14. The garbage collection apparatus of claim 7, wherein a reference relationship between two objects is shown indirectly by one object holding a pointer to a handle stored in a handle area and the handle holding a pointer to the other object.

15. A garbage collection apparatus for deallocating memory area that is not used by an application program, the application program being composed of methods, comprising:

an allocation unit operable to allocate a memory area for each method prior to execution of the method, and to store information regarding (i) a correspondence between the method and the memory area and (ii) an allocation time as to when the memory area is allocated;

a relocation unit operable to relocate a first pointer from a current memory area to a memory area that stores a second pointer in the case where an object pointed to by the first pointer is referenced from an object pointed to by the second pointer and an allocation time of the current memory area is after an allocation time of the memory area that stores the second pointer; and a deallocation unit operable to deallocate, at completion of a method, a memory area that corresponds to the completed method and an object that is no longer referenced.

16. The garbage collection apparatus of claim 15, wherein the relocation unit performs the relocation by relocating a copy of the first pointer.

17. The garbage collection apparatus of claim 15, wherein each object holds information addressing a memory area in which a pointer to the object is stored, and the object to be deallocated by the deallocation unit is an object holding information specifying the memory area to be deallocated.

18. The garbage collection apparatus of claim 15, wherein each object holds a reverse pointer representing an address of a pointer to the object, and the object to be deallocated by the deallocation unit is an object holding a reverse pointer representing an address of a pointer stored in the memory area to be deallocated.

19. A garbage collection method for deallocating memory that is not used by an application program, the application program being composed of methods, comprising:

an allocation step of allocating a memory area for each method prior to execution of the method;

a storage step of storing an allocation time as to when each memory area is allocated;

a relocation step of judging, when a pointer to an object is recorded in one memory area allocated for a method, whether an allocation time of the memory area is prior to an allocation time of a memory area storing the object, and relocating, when judging affirmative, the object to the memory area in which the pointer is recorded; and a deallocation step of deallocating, at completion of a method, a memory area corresponding to the completed method.

20. A garbage collection method for deallocating memory that is not used by an application program, the application program being composed of methods, comprising:

an allocation step of allocating a memory area for each method prior to execution of the method, and storing information regarding (i) a correspondence between the method and the memory area and (ii) an allocation time as to when the memory area is allocated;

a relocation step of relocating a first pointer from a current memory area to a memory area that stores a second pointer in the case where an object pointed to by the first pointer is referenced from an object pointed to by the second pointer and an allocation time of the current memory area is after an allocation time of the memory area that stores the second pointer; and a deallocation step of deallocating, at completion of a method, a memory area that corresponds to the completed method and an object that is no longer referenced.

21. A garbage collection program for deallocating memory that is not used by an application program, the application program being composed of methods, comprising:

an allocation step of allocating a memory area for each method prior to execution of the method;

a storage step of storing an allocation time as to when each memory area is allocated;

a relocation step of judging, when a pointer to an object is recorded in one memory area allocated for a method, whether an allocation time of the memory area is prior to an allocation time of a memory area storing the object, and relocating, when judging affirmative, the object to the memory area in which the pointer is recorded; and a deallocation step of deallocating, at completion of a method, a memory area corresponding to the completed method.

22. A garbage collection program for deallocating memory that is not used by an application program, the application program being composed of methods, comprising:

an allocation step of allocating a memory area for each method prior to execution of the method, and storing information regarding (i) a correspondence between the method and the memory area and (ii) an allocation time as to when the memory area is allocated;

a relocation step of relocating a first pointer from a current memory area to a memory area that stores a second pointer in the case where an object pointed to by the first pointer is referenced from an object pointed to by the second pointer and an allocation time of the current memory area is after an allocation time of the memory area that stores the second pointer; and a deallocation step of deallocating, at completion of a method, a memory area that corresponds to the completed method and an object that is no longer referenced.

* * * * *